United States Patent
Coppola et al.

(10) Patent No.: US 10,767,516 B2
(45) Date of Patent: Sep. 8, 2020

(54) SYNCHRONOUS DRIVE APPARATUS WITH ADJUSTABLE NON-CIRCULAR DRIVE ELEMENTS

(71) Applicant: LITENS AUTOMOTIVE PARTNERSHIP, Woodbridge (CA)

(72) Inventors: Gianmarc Coppola, Concord (CA); Andrew M. Boyes, Aurora (CA); Gary Spicer, Mississauga (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

(21) Appl. No.: 16/470,747

(22) PCT Filed: Dec. 19, 2017

(86) PCT No.: PCT/CA2017/051536
§ 371 (c)(1),
(2) Date: Jun. 18, 2019

(87) PCT Pub. No.: WO2018/112616
PCT Pub. Date: Jun. 28, 2018

(65) Prior Publication Data
US 2019/0345848 A1 Nov. 14, 2019

Related U.S. Application Data

(60) Provisional application No. 62/436,289, filed on Dec. 19, 2016.

(51) Int. Cl.
*F01L 1/34* (2006.01)
*F01L 1/02* (2006.01)
(Continued)

(52) U.S. Cl.
CPC .......... *F01L 1/024* (2013.01); *F01L 1/3442* (2013.01); *F01L 1/352* (2013.01); *F01L 1/46* (2013.01);
(Continued)

(58) Field of Classification Search
CPC ......... F01L 1/024; F01L 1/3442; F01L 1/352; F01L 1/46; F01L 2800/15; F01L 2810/03;
(Continued)

(56) References Cited

U.S. PATENT DOCUMENTS

| 7,232,391 B2 | 6/2007 | Gajewski | |
| 7,493,880 B2 * | 2/2009 | Gajewski | F01L 1/022 123/90.31 |

(Continued)

FOREIGN PATENT DOCUMENTS

DE 19812939 A1 1/1999

OTHER PUBLICATIONS

Search Report and Written Opinion of PCT/CA2017/052536 dated Feb. 28, 2018.
(Continued)

*Primary Examiner* — Zelalem Eshete
(74) *Attorney, Agent, or Firm* — Millman IP Inc.

(57) ABSTRACT

A synchronous drive is provided in which a non-circular rotor generates a fluctuating corrective torque to counteract a fluctuating load torque on a driven rotor. The angular orientation of the non-circular rotor can vary relative to the driven rotor so as to change the phase angle of the fluctuating corrective torque relative to the driving rotor. The arrangement may be applied in internal combustion engines with variable valve timing (VVT) systems, wherein the phase angle of a fluctuating load torque presented on a cam rotor, due to forces arising from actuation of intake and/or exhaust valves by the camshaft, varies relative to the crank-
(Continued)

shaft. The phase angle of the fluctuating corrective torque is also varied relative to the crankshaft to maintain phase relationship with the fluctuating load torque and thereby maintain reduced cam torsional vibrations and span tensions provided by the non-circular rotor during operation.

20 Claims, 39 Drawing Sheets

(51) Int. Cl.
  *F01L 1/344* (2006.01)
  *F01L 1/352* (2006.01)
  *F01L 1/46* (2006.01)
  *F16F 15/20* (2006.01)
  *F16H 7/08* (2006.01)
  *F16H 55/08* (2006.01)

(52) U.S. Cl.
  CPC ............... *F16F 15/20* (2013.01); *F16H 7/08* (2013.01); *F16H 55/084* (2013.01); *F01L 2800/15* (2013.01); *F01L 2810/03* (2013.01); *F16H 2007/087* (2013.01)

(58) Field of Classification Search
  CPC .......... F16F 15/20; F16H 7/08; F16H 55/084; F16H 2007/087
  See application file for complete search history.

(56) References Cited

U.S. PATENT DOCUMENTS

| | | |
|---|---|---|
| 8,550,945 B2 | 10/2013 | Gajewski et al. |
| 2003/0104886 A1 | 6/2003 | Gajewski |
| 2008/0108464 A1 | 5/2008 | Gajewski et al. |
| 2008/0287234 A1 | 11/2008 | Kern et al. |

OTHER PUBLICATIONS

Extended European Search Report dated Jul. 16, 2020 for EP17882947.9.

* cited by examiner

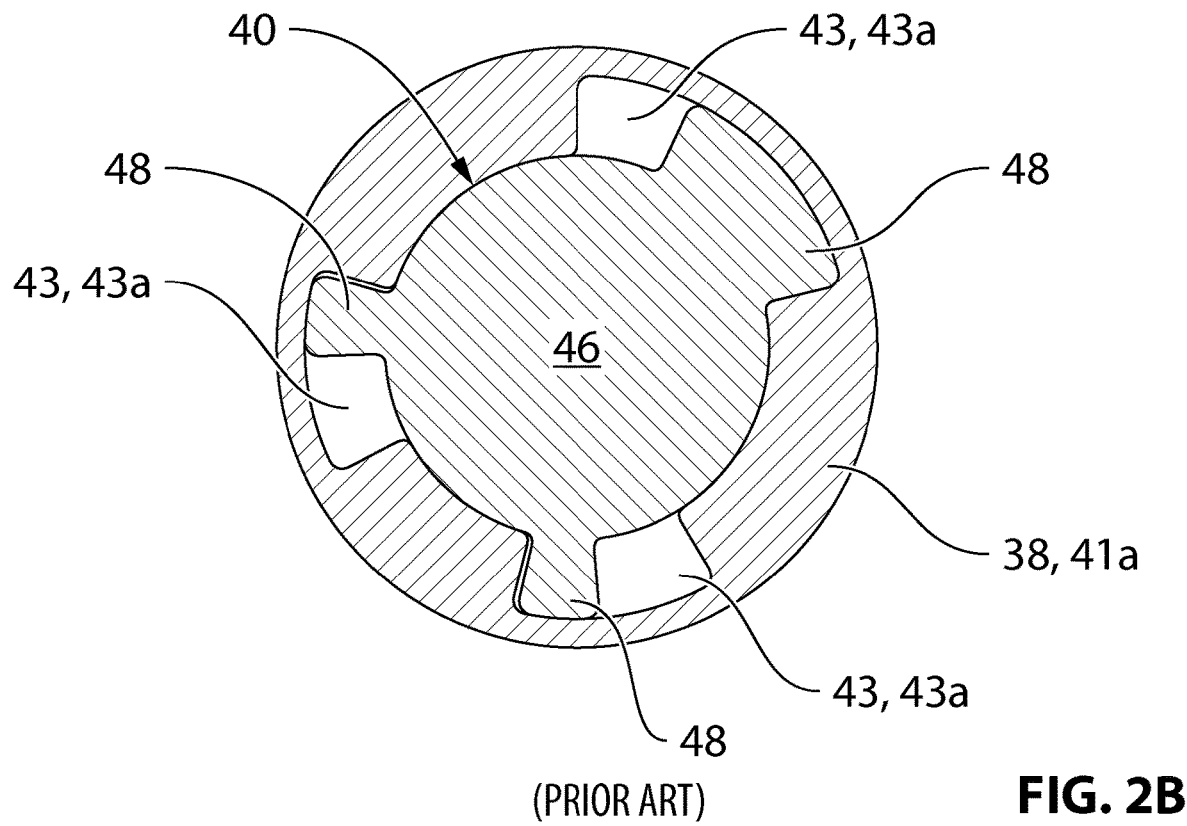
(PRIOR ART) FIG. 2B
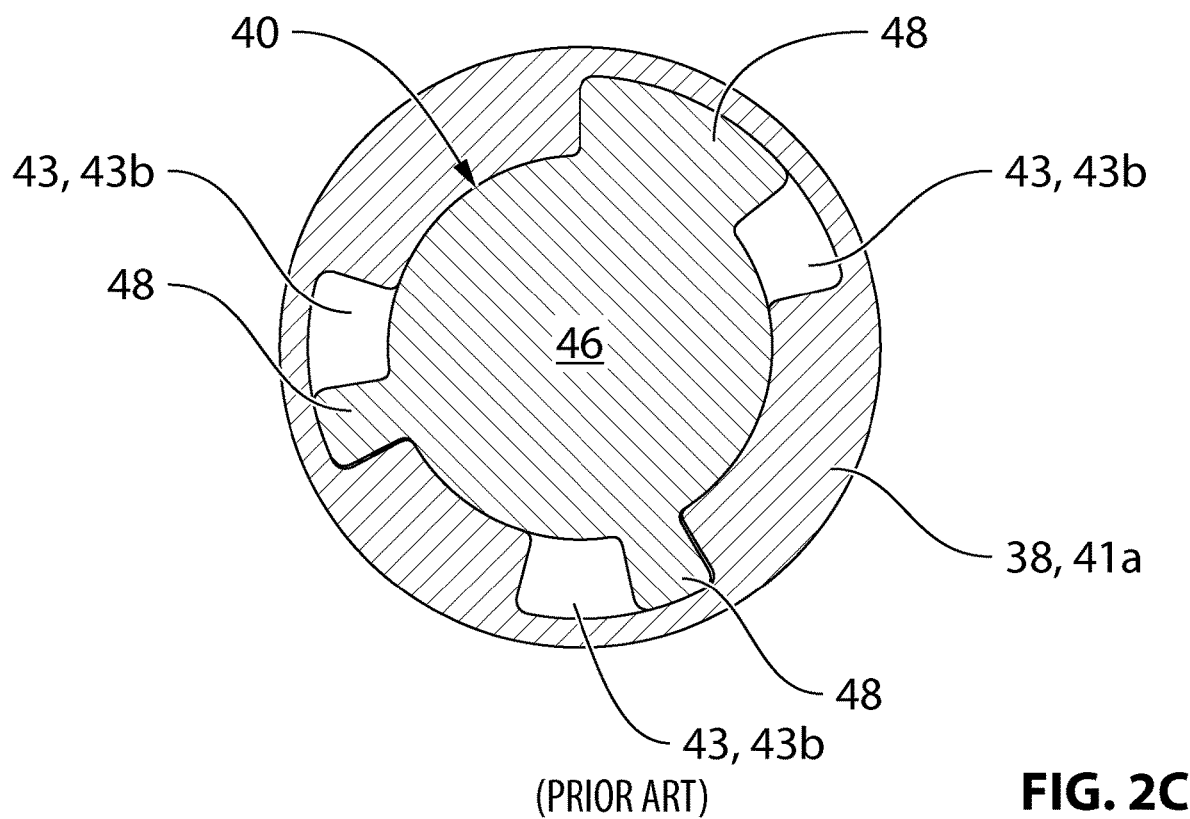
(PRIOR ART) FIG. 2C

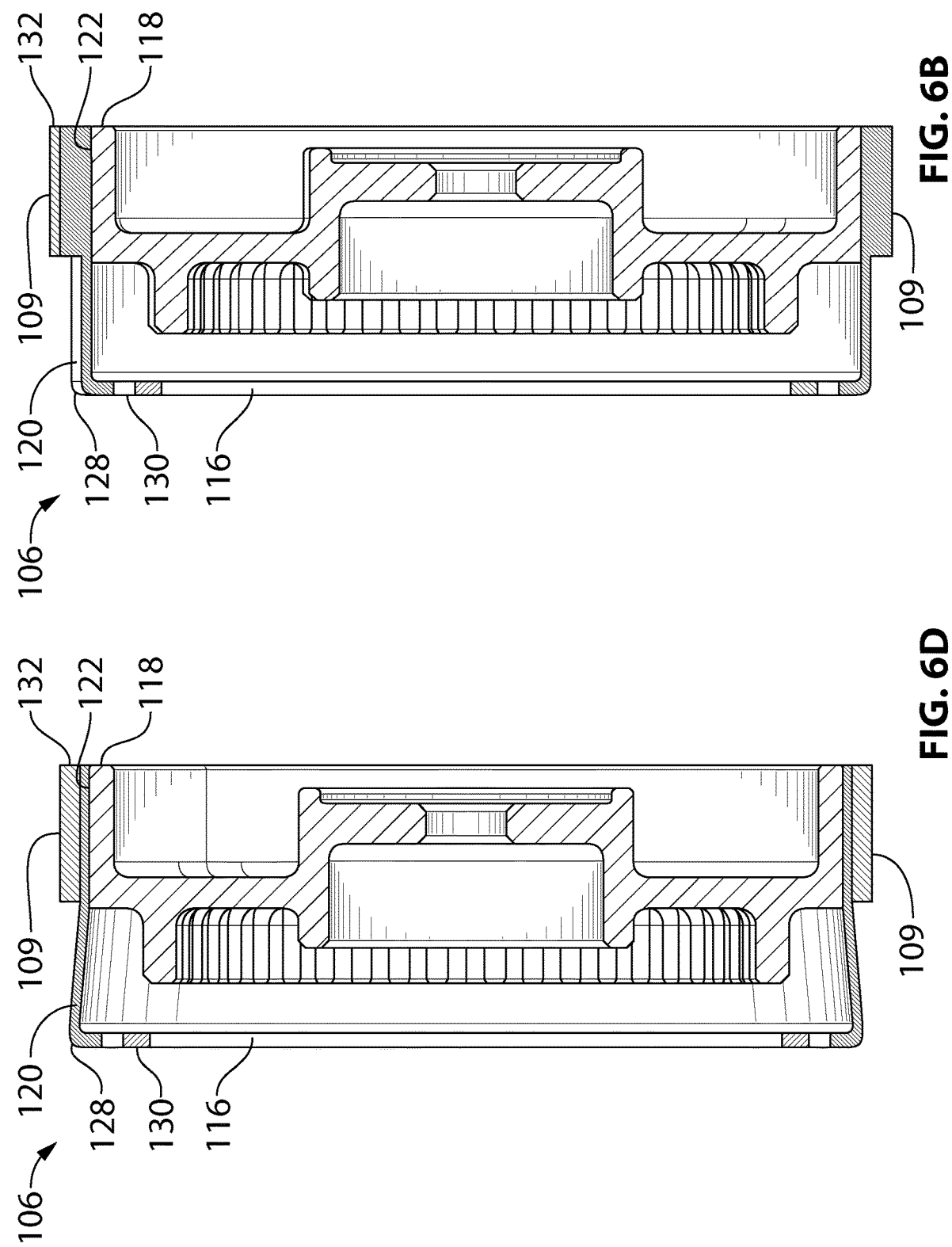

CORRECTIVE TORQUE ADJUSTED BT 20DEG

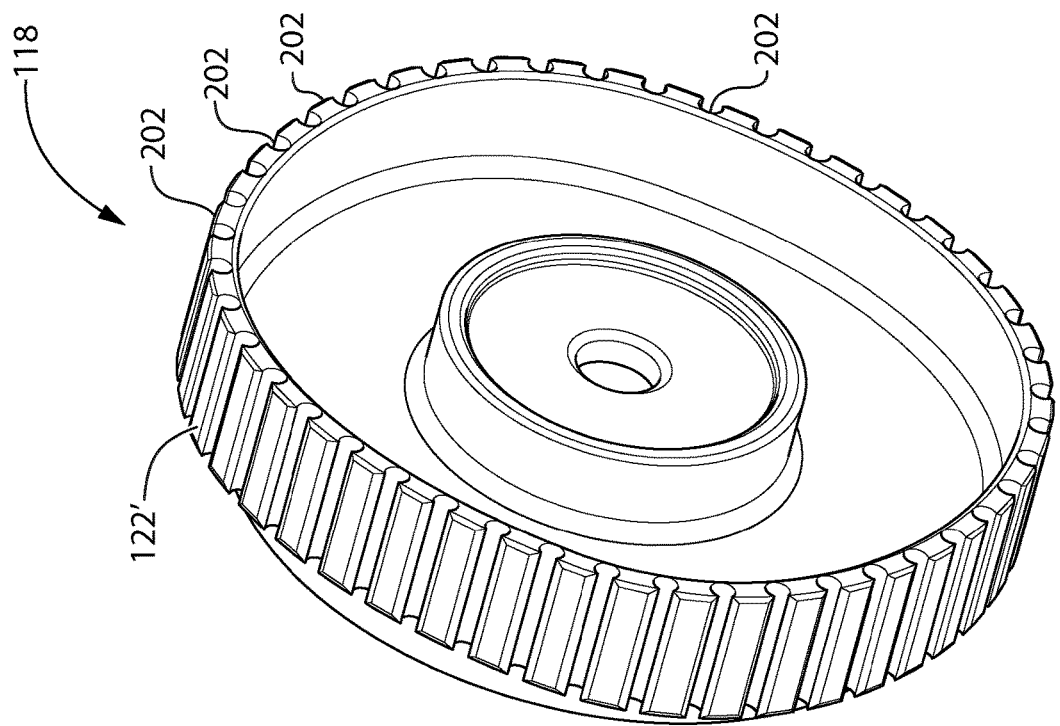
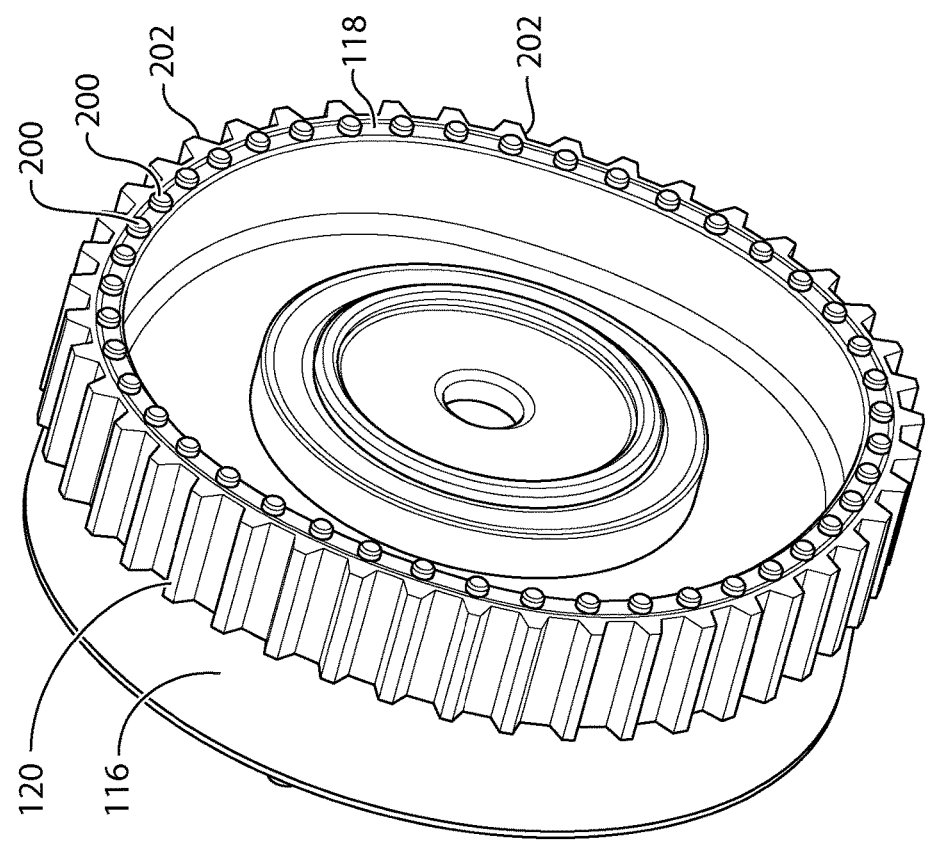
FIG. 10B
FIG. 10A

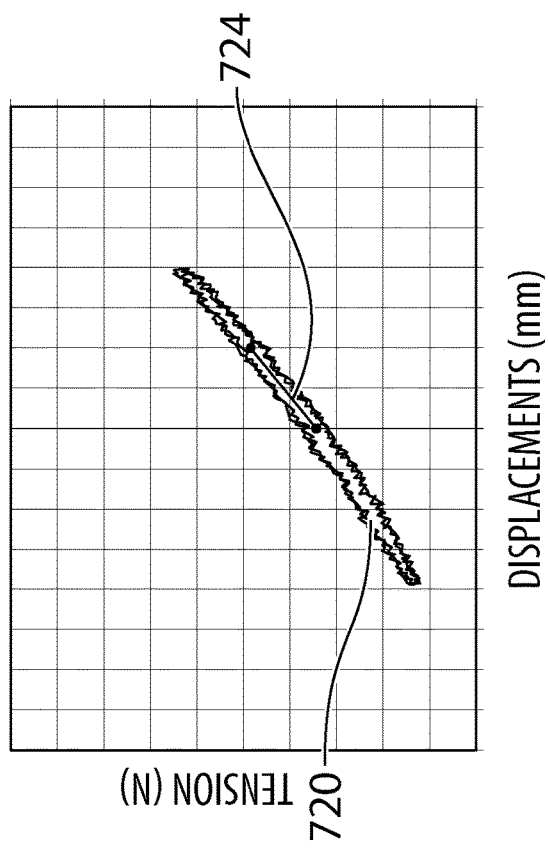
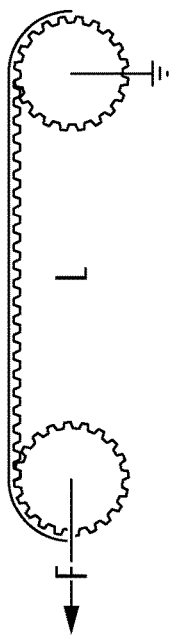
FIG. 15B
FIG. 15C
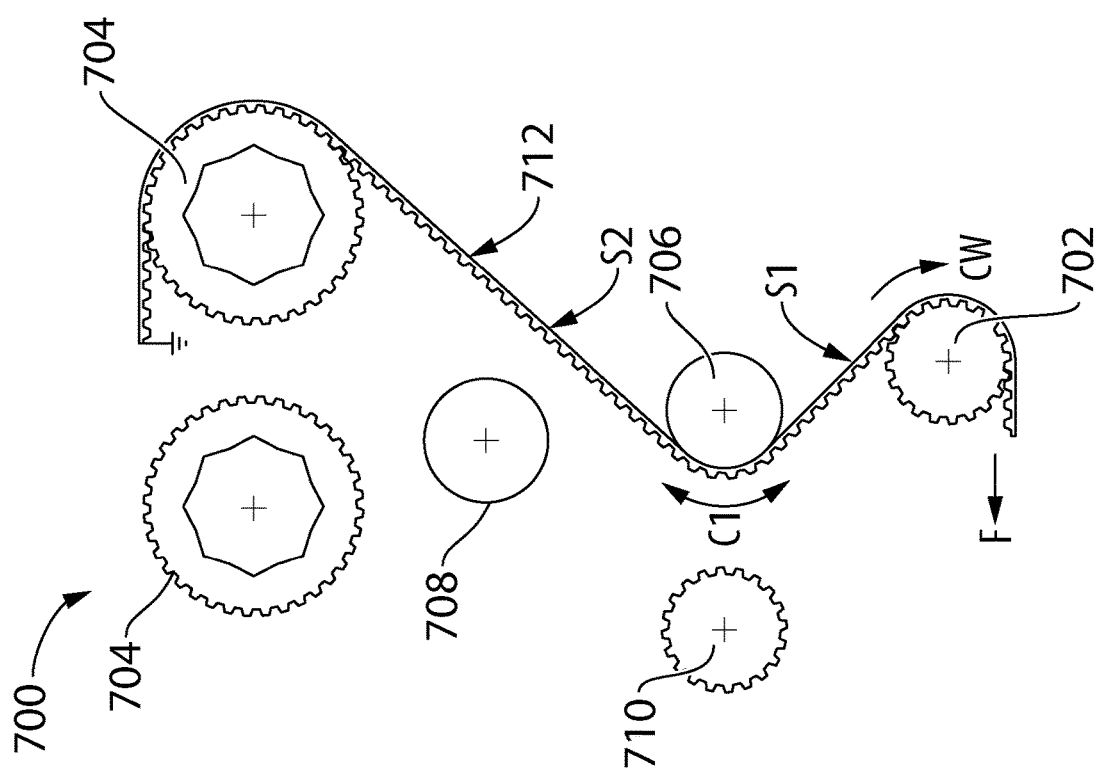
FIG. 15A

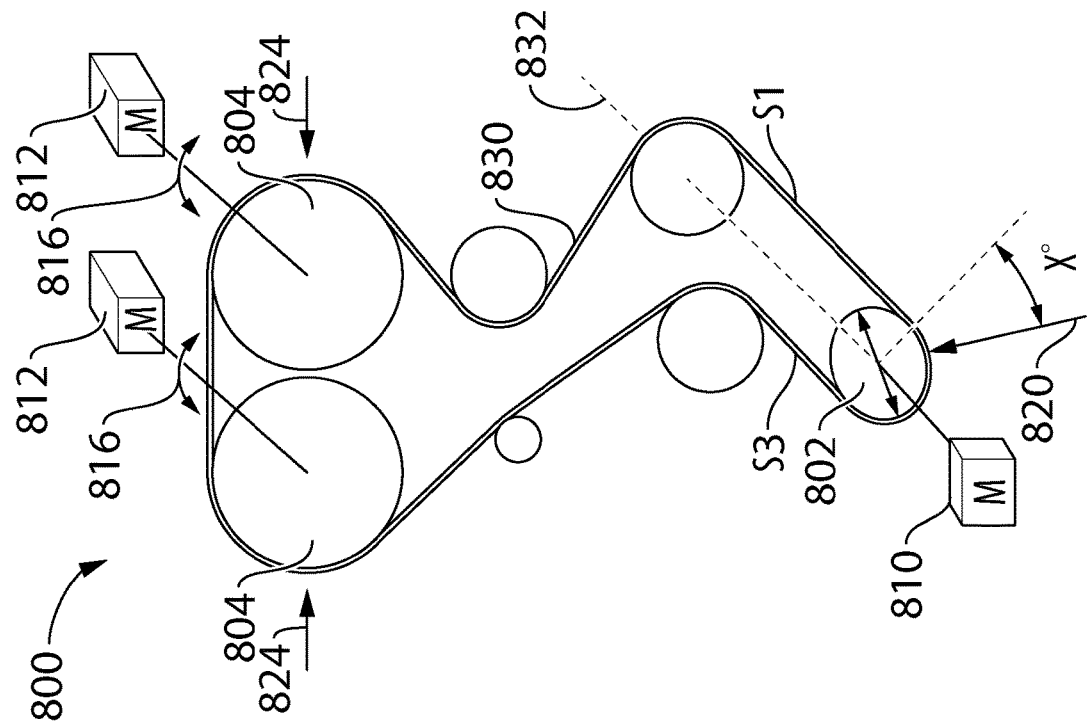
FIG. 17A
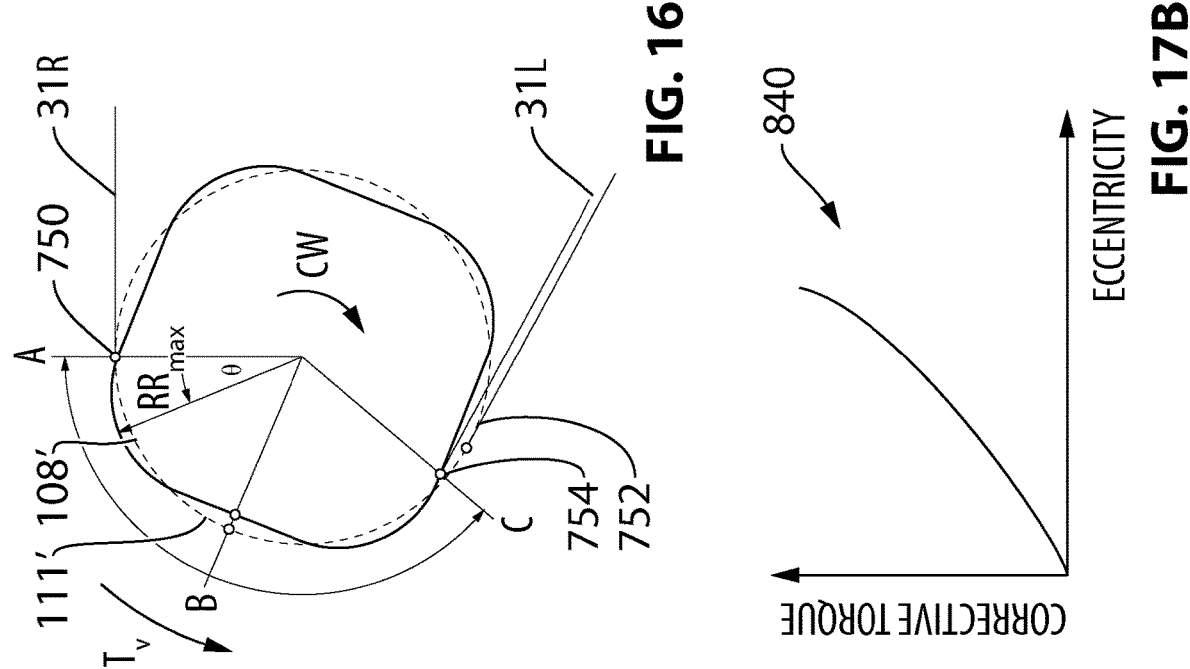
FIG. 16
FIG. 17B

SYNCHRONOUS DRIVE APPARATUS WITH ADJUSTABLE NON-CIRCULAR DRIVE ELEMENTS

CROSS-REFERENCE TO RELATED APPLICATIONS

This application claims priority to and the benefit of U.S. Provisional Patent Application No. 62/436,889 filed Dec. 19, 2016, the contents of which are incorporated herein in their entirety.

FIELD

The subject matter hereof relates to synchronous drive apparatus and more particularly to the reduction of mechanical vibrations in timing drives of internal combustion engines.

BACKGROUND

In a typical internal combustion engine, the energy generated from combusting fuel is used to rotate a crankshaft. The crankshaft rotational force or torque is transmitted to one or more camshafts by a synchronous endless drive arrangement, typically referred to as a timing drive, which includes toothed rotors connected to the crankshaft and camshafts and an elongate drive structure such as a chain or toothed belt to interconnect the crankshaft rotor to the camshaft rotors and rotate them substantially synchronously with one another. The camshafts include cams that selectively open and close intake valves and exhaust valves. The intake valves allow air (and in some engines, fuel) to ingress and fill the combustion chambers of the engine. (In some engines the fuel is directly injected into the combustion chamber through a fuel injection valve rather than the air intake valve.) The air-fuel mixture is then combusted to generate power to rotate the crankshaft. After combustion, exhaust gas is discharged from the combustion chambers through the exhaust valves when they are opened by the corresponding cams.

The intake and exhaust valves and the camshafts that open and close these intake and exhaust valves generate a particularly intense source of mechanical vibrations. The torque of a camshaft fluctuates when it selectively opens and closes the corresponding intake valves or exhaust valves. The intake valves and the exhaust valves are constantly urged by valve springs in a closing direction. When the valves are opened against the force of the springs, torque opposite to the direction of camshaft rotation acts on the camshaft. On the other hand, when the valves are closed, torque in the rotating direction of the camshaft acts on the camshaft. This torque fluctuates the mean or nominal torque required to drive the camshaft and corresponding camshaft rotor and leads to a type of vibration known as torsional vibration or timing error—a variation in the angular position of the camshaft relative to the crankshaft. This occurs because the chain or belt is not entirely rigid but has sufficient elasticity to enable the camshaft rotors to overshoot or undershoot their ideal synchronized positions. When the frequency of the valve torque fluctuations is close to a natural frequency of the timing drive, system resonance occurs. In resonance the camshaft torsional vibrations and the span tension fluctuations of the chain or belt are at their maximum. These effects reduce the service life of the chain or belt and waste energy.

A number of prior art disclosures such as JP H01-95538, DE 19812939, JP 62-192077 attempted to reduce timing drive span tensions by introducing a non-circular, e.g., elliptical or oval, rotor into the timing drive. This prior art positioned the non-circular rotor so as to attempt to equalize tension, i.e., when the span tension was cyclically high (prior to installing the non-circular rotor), the eccentricity and angular position of the non-circular rotor was supposed to reduce span tension and when the span tension was cyclically high (prior to installing the non-circular rotor), the eccentricity and angular position of the non-circular rotor was supposed to increase span tension.

The prior art solutions which attempted to equalize tension do not work and actually make the problem worse.

This can be appreciated from first principles. Generally speaking, resonance occurs in a vibrating system when it is excited by an oscillatory force having a frequency close to a natural frequency of the system. For example, a mass at the end of spring will oscillate when the system is shaken by an oscillating external force. When the shaking occurs at a frequency equal to the natural frequency of the system, the response motion of the mass will be 90 degrees out of phase with the oscillating force and cause the amplitude of mass movement to increase to a maximum.

A similar situation occurs in automotive timing drives as described by the simple physical model of FIG. 1A. The vibrating component is a camshaft rotor of radius R, which has a particular moment of inertia J. The spans of the elongate drive structure provide the elasticity k and damping D in the system. The fluctuating valve torque $T(t)=T_v*\sin(\omega t)$ is an externally applied oscillating force that acts on the camshaft rotor, causing cam torsional vibration. The system equation is $T(t)=J\ddot{\theta}+D\dot{\theta}+K\theta$.

Such a resonant system behaves as shown in the frequency domain graphs of FIG. 1B.

The upper graph 4 of FIG. 1B shows the amplitude of the response or system output, such as span tension or cam torsional vibration. The response is highest for engine speeds close to the natural frequency.

The lower graph 6 of FIG. 1B shows the phase angle of the system response or output, such as span tension or cam torsional vibration, relative to the oscillating valve torque. As will be seen the phase angle varies considerably over the operating speed range and near resonance the response, i.e., cam torsional vibration (measureable in degrees of timing error) or span tension (measureable in Newtons), is 90 degrees out of phase with the fluctuating valve torque. FIG. 1C shows a corresponding relationship plot 8 in the time domain between fluctuating valve torque 8a and span tension 8b over time at an engine speed corresponding to the natural frequency of the timing drive.

The phenomenon of resonance causes the magnitude and phase of span tension and cam torsion vibration to fluctuate considerably, resulting in the significant variation of these parameters over engine speed as shown in a time domain simulation 9 of FIG. 1D, which plots tight side chain tension (in Newtons) for one rotation (in degrees) of the crankshaft rotor at different engine speeds for a particular 4-cylinder dual-overhead cam (DOHC) engine. As will be seen, at each engine speed the chain tension varies cyclically over one complete rotation. In this particular example, the maximum tension (about 1300 N)—and resonance—occurs at an engine speed of about 3000 rpm. Note also that angular position of peak tension varies over engine speed, i.e., the phase of the cyclical tension curve varies over engine speed.

The prior art which sought to equalize tension in the timing drive did so at an inopportune time and with an incorrect force. As seen in FIG. 1C, when the tension 8b is at a maximum, the fluctuating valve torque 8a is at zero. Conversely, when the fluctuating valve torque 8a is zero the tension 8b is at a maximum. Attempting to equalize tension, which is an output of the resonant system, does not address the fluctuating valve torque, which is an input of the resonant system. Indeed, the problem is exacerbated. As shown in FIG. 1E, when, for example, the fluctuating valve torque T(t) is at a maximum $T_v$ in a direction (counter-clockwise) opposite to the direction of rotation (clockwise), the concept of tension equalization would orient the non-circular rotor at this instant as shown as this orientation would appear to alleviate the tension. However, tension and torque are not in phase so addressing the former does not address the latter. Instead, orientating the non-circular rotor in this manner introduces an additive fluctuating torque as schematically illustrated in FIG. 1E because the non-circular rotor pulls or stretches the elongate drive structure on one (left) side to generate marginal tension $F_L$ (in comparison to the situation when a circular rotor is installed) and relieves or relaxes the elongate drive structure on the other (right) side to generate marginal tension $F_R$ (in comparison to the situation when a circular rotor is installed). The marginal tensions generate an additive fluctuating torque $T_C$ that reinforces the fluctuating valve torque T(t), causing the system input excitation to increase. The end result is that the outputs of the resonant timing drive, such as span tension fluctuation and cam torsional vibration, also increase.

In U.S. Pat. No. 7,232,391, entitled "Synchronous Drive Apparatus with Non-Circular Drive Elements", the contents of which are incorporated herein in their entirety, Gajewski of Litens Automotive realized that the "best cure" for cam torsional vibrations and span tension fluctuations caused by the opening and closing of the intake and exhaust valves, (which function as a source of torque fluctuations that cause the camshafts to be inflicted with speed fluctuations, which in turn, cause angular position fluctuations/torsional vibrations) is to attack the cause right at the source by introducing another torque acting on the camshaft through the use of a non-circular rotor which, while rotating, introduces fluctuations of span length by pulling and relieving the elongate drive structure n times per crankshaft revolution (n being related to the specific shape of the non-circular rotor and its position in the timing drive) such that when the tight side of the elongate drive structure is pulled the slack side thereof is relieved, and vice versa. The pulling and relieving of the elongate drive structure generates a new additional fluctuating torque at the camshaft to balance or counteract the fluctuating valve torque. Continuing with the previous example, as shown in FIG. 1F, when the fluctuating valve torque T(t) is at a maximum $T_v$ in a direction (counter-clockwise) opposite to the direction of rotation (clockwise), Litens taught to orient the non-circular rotor at this instant as shown to pull or stretch the elongate drive structure on one (right) side to generate marginal tension $F_R$ and relieve or relax the elongate drive structure on the other (left) side to generate marginal tension $F_L$. Although this is counter-intuitive because it appears to increase belt tension, the Litens solution is based on correct dynamic reasoning. The marginal tensions generate a corrective fluctuating torque $T_C$ that counteracts or works against the fluctuating valve torque T(t) to thereby reduce the system input excitation, with the end result being that the outputs of the resonant drive, such as span tensions and cam torsional vibration, are decreased. In short, the Litens solution works because it attacks the source of the disease.

Litens also contributed to the state of the art by recognizing that the dominant force generated by non-circular rotors in automotive timing drives arises from fluctuations of span length caused by pulling and relieving the elongate drive structure; forces governed by Hookes Law. Forces generated by other physical effects, such as changes in moment arm, are negligible and implementation based primarily on such effects leads to nonsensical eccentricities in automotive timing drives.

Litens recognized that the non-circular sprocket could be applied to counteract any source of torsional vibration in a synchronous system, as the solution could be applied to counteract any driven rotor coupled to a rotary load assembly which presents a periodic fluctuating load torque when driven in rotation. For example, the timing drive can also drive other components which cause mechanical vibrations, such as a fuel injection pump. A fuel pump can convert rotation of a pump rotor into reciprocal motion to reciprocate a piston. The reciprocation of the piston introduces fuel from a fuel tank into a pressurizing chamber of the pump. The piston then pressurizes the fuel and supplies the fuel to the fuel injection valves. The fuel injection pump applies a reactive force on the pump rotor. The magnitude of the reactive force during its suction stroke is different from the magnitude during its compression stroke. In other words, the magnitude of the reactive force fluctuates. Therefore, the actuation of the fuel injection pump can also cause a fluctuating reactive torque at the pump rotor, leading to another source of torsional vibration in the timing drive system.

Furthermore, Litens disclosed that the resonant system input excitation could derive from multiple sources. For example, in a DOHC engine where the timing drive drives each of the intake and exhaust camshafts, the concatenation of the fluctuating valve torques generated from both camshafts presents a fluctuating load torque that can be counteracted by a non-circular rotor. Likewise, in an engine where a fuel pump is present, a combination of the fluctuating fuel pump torque and fluctuating valve torques presents a fluctuating load torque that can be counteracted by a non-circular rotor.

Litens thus presented an apparatus and method of reducing torsional vibrations in a synchronous drive apparatus having a continuous-loop elongate drive structure with a plurality of engaging sections (such as belt teeth or chain links), a plurality of rotors including at least a first and a second rotor, wherein the first rotor has a plurality of teeth for engaging the engaging sections of the elongate drive structure, and the second rotor has a plurality of teeth for engaging the engaging sections of the elongate drive structure; wherein the elongate drive structure is engaged about the first and second rotors, the first rotor being arranged to drive the elongate drive structure and the second rotor being arranged to be driven by the elongate drive structure; and wherein a rotary load assembly is coupled to the second rotor such as to present a periodic fluctuating load torque when driven in rotation. One of the rotors has a non-circular profile having at least two protruding portions alternating with receding portions, wherein the angular positions of the protruding and receding portions of the non-circular profile relative to the angular position of the second rotor, and the magnitude of the eccentricity of the non-circular profile, are such that the non-circular profile applies to the second rotor an opposing fluctuating corrective torque which reduces or substantially cancels the fluctuating load torque of the rotary load assembly.

SUMMARY

The Litens solution, which has been marketed as Smart-procket® technology and widely deployed on torsionally active engines, is known for reducing timing drive span tensions and cam torsional vibrations, leading to increased service life of timing drive belts and chains. This disclosure improves upon the technology known heretofore by introducing an apparatus and method that can more precisely tailor a fluctuating corrective torque generated by a non-circular rotor to counteract a fluctuating load torque whose phase varies at a given engine speed, as may occur, for example, in variable valve train (VVT) engines.

Generally speaking, the invention provides apparatus and method(s) for changing a phase angle of a fluctuating corrective torque generated by a non-circular rotor in a synchronous drive arrangement relative to the drive rotor, such as a crankshaft.

According to one aspect of the invention, a corrective system is provided for an internal combustion engine, which has a crankshaft driven by combustion energy, a camshaft that actuates one or more combustion valves, and a variable valve timing (VVT) system for controlling the timing of the actuation of the one or more valves by the camshaft relative to the crankshaft. The corrective system includes a cam rotor that is operatively connectable with the camshaft, and a synchronous endless drive arrangement including a continuous-loop elongate drive structure engaging the crankshaft and the non-circular rotor. The cam rotor has a peripheral edge engaging the elongate drive structure. This peripheral edge has a non-circular profile including a plurality of protruding rotor portions which alternate with a plurality of receding rotor portions. The angular positions of the protruding and receding rotor portions are adjustable relative to the crankshaft, and an actuator adjusts the angular positions of the protruding and receding rotor portions relative to the angular position of the crankshaft during operation of the engine.

According to this aspect of the invention, the actuator preferably adjusts the angular positions of the protruding and receding rotor portions so as to be fixed relative to the camshaft. The camshaft, when driven in rotation, presents a periodic fluctuating load torque on the cam rotor due to the actuation of the one or more valves. The magnitude of the eccentricity of the non-circular profile and the angular positions of the protruding and receding rotor portions are such that the non-circular profile periodically elongates and contracts portions of the elongate drive structure so as to apply to the cam rotor an opposing fluctuating corrective torque that substantially counteracts the fluctuating load torque. By keeping the angular positions of the protruding and receding rotor portions be fixed relative to the camshaft the phase of the fluctuating corrective torque is fixed relative to the fluctuating load torque.

The fluctuating corrective torque can counteract the fluctuating load torque at least when the VVT system is set to a nominal cam timing and the engine speed corresponds to a speed where the synchronous endless drive arrangement experiences resonance.

The VVT system will vary the phase angle of the fluctuating load torque relative to the angular position of the crankshaft and the actuator can vary the phase angle of the fluctuating corrective torque to the same extent relative to the angular position of the crankshaft.

The camshaft, when driven in rotation, presents a periodic fluctuating load torque on the non-circular rotor due to the actuation of the one or more valves. The magnitude of the eccentricity of the non-circular profile and the angular positions of the protruding and receding rotor portions can be such that the non-circular profile substantially reduces camshaft timing error in comparison to the timing error experienced by the camshaft if the cam rotor was circular.

The camshaft timing error can be reduced at least when the VVT system is set to a nominal cam timing and the engine speed corresponds to a speed where the synchronous endless drive arrangement experiences resonance.

The actuator for the VVT system can also function as the actuator for the corrective system.

According to another aspect of the invention, a corrective system is provided for an engine having a crankshaft, a camshaft for actuating a plurality of valves for the engine, and including a variable valve timing system for controlling the timing of the actuation of the valves by the camshaft. The system includes a torque correction rotor that is driven by the crankshaft and is operatively connectable with the camshaft, wherein the torque correction rotor has a peripheral edge with an average rotor diameter and with a plurality of protruding rotor portions that extend radially beyond the average diameter which alternate with a plurality of receding rotor portions that extend radially less than the average diameter, wherein the torque correction rotor is engageable at the peripheral edge with a synchronous endless drive structure which transfers torque between the crankshaft and the camshaft, wherein the protruding rotor portions and the receding rotor portions have angular positions that are adjustable relative to the crankshaft. An actuator is operatively connected to the torque correction rotor, the actuator being able to adjust the angular positions of the protruding and receding rotor portions relative to the crankshaft during operation of the engine.

According to this aspect of the invention, the angular positions of the protruding and receding rotor portions can be fixed relative to the camshaft. The protruding and receding rotor portions can remain in a fixed angular position relative to the camshaft during adjustment of the angular position of the camshaft relative to the crankshaft.

The torque correction rotor can include an outer member having a toothed ring that is flexible, wherein the toothed ring defines the peripheral edge that is engageable with the synchronous elongate drive structure; and a hub having a peripheral edge with an average hub diameter and with a plurality of protruding hub portions that extend radially beyond the average hub diameter which alternate with a plurality of receding hub portions that extend radially less than the average hub diameter, wherein the peripheral edge of the hub radially supports the toothed ring such that the angular positions of the protruding and receding hub portions at least in part determine the angular positions of the protruding and receding rotor portions. The hub and the outer member can be releasably rotationally lockable to one another, wherein the actuator drives rotational movement of the hub and outer member relative to one another to adjust the angular positions of the protruding and receding hub portions relative to the outer member.

The toothed ring can have a circumference and has a radial thickness that is constant about the circumference. Alternatively, the toothed ring can have a circumference and a radial thickness that varies about the circumference, such that the eccentricity of the protruding rotor portions and of the receding rotor portions depends on both the angular position of the hub and on the angular position of the toothed ring.

The actuator can be a hydraulic actuator comprising a rotary piston and cylinder combination, wherein the hub is connected to one of the piston and cylinder and the outer member is connected to the other of the piston and cylinder. Alternatively, the actuator can be an electric actuating comprising an electric motor which drives the hub via a geartrain.

The toothed ring can include an inverted tooth chain that is mounted to a radially flexible chain support member. The hub can radially support the toothed ring via a plurality of rollers. Each of the rollers can be supported in a roller pocket on the hub and project radially from the roller pocket to support the toothed ring.

The torque correction rotor can include a sleeve that is disposed radially between and independently movable relative to the hub and the toothed ring, wherein the sleeve has a circumference and a radial thickness that varies about the circumference such that the eccentricity of the protruding rotor portions and of the receding rotor portions depends on both the angular position of the hub and on the angular position of the sleeve.

The corrective system can also include a first intermediate rotor, and a second intermediate rotor that is releasably rotationally lockable to the first intermediate rotor, wherein the endless drive arrangement includes a first synchronous continuous-loop elongate drive structure that extends between the torque correction rotor and the first intermediate rotor, and wherein the variable valve timing system further includes a second synchronous continuous-loop elongate drive structure that extends between the second intermediate rotor and a crankshaft rotor on the crankshaft.

The angular positions of the protruding and receding rotor portions can also be based on a phase angle of the fluctuating load torque applied to the camshaft by the combustion valves.

According to another aspect of the invention a torque correction system is provided for an engine having a load and a load input shaft for applying power to overcome the load. The torque correction system includes: a torque correction rotor that is driven by the crankshaft and is operatively connectable with the load input shaft, wherein the torque correction rotor has a peripheral edge with an average diameter and with a plurality of protruding rotor portions that extend radially beyond the average diameter which alternate with a plurality of receding rotor portions that extend radially less than the average diameter, wherein the torque correction rotor is engaged at the peripheral edge with a synchronous continuous-loop elongate drive structure to transfer torque between the crankshaft and the load input, wherein the protruding rotor portions and the receding rotor portions have angular positions that are adjustable relative to the crankshaft; and an actuator operatively connected to the torque correction rotor, wherein the actuator is actuatable to adjust the angular positions of the protruding and receding rotor portions relative to the crankshaft during operation of the engine.

According to another aspect of the invention, a torque correction system is provided for an engine including a crankshaft, a camshaft for actuating a plurality of valves for the engine, and including a variable valve timing system for controlling the timing of the actuation of the valves by the camshaft, wherein the valves apply a fluctuating load torque on the camshaft during operation of the engine, the torque correction system including: a torque correction rotor that is driven by the crankshaft and is operatively connectable with the camshaft, which rotor has a peripheral edge that is engaged with a synchronous continuous-loop elongate drive structure so as to transfer torque between the crankshaft and the camshaft, wherein the peripheral edge of the torque correction rotor has a non-circular profile which causes the elongate drive structure to apply a fluctuating corrective torque of varying magnitude to the camshaft that at least partially cancels the fluctuating load torque; and an actuator that is actuatable to move the non-circular profile to shift a phase angle of the fluctuating corrective torque relative to the crankshaft.

The actuator can shift the phase angle of the fluctuating corrective torque to match a phase angle of the fluctuating load torque such that the fluctuating corrective torque substantially counteracts the fluctuating load torque at all phase angles of the fluctuating load torque over at least a range of engine speeds.

According to another aspect of the invention a synchronous drive apparatus, is provided. The apparatus includes: a continuous-loop elongate drive structure having a plurality of engaging sections; a plurality of rotors comprising at least a first and a second rotor, the first rotor having a plurality of teeth for engaging the engaging sections of the elongate drive structure, and the second rotor having a plurality of teeth for engaging the engaging section of the elongate drive structure; the elongate drive structure being engaged about the first and second rotors, the first rotor being arranged to drive the elongate drive structure and the second rotor being arranged to be driven by the elongate drive structure; a rotary load assembly coupled to the second rotor, the rotary load assembly being such as to present a periodic fluctuating load torque when driven in rotation. One of the rotors has a non-circular profile having at least two protruding portions alternating with receding portions, wherein the angular positions of the protruding and receding portions of the non-circular profile relative to an angular position of the periodic fluctuating load torque present on the second rotor, and the magnitude of the eccentricity of the non-circular profile enables the rotor having the non-circular profile to apply to the second rotor an opposing fluctuating corrective torque which reduces or substantially cancels the fluctuating load torque of the rotary load assembly. The rotary load assembly generates a fluctuating load torque whose phase angle can shift relative to the first rotor and the apparatus includes means for shifting the phase angle of the fluctuating corrective torque to maintain the reduction or substantial cancellation of the fluctuating load torque.

According to another aspect of the invention there is provided a method of operating a synchronous endless drive arrangement for an internal combustion engine having a crankshaft and camshaft with a variable valve timing arrangement, wherein a fluctuating load torque is applied by a plurality of combustion valves on the camshaft. The method includes: a) operating the engine; b) applying a corrective torque on the camshaft to substantially cancel out the load torque whilst the engine operates; c) changing a timing between the camshaft and the crankshaft, thereby changing a phase angle for the load torque whilst the engine operates; and d) changing a phase angle of the corrective torque to maintain substantial cancellation of the load torque whilst the engine operates.

According to another aspect of the invention there is provided a method of operating a synchronous endless drive arrangement for an internal combustion engine having a crankshaft and a camshaft with a variable valve timing (VVT) arrangement, wherein a fluctuating load torque is applied by at least one combustion valve on the camshaft, the method including: (a) operating the engine; (b) applying a fluctuating corrective torque on the camshaft to substantially counteract the fluctuating load torque, whilst the engine operates with the VVT in a nominal timing position;

(c) varying the timing between the camshaft and the crankshaft, thereby varying a phase angle of the fluctuating load torque relative to the crankshaft, whilst the engine operates; and (d) in conjunction with (c), varying a phase angle of the fluctuating corrective torque relative to the crankshaft to maintain substantial counteraction of the fluctuating load torque.

In this method, the fluctuating corrective torque can be generated by the synchronous endless drive arrangement, which includes an elongate drive structure and a rotor in engagement therewith. The said rotor has a non-circular profile having at least two protruding portions alternating with receding portions such that the non-circular profile periodically elongates and contracts portions of the elongate drive structure to generate said fluctuating corrective torque. The non-circular profile has major radii defined in the protruding portions and the angular orientation of the non-circular rotor can be such that (i) when the engine in the nominal VVT position, (ii) the engine is operating at a speed subject to resonance and (iii) the fluctuating load torque is at a maximum in a direction opposite the direction of the rotation of the synchronous drive arrangement, one of said major radii is located along the wrap of the elongate drive structure about the non-circular rotor in an angular range commencing from after a tangent point of a tight side of the elongate drive structure to a position up to one half of the wrap length. The non-circular rotor is preferably a cam rotor and the major radii is preferably located at an angle θ commencing from the tight side tangent point along the rotor wrap plus/minus an angular range corresponding to four cam teeth, where θ is a solution under 90 degrees to sin(n*θ)=1, where n is the number of protrusions, n being 2, 3, 4, 5 or 6.

According to another aspect of the invention there is provided a method of operating a synchronous endless drive arrangement for an internal combustion engine having a crankshaft and a camshaft with a variable valve timing (VVT) arrangement, wherein a fluctuating load torque is applied by a at least one combustion valve on the camshaft, the method including: (a) operating the engine; (b) whilst the engine operates with the VVT in a nominal timing position, utilizing a non-circular camshaft rotor having at least two protruding portions alternating with receding portions in a nominal angular orientation with respect to the angular position of the crankshaft in order to substantially reduce camshaft timing error in comparison to camshaft timing error experienced by a comparative circular camshaft rotor; (c) varying the timing between the camshaft and the crankshaft whilst the engine operates; and (d) in conjunction with (c), varying the angular orientation of the non-circular camshaft rotor with respect to the angular position of the crankshaft so as to maintain reduced camshaft timing error.

BRIEF DESCRIPTIONS OF DRAWINGS

For a better understanding of the various embodiments described herein and to show more clearly how they may be carried into effect, reference will now be made, by way of example only, to the accompanying drawings in which:

FIG. 2B is a sectional elevation view of the VVT system shown in FIG. 2A, in an advanced position;

FIG. 2C is a sectional elevation view of the VVT system shown in FIG. 2A, in a retarded position;

FIG. 6B is a sectional side elevation view of the torque correction rotor shown in FIG. 6A;

FIG. 6D is a sectional side elevation view of the torque correction rotor shown in FIG. 6C;

FIGS. 10A and 10B are perspective views of a variant of the torque correction rotors shown in FIGS. 5A-9B, in which rollers are provided between a hub and an outer member;

FIG. 15A is a schematic diagram of a first methodology for testing coefficient of stiffness of a drive structure;

FIG. 15B is a graph illustrating how the stiffness coefficient can be derived from a tension vs. displacement plot;

FIG. 15C is a schematic diagram of a second methodology for the testing coefficient of stiffness of the drive structure;

FIG. 16 is a schematic diagram illustrating differences in arc length between a circular rotor and a non-circular rotor;

FIG. 17A is a schematic diagram of a test stand for measuring the magnitude of corrective torque generated by a non-circular rotor; and FIG. 17B is a graph of magnitude of corrective torque as a function of magnitude of eccentricity of a non-circular rotor, which can be derived from the test stand shown in FIG. 17A.

DETAILED DESCRIPTION

Figure 1A:
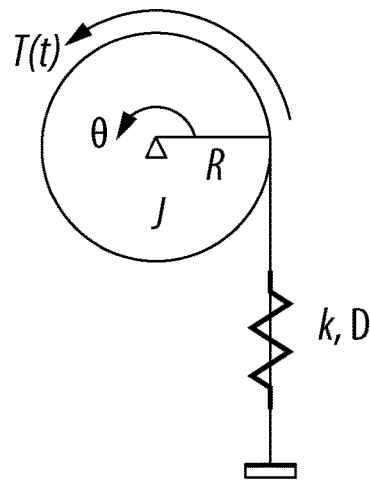
FIG. 1A is a schematic diagram of a mathematical model of a timing drive.
Figure 1B:
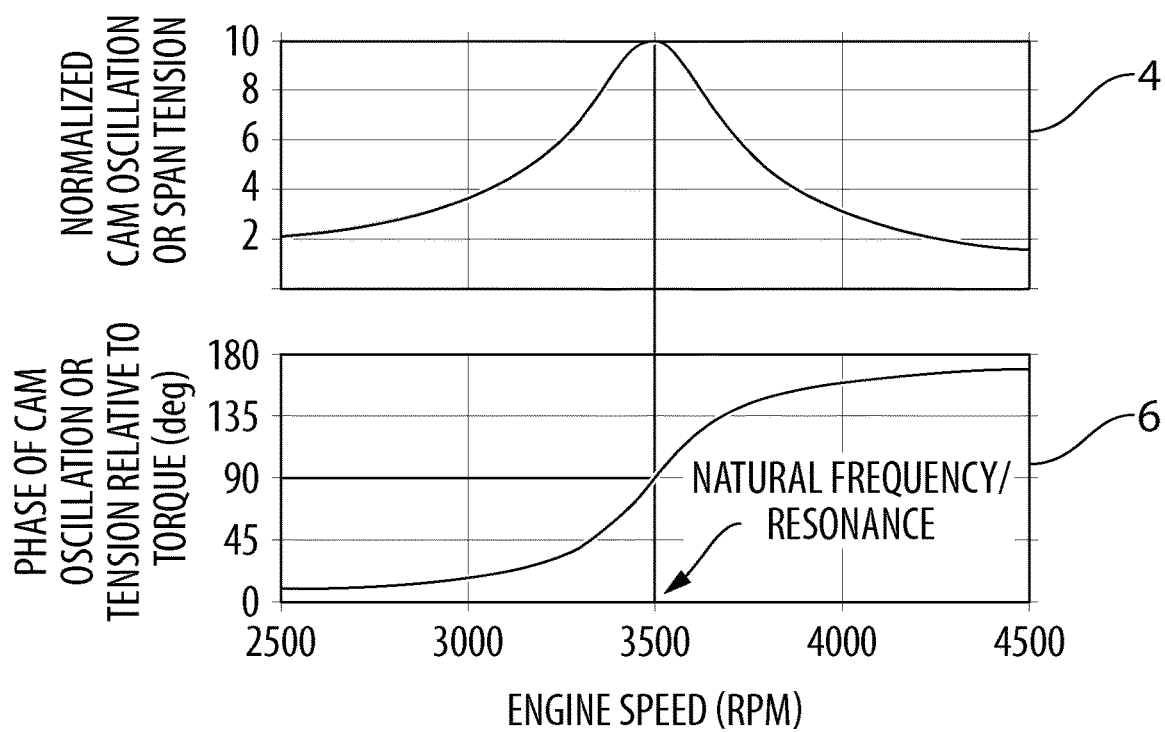
FIG. 1B is a frequency domain plot of the magnitude and phase response of a resonant system.
Figure 1C:
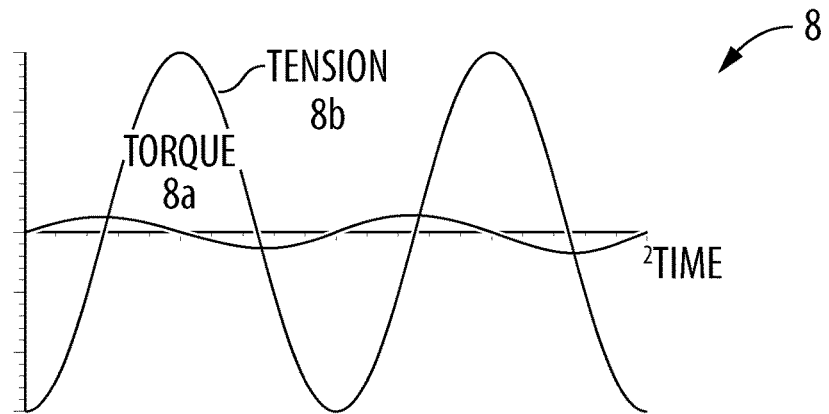
FIG. 1C is a time domain plot of timing drive load torque and span tension over time.
Figure 1D:
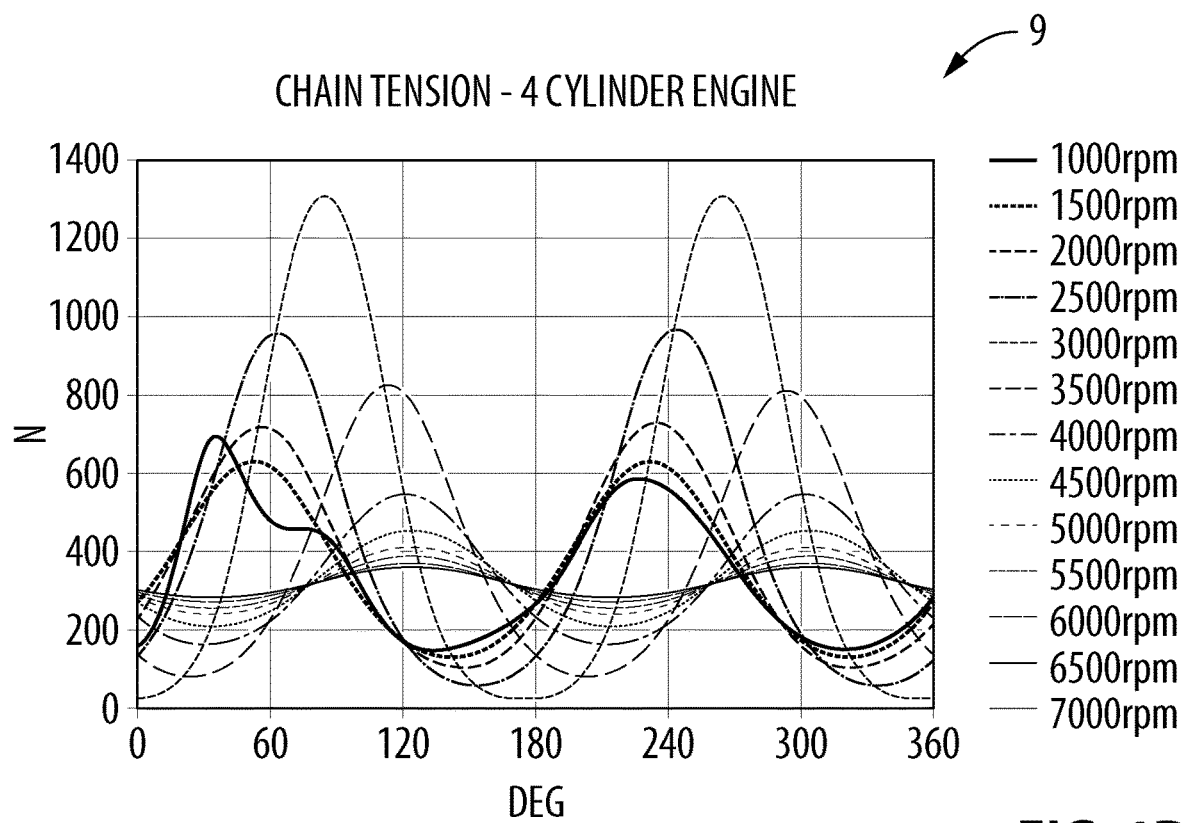
FIG. 1D is a plot of tight side chain tension for a particular 4 cylinder DOHC engine at various engine over crank angle.
Figure 1E:
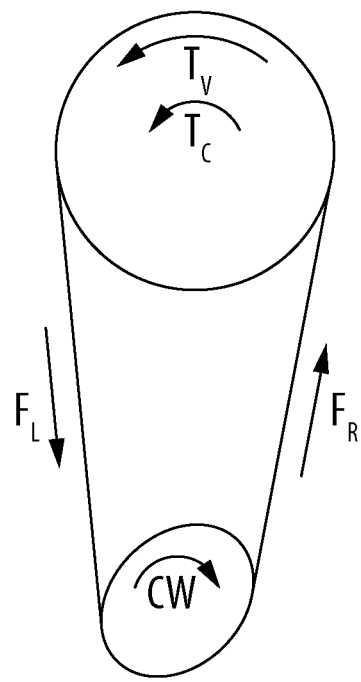
FIGS. 1E and 1F are schematic diagrams illustrating forces in a timing drive with non-circular driving rotors.
Figure 1F:
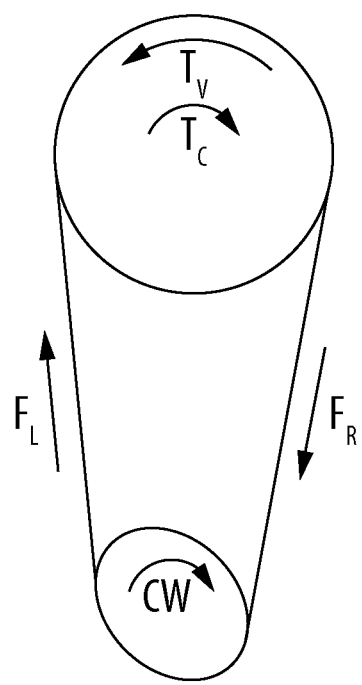
Figure 2:
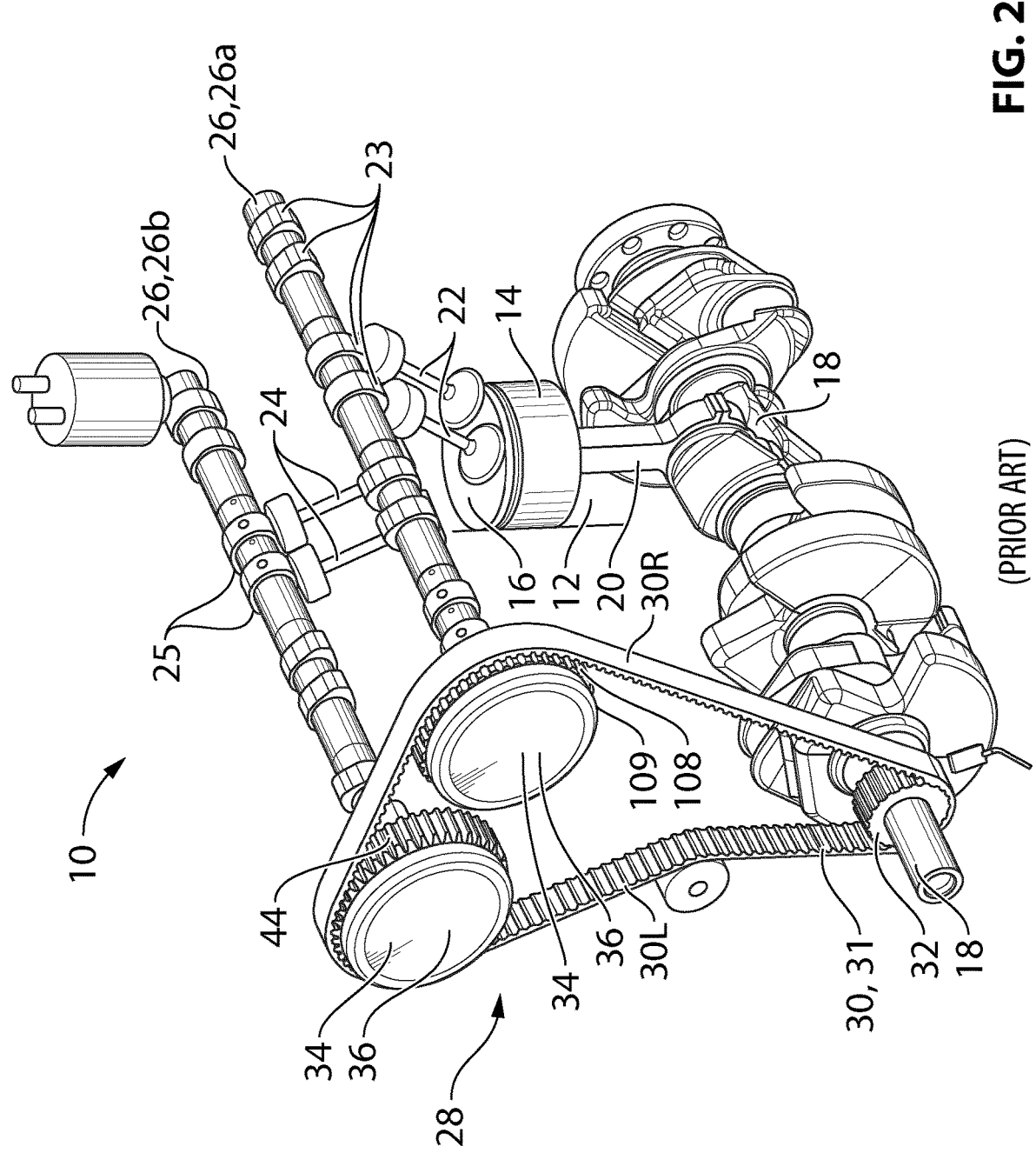
FIG. 2 is a perspective view of an engine according to the prior art.

FIG. 2 shows a simplified representation of an internal combustion engine 10 (with the engine block and cylinder head not shown so as not to obscure the components contained therein). The engine 10 includes a plurality of cylinders, one of which is represented at ref. no. 12. Each cylinder has a piston 14 that reciprocates therein. The portions of the cylinders that are forward of the pistons are the combustion chambers, shown at 16. In each combustion chamber 16, repeated cycles are carried out in which fuel and air are taken in, the mixture of the fuel and air is combusted, and the combustion products are expelled. These combustion cycles generate power that drive the reciprocating motion of the piston 14. Each piston 14 is operatively connected to a crankshaft 18 by a connecting rod 20. As a result, the reciprocating motion of the pistons 14 results in rotational motion of the crankshaft 18. While the engine 10 shown in FIG. 2 is a four-stroke, four-cylinder engine, it will be understood that the engine 10 could alternatively have any other number of cylinders.

Valves are provided for each cylinder to control the intake of air and the discharge of the combustion products to and from the combustion chambers. Intake valves 22 control the intake of air, while exhaust valves 24 control the discharge of the combustion products. While the engine 10 shown in FIG. 2 has four valves per cylinder (two intake valves 22 and two exhaust valves 24), it will be understood that the engine 10 may have any other suitable number of intake and exhaust valves 22 and 24.

The engine 10 includes at least one camshaft 26 to actuate the valves in the proper sequence. In the example shown, two camshafts 26 are provided, namely, an intake camshaft 26a that is positioned for actuating the intake valves 22 via cams 23 and an exhaust camshaft 26b that is positioned for actuating the exhaust valves 24 via cams 25.

A synchronous endless drive arrangement such as timing drive 28 is provided to drive the camshafts 26 using power from the crankshaft 18 and to substantially maintain a selected timing between the opening and closing of the valves 22 and 24 for each cylinder 12 and the position of each associated piston 14 for that cylinder 12, so that the valves 22 and 24 open and close at the desired point in the motion of the associated piston 14.

The timing drive 28 transmits force between the crankshaft 18 and the camshafts 26 and includes a continuous-loop elongate drive structure 30 that engages a crankshaft rotor 32 and a camshaft rotor 34 on each of the camshafts 26. The elongate drive structure 30 has a plurality of engaging sections for engaging complementary engaging sections in the rotors in order to substantially maintain the selected timing between components. The elongate drive structure 30 may be a timing belt 31 (shown in FIG. 2) having belt teeth as engaging sections, in which case, the crankshaft rotor 32 and camshaft rotors 34 may be pulleys having teeth as the complementary engaging sections. Alternatively, the elongate drive structure 30 may be a timing chain having chain links as engaging sections, in which case, the crankshaft rotor 32 and camshaft rotors 34 may be sprockets having teeth as the complementary engaging sections.

With the crankshaft direction of rotation being clockwise in FIG. 2, the right side 30R of the elongate drive structure 30 will have a higher tension (the "tight side") than the left side 30L of the elongate drive structure 30 (the "slack" side).

The particular timing of the actuation of the valves 22 and 24 can be varied in order to modify the operating characteristics of the engine 10. For example, at low RPM, by advancing the operation of the valves 22 and 24 relative to a nominal timing relationship with the crankshaft 18, the engine 10 may have improved power. By contrast, at higher RPM, by retarding the operation of the valves 22 and 24 relative to the nominal timing relationship with the crankshaft 18, the engine 10 may have improved power.

Figure 2A:
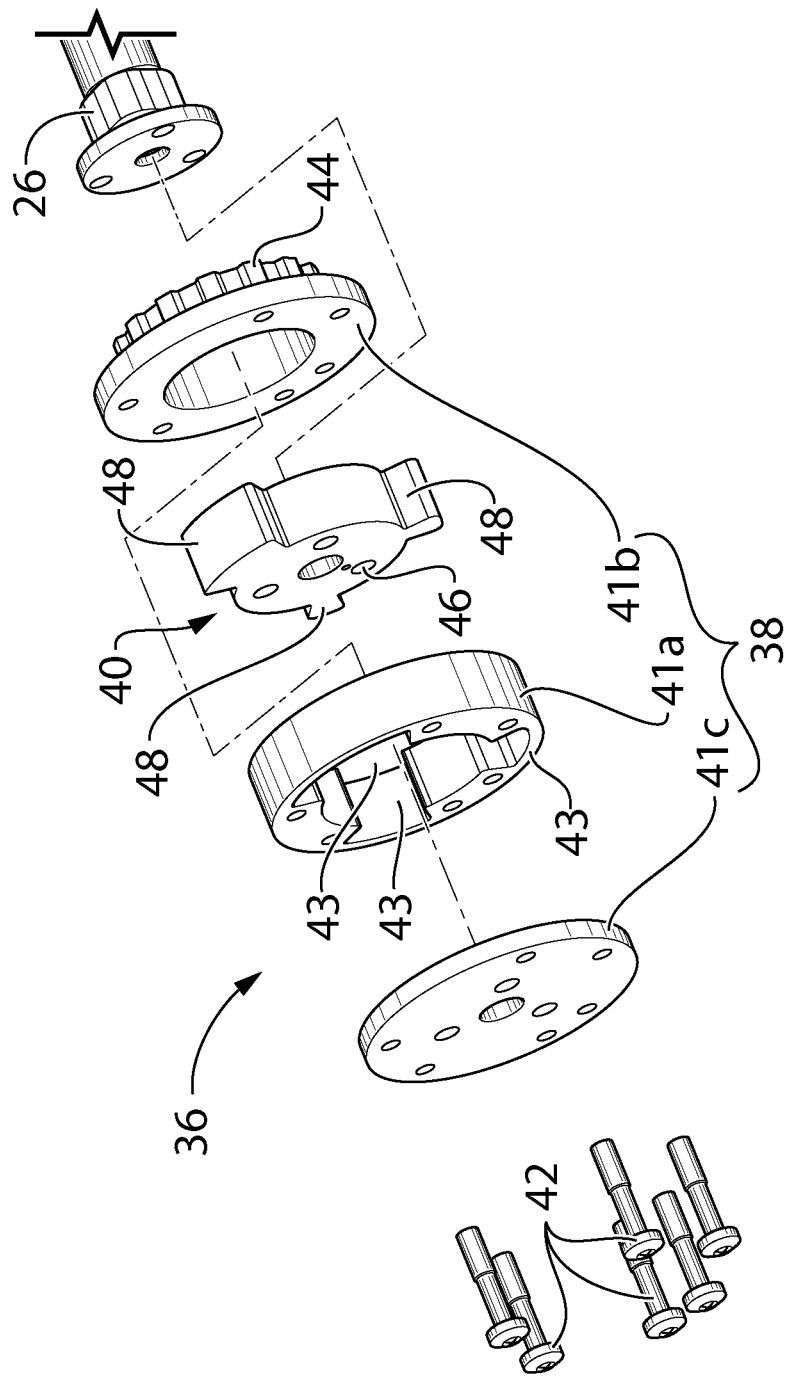
FIG. 2A is an exploded view of a variable valve timing (VVT) system that is included with the engine shown in FIG. 1.

The engine 10 may include a variable valve timing (VVT) system 36 to adjust the timing of the actuation of the valves 22 and 24 by the camshafts 26. An example of a VVT system 36 is shown more clearly in the exploded view of FIG. 2A. The example VVT system 36 in FIG. 2A is a hydraulically actuated VVT system, however it will be understood that other types of VVT system could alternatively be used, such as an electrically actuated VVT system (which is actuated via an electric motor instead of pressurized hydraulic fluid). The hydraulically actuated VVT system 36 shown in FIG. 2A is incorporated into each of the camshaft rotors 34, and includes a crankshaft-associated member 38 and a camshaft-associated member 40. The crankshaft-associated member 38 is formed from a hollowed rotary member 41a which defines a plurality of actuation chambers 43, a cover 41b and an end plate 41c, which are all sealingly connected together (e.g. via fasteners 42). The crankshaft-associated member 38 features teeth 44 which mesh with the timing belt teeth so as to maintain the predetermined timing relative to the crankshaft 18.

The camshaft-associated member 40 is a rotary piston 46 that includes piston lobes 48 located in respective actuation chambers 43. The camshaft-associated member 40 is fixedly connected to the associated camshaft 26, e.g. by way of a plurality of fasteners (not shown).

With additional reference to FIGS. 2B and 2C, by introducing high-pressure hydraulic fluid on one side or the other of each of the rotary piston lobes 48, and by venting hydraulic fluid (to a reservoir) on the opposing side of each of the rotary piston lobes 48, the rotational position of the camshaft-associated member 40 can be adjusted relative to the crankshaft-associated member 38. For example, in the view shown in FIG. 2B, hydraulic fluid has been introduced into first chamber portions 43a on a first side of the rotary piston lobes 48, and vented from second chamber portions 43b on a second side of the rotary piston lobes 48, thereby driving the camshaft 26 to be in an advanced timing position relative to the crankshaft 18. The chamber 43b essentially has zero volume in the view shown in FIG. 2B since substantially all of the hydraulic fluid has been vented from it. By contrast, in the view shown in FIG. 2C, hydraulic fluid has been introduced into the second chamber portions 43b on the second side of the rotary piston lobes 48, and vented from the first chamber portions 43a on a second side of the rotary piston lobes 48, thereby driving the camshaft 26 to be in an retarded timing position relative to the crankshaft 18. The chamber 43a essentially has zero volume in the view shown in FIG. 2C since substantially all of the hydraulic fluid has been vented from it.

In some hydraulically actuated VVT systems, an intermediate or nominal position is also provided for the camshaft by the use of a lock pin on the rotary piston 46 that can be extended axially into and retracted from an aperture on the crankshaft associated member 38.

As discussed above, during operation of the engine 10 the intake and exhaust camshafts 26a, 26b and the intake and exhaust valves 22 and 24 apply periodic valve torques to the cam rotors 34. When the frequency of the periodic valve torques is near the natural frequency of the timing drive 28, the timing drive 28 will resonate resulting in large tension fluctuations in the spans of the elongate drive structure 30 and the camshafts 26a, 26b will experience high torsional vibrations relative to the crankshaft.

Figure 3A:
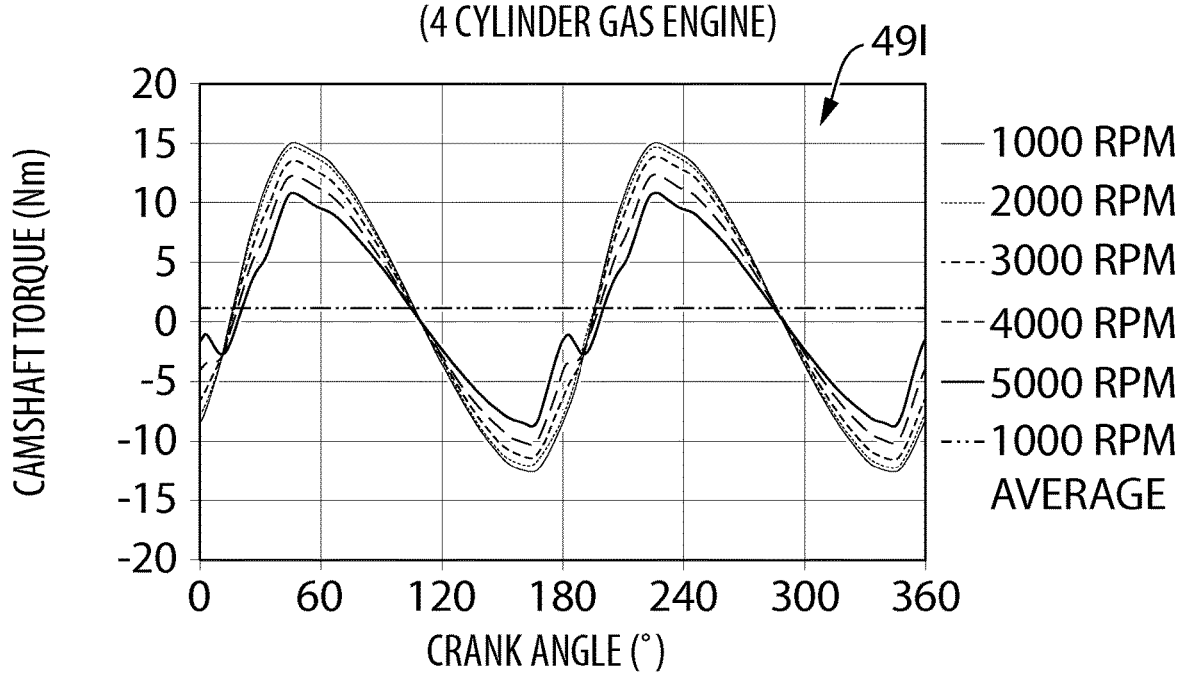
FIG. 3A is a graph showing a periodic intake valve torque that is applied at one of the camshaft rotors of the engine shown in FIG. 2, at several different engine speeds.
Figure 3B:
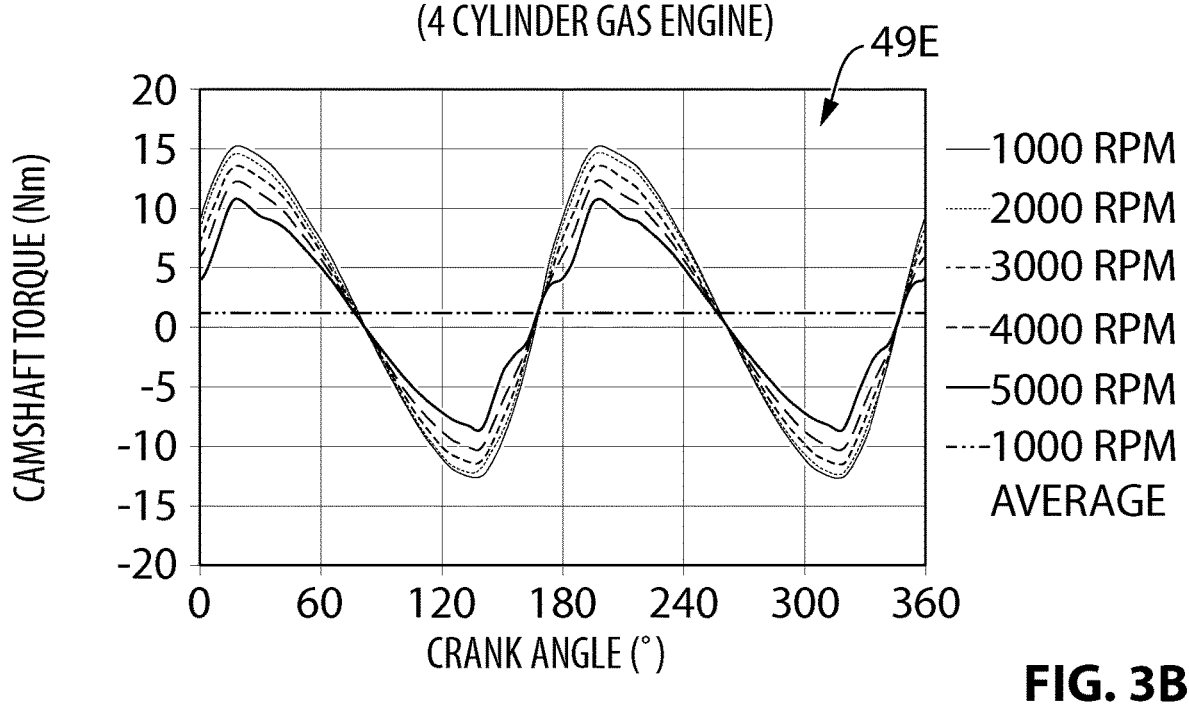
FIG. 3B is a graph showing a periodic exhaust valve torque that is applied at one of the camshaft rotors of the engine shown in FIG. 2, at several different engine speeds.
Figure 3C:
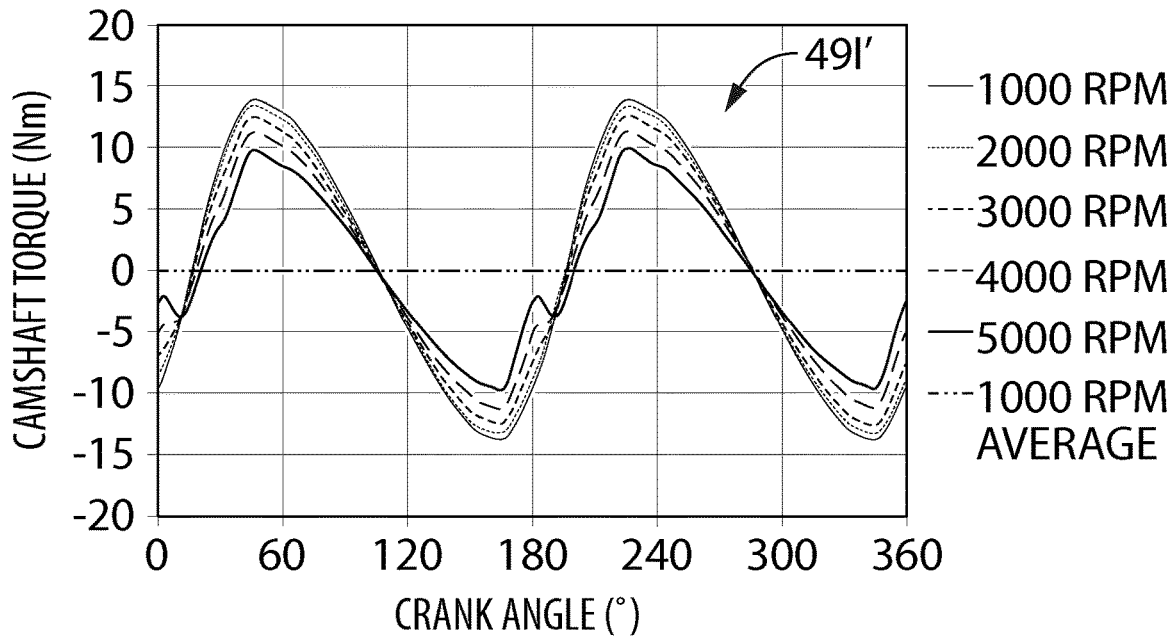
FIG. 3C is a graph showing only the fluctuating component of the periodic intake valve torque shown in FIG. 3A, at several different engine speeds.

FIG. 3A shows an example of a periodic valve torque 49I over a crankshaft rotational cycle at different engine operating speeds. This example is derived from simulation data provided the manufacturer of a two-litre, four-cylinder, DOHC direct injection gas engine. The periodic valve torque 49I is the torque generated by the intake camshaft 26a. FIG. 3B shows a periodic valve torque 49E generated by the exhaust camshaft 26b. The valve torques 49I and 49E are similar, albeit offset somewhat in phase or timing relative to the crankshaft. The periodic valve torques 49I and 49E are shown at an intermediate or nominal VVT position; for example, camshaft-associated member 40 may be in the middle position with reference to the advanced and retarded positions shown in FIGS. 2B and 2C in which case the corresponding camshaft is neither advanced nor retarded relative to the crankshaft. The nominal periodic valve torques 49 have a mean torque level (about 2 Nm, in this example) which is the torque necessary to overcome frictional resistance of the rotating elements. Those skilled in the art will understand that it is the fluctuating component, analogous to the a.c. component of an electrical signal, which causes resonance. FIG. 3C shows the nominal periodic fluctuating intake valve torque 49I', wherein the mean component is removed from the signal. The nominal periodic fluctuating exhaust valve torque 49E' will look similar.

(For those without the requisite technical background, this can be intuitively appreciated by considering a simple resonant system such as a mass connected to a spring. If the force pressing against the mass is constant, the mass will be displaced to a fixed position, and no resonance is possible. However, if the force pressing against the mass oscillates sinusoidally, the displacement of the mass will oscillate likewise, in which case the system will resonate. Where the force pressing against the mass is composed of a constant force superimposed with a sinusoidal oscillatory force, because this is a linear system, the mass will be displaced to a mean position and oscillate sinusoidally about the mean position.)

Figure 3D:
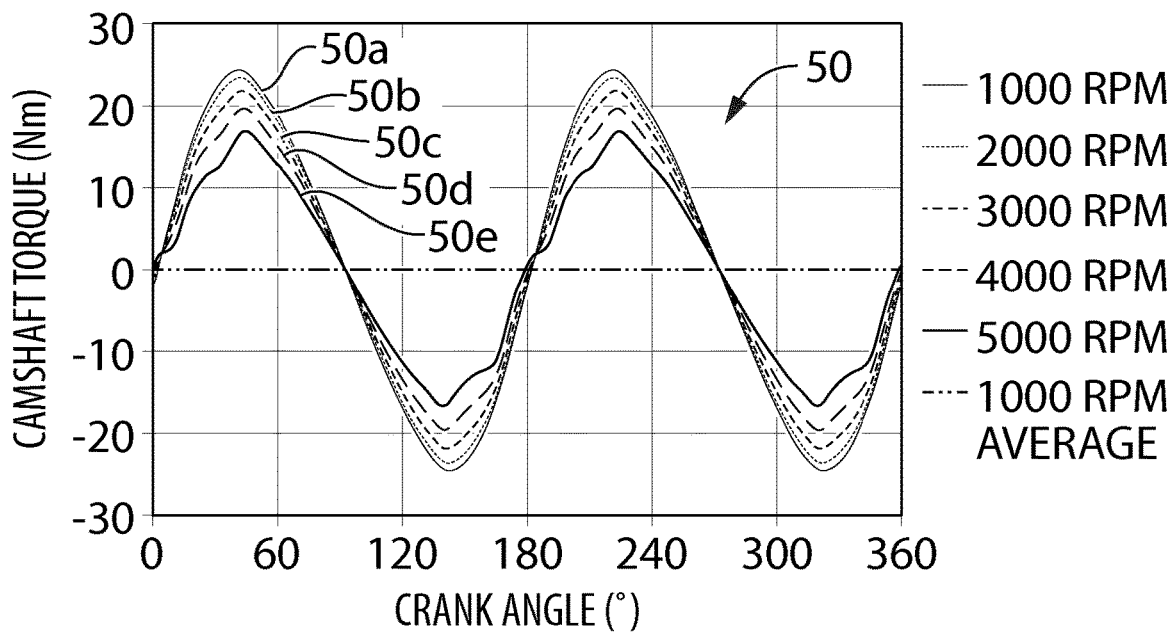
FIG. 3D is a graph of a periodic fluctuating load torque for the timing drive of the engine shown in FIG. 2, which is a concatenation of fluctuating intake valve torque and fluctuating exhaust valve torque.

FIG. 3D shows a nominal periodic fluctuating load torque 50, which is a concatenation of the nominal periodic fluctuating intake and exhaust valve torques 49I' and 49E. The cam torsional vibrations and span tension fluctuations can be reduced if this torque 50 is counteracted by a non-circular crankshaft rotor. Curve 50a represents the nominal periodic fluctuating load torque when the particular engine is operating at 1000 RPM; curve 50b represents the nominal periodic fluctuating load torque when the particular engine is operating at 2000 RPM; curve 50c represents the nominal periodic fluctuating load torque when the particular engine is operating at 3000 RPM; curve 50d represents the nominal periodic fluctuating load torque when the particular engine is operating at 4000 RPM; and curve 50e represents the nominal periodic fluctuating load torque when the particular engine is operating at 5000 RPM.

The amplitude of the nominal periodic fluctuating load torque can vary somewhat depending on the speed of the engine due to inertial effects of the valve springs.

Figure 3E:
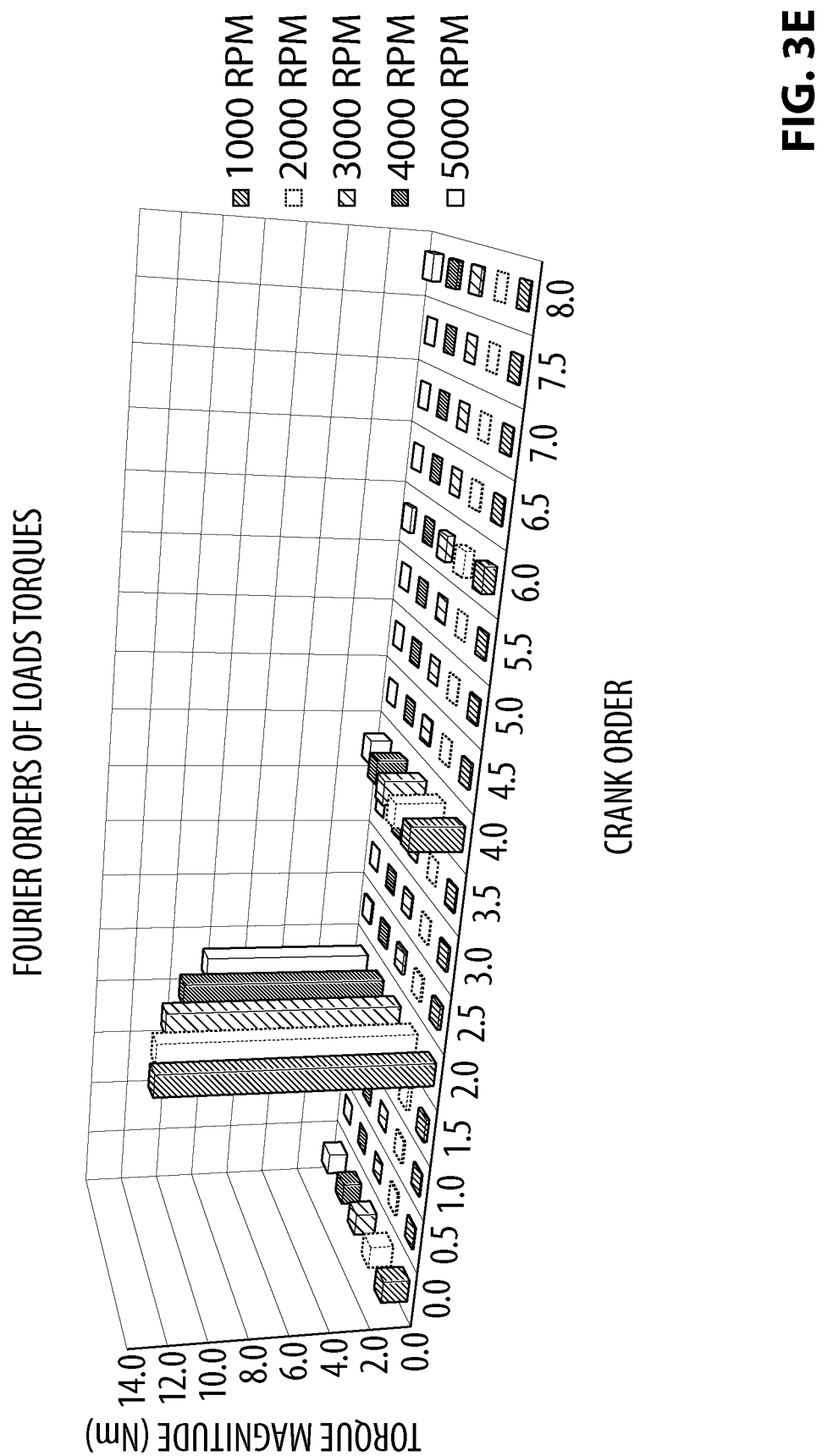
FIG. 3E is a graph showing the spectral components of the periodic intake valve torque shown in FIG. 3A, at several different engine speeds.

FIG. 3E shows the harmonics of the nominal periodic fluctuating intake valve torque 49I for the corresponding engine speeds; the harmonics of the nominal periodic fluctuating exhaust valve torque 49E being the same. (For those without the requisite technical backgrounds it should be appreciated that every periodic signal Sig(t) constitutes a sum of simple sinusoidal waves, including a sinusoidal wave(s) at a basic frequency corresponding to the periodicity T of the signal and sinusoidal waves at integral multiples of the basic frequency. This is known from the well-established Fourier theorem, which states mathematically that $$Sig(t) = \sum_{i=0}^{\infty}\left[a_i\cos\left(2\pi i\frac{t}{T}\right) + b_i\sin\left(2\pi i\frac{t}{T}\right)\right],$$

where $a_i$ and $b_i$ are constants. FIG. 3E shows the spectral components of the nominal periodic fluctuating valve torque in relationship to a reference frequency being the crankshaft rotational frequency, although other reference frequencies can be used in such plots. The crankshaft rotational frequency is defined as the first order with higher orders being multiples of the crankshaft frequency. Thus, for example, if the crankshaft is rotating at 1000 RPM, the second order is 2000 RPM, and if the crankshaft is rotating at 3000 RPM, the second order is 6000 RPM.)

The second order component of the nominal fluctuating valve torques (and hence the nominal periodic fluctuating load torque) clearly has the greatest magnitude—the most energy—and thus this spectral component is responsible for most of the torsional vibration caused by the intake and exhaust valves in the timing drive. (This makes intuitive sense because in the subject engine 10 the camshafts must actuate the intake and exhaust valves twice per rotation of the crankshaft.)

Figure 3F:
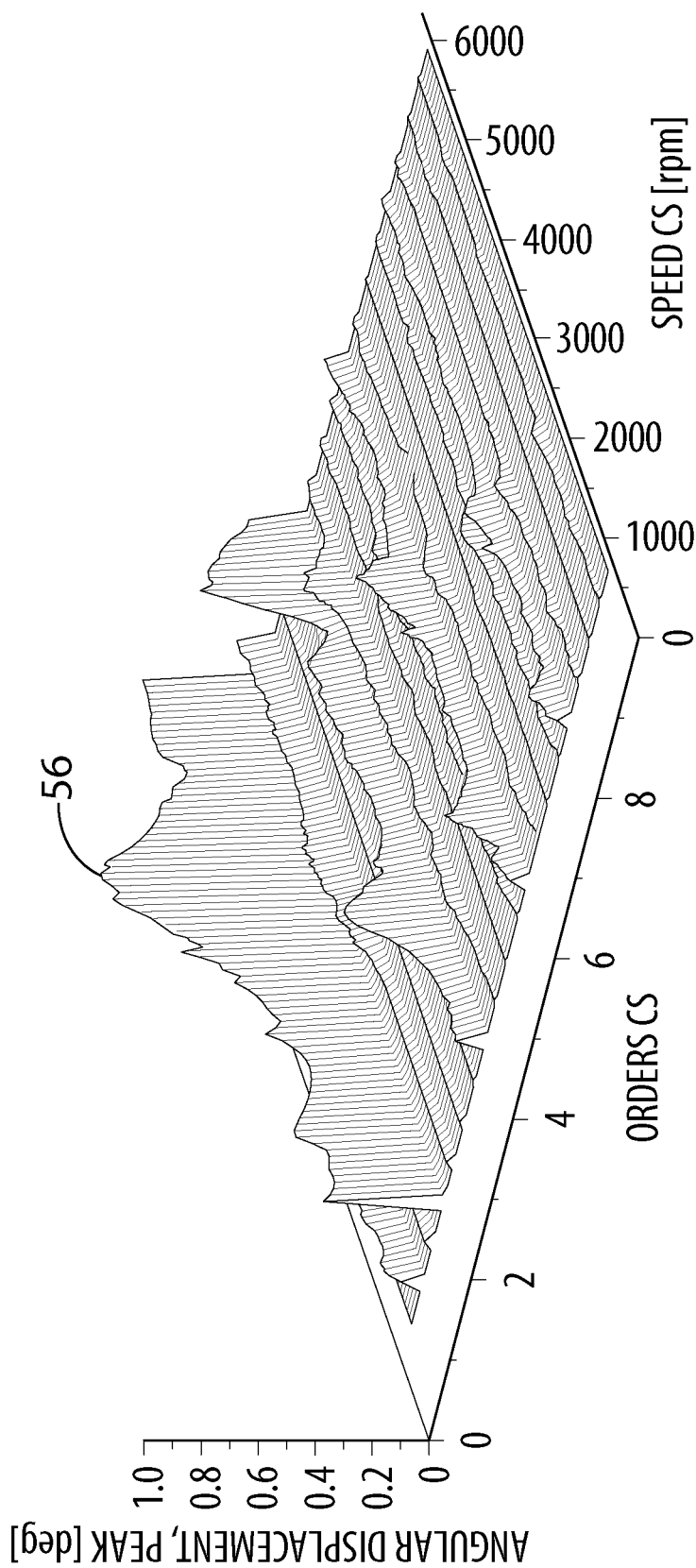
FIG. 3F is a graph of camshaft timing error as a function of crankshaft harmonics for the timing drive of the engine shown in FIG. 2, over an operating speed range of the engine.

FIG. 3F shows a spectral analysis of the torsional vibration for the intake camshaft in the subject engine 10 in circumstances where the crankshaft rotor 32 is circular; the torsional vibration for the exhaust camshaft being substantially similar. This analysis shows camshaft torsional vibration resulting from the influences of the crankshaft and intake and exhaust periodic valve torques. The highest torsional vibration occurring at ref. no. 56 arises from the second order spectral component when the crankshaft frequency is about 4000 RPM.

Figure 3G:
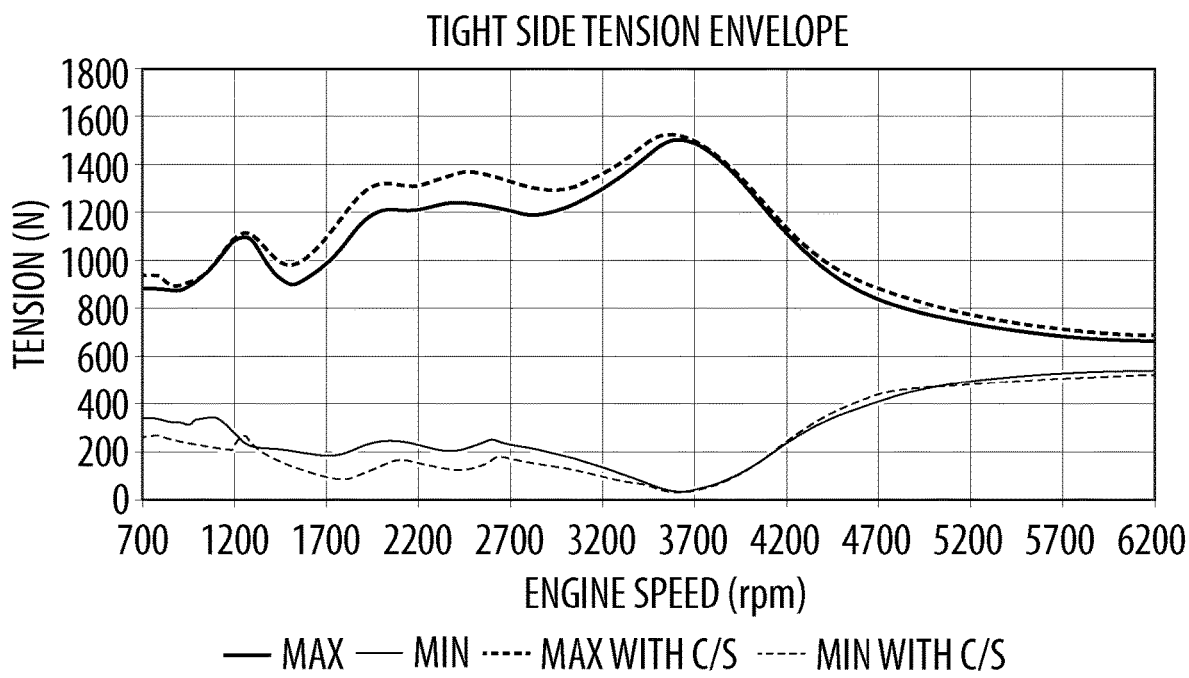
FIG. 3G is a graph of span tension envelope in the timing drive of the engine shown in FIG. 2.
Figure 3H:
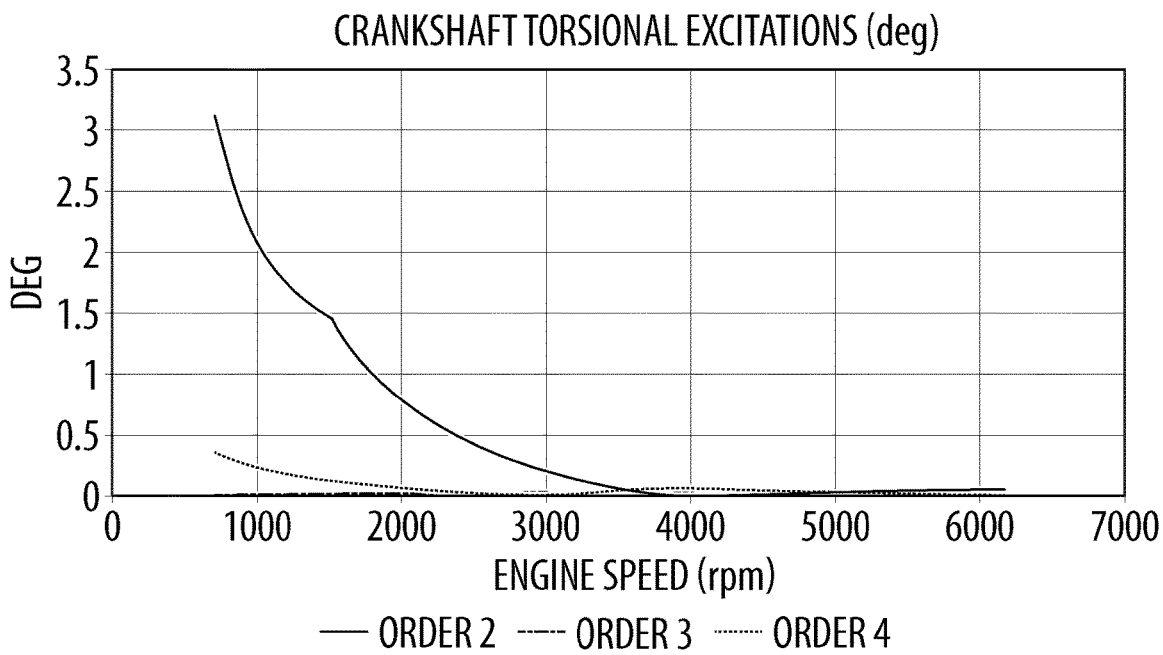
FIG. 3H is a graph of crankshaft excitation in the timing drive of the engine shown in FIG. 2.

FIG. 3G shows maximum and minimum tensions, represented by curves 58 and 60, in the tight and slack sides 30R and 30L of the timing belt 31 for the subject engine, with crankshaft rotor 32 being circular. Curves 58 and 60 show the tension arising from all sources of vibration, including excitation caused by the crankshaft rotor. Curves 59 and 61 show maximum and minimum tensions in the tight and slack sides 30R, 30L of the timing belt 31 for the subject engine caused by the nominal periodic fluctuating load torque 50. As can be seen, due to the resonance that occurs at about 4000 RPM, the tension fluctuates significantly primary due to the fluctuating load torque. The excitation of the crankshaft rotor on the timing drive 28, whose spectral components are shown in isolation in FIG. 3H, is not a material contributor to span tensions at the higher engine speeds where resonance occurs. (Note that the scale in FIG. 3H is measured in absolute degrees arising from speed variation in the crankshaft rotor. The scale in FIG. 3F is measured in relative degrees or timing error relative to the crankshaft. It is the relative motion of the camshaft rotors with respect to the crankshaft rotor that is responsible for the bulk of span tension fluctuations.)

Figure 3I:
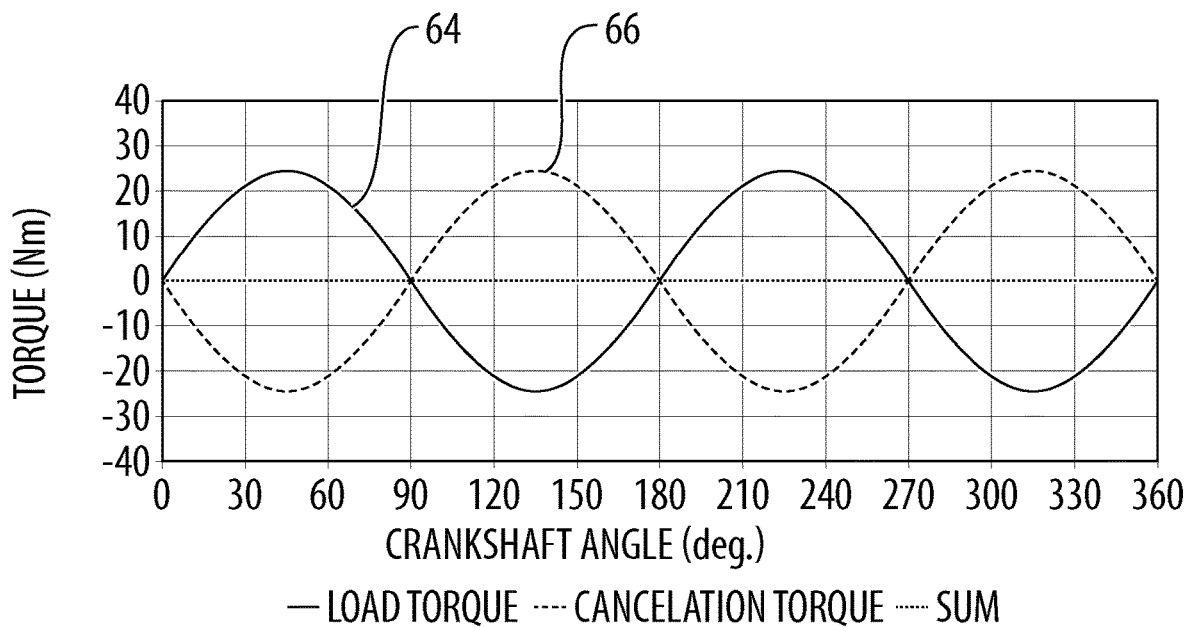
FIG. 3I is a graph illustrating the cancellation of the second order of fluctuating load torque of FIG. 3D through application of a fluctuating corrective torque generated by a non-circular crankshaft rotor in the timing drive of the engine shown in FIG. 2.

FIG. 3I shows the nominal second order load torque 64 relative to the crankshaft. The comparatively high belt tension fluctuations and cam torsional vibrations can be beneficially reduced using the aforementioned Smart-sprocket® technology to counteract the nominal second order load torque. FIG. 3I shows a fluctuating (second order) corrective torque 66 generated when the crankshaft rotor 32 is non-circular and a net excitation torque 68, which is the sum of torques 64 and 66. FIG. 3I shows an optimal counteraction, wherein the non-circular rotor has an angular orientation and magnitude of eccentricity such that the non-circular profile applies an opposing fluctuating (second order) corrective torque resulting in the net excitation torque 68 being zero.

(As discussed in U.S. Pat. No. 7,232,391, and as discussed further below, there can also be practical benefit if the angular orientation is not optimal and/or the magnitude of eccentricity is not optimal.)

Figure 3J:
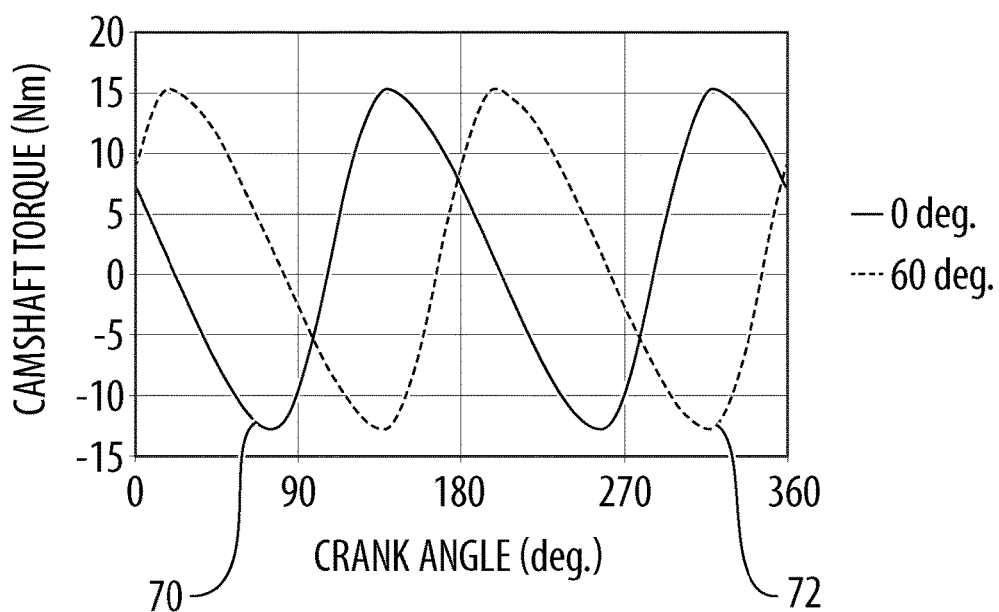
FIG. 3J is a graph illustrating a phase shift of the fluctuating intake valve torque that occurs when the VVT system shown in FIG. 2 is actuated.

In the subject engine 10 the VVT system 36 changes the phase relationship between the camshaft 26 and crankshaft 18 by advancing or retarding each camshaft 26 relative to the crankshaft 18. The result is an advancement or retardation of the fluctuating intake and exhaust valve torques (and hence the combined fluctuating load torque) relative to the crankshaft 18. For example, curve 70 in FIG. 3J represents a valve torque in a nominal position relative to the crankshaft 18, while curve 72 shows the angular position of this valve torque when the camshaft 26 is shifted by sixty degrees relative to the crankshaft 18.

Figure 3K:
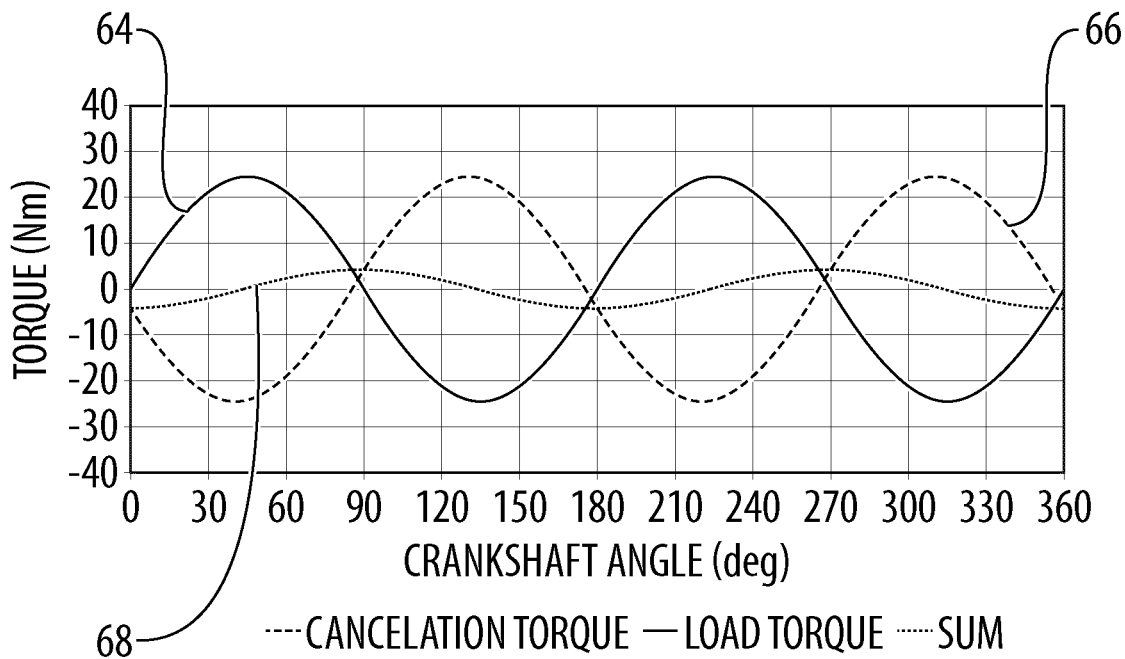
FIGS. 3K-3M are graphs illustrating the resulting net torque when the second order fluctuating load torque has been phase shifted by progressively larger amount relative to the crankshaft while the fluctuating corrective torque is not phase shifted likewise.
Figure 3L:
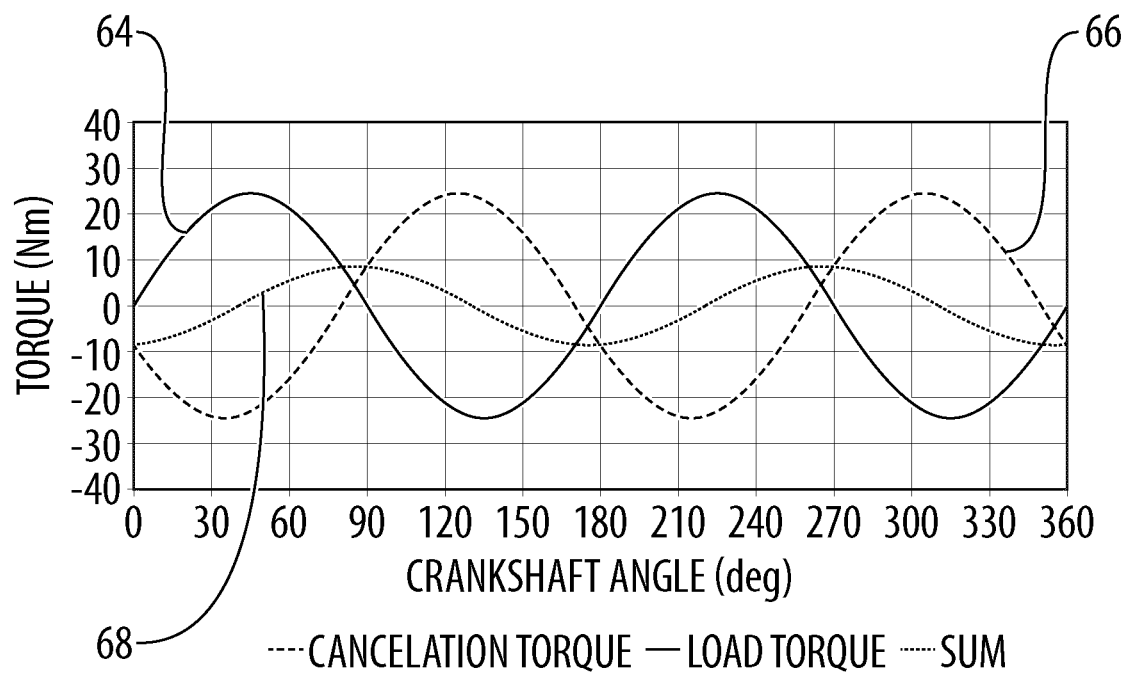
Figure 3M:
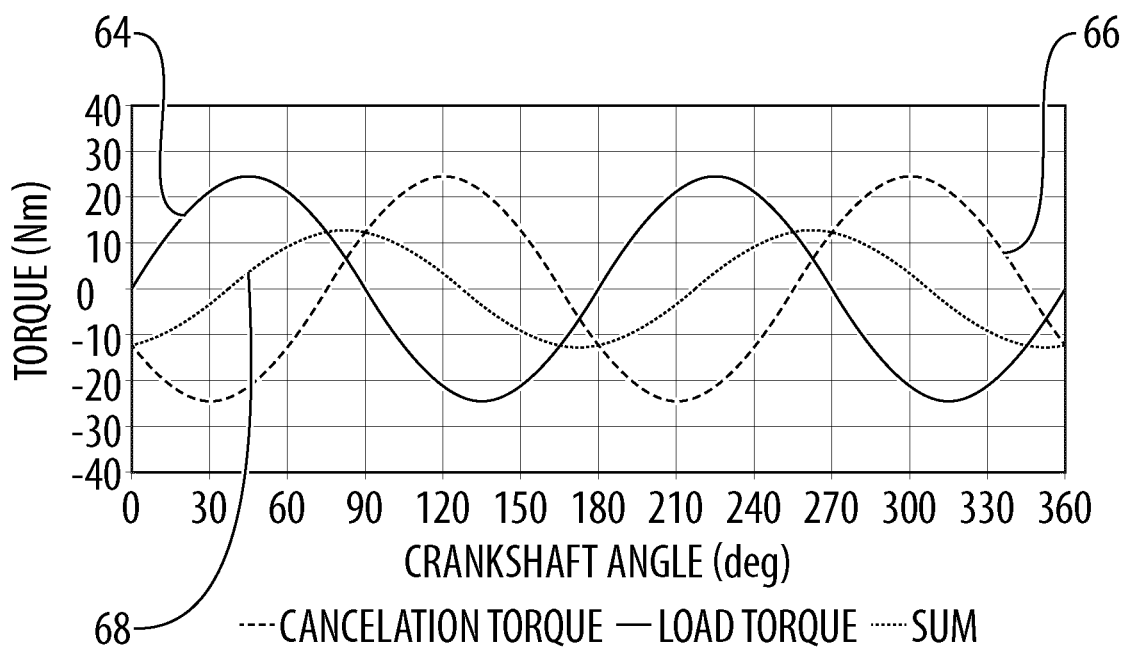

FIGS. 3K-3M illustrate the interaction between the fluctuating corrective torque 66 and the second order load torque 64 when the VVT system 36 is employed to adjust the phase angle or timing of the camshaft 26 relative to the crankshaft 18 (where both intake and exhaust cams are adjusted by the same angle). The phase angle of the second order load torque 64 varies relative to the crankshaft rotor but the phase of the fluctuating corrective torque is fixed relative to the crankshaft rotor. In FIG. 3K, the second order load torque 64 has been retarded by a small amount relative to the crankshaft 18 and the fluctuating corrective torque 66. As a result, the resulting net excitation torque 68 is no longer substantially zero. In FIG. 3L, the second order load torque 64 is further retarded relative to the crankshaft 18 resulting in the net excitation torque 68 in FIG. 3J having a greater peak amplitude or magnitude as compared to the net torque 68 in FIG. 3K. FIG. 3M illustrates the situation where the camshaft timing is further phase-shifted relative to the crankshaft 18, with the result that the magnitude of the net excitation torque 68 increases progressively.

Those skilled in the art will appreciate that in a resonant system the peak amplitude of a sinusoidal input excitation corresponds to energy lost due to vibration so there is still some benefit to utilization of the non-circular rotor because the magnitude of the net excitation torque is lower than the magnitude of the second order load torque, but the benefit erodes the greater the camshaft phase angle or timing shifts from the nominal. In practice, given the noise inherent in internal combustion engines and the accuracy of typical test and measurement equipment, the magnitude of net excitation torque should be, generally speaking, at most around 75%-85% of the magnitude of the second order load torque at an engine speed corresponding to the natural frequency of the timing drive in order to achieve tangible benefits of reduced torsional vibration and improved span tension characteristics.

Figure 3N:
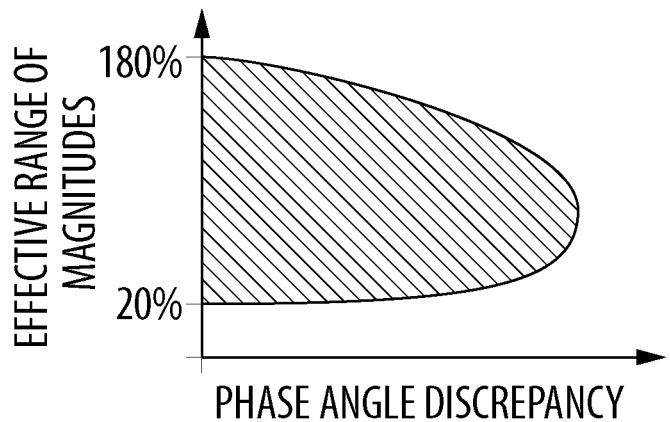
FIG. 3N is a graph illustrating how an effective range of magnitudes of eccentricity for an oval non-circular rotor decreases as the phase angle difference increases between a second order load torque and a second order corrective torque.
Figure 3P:
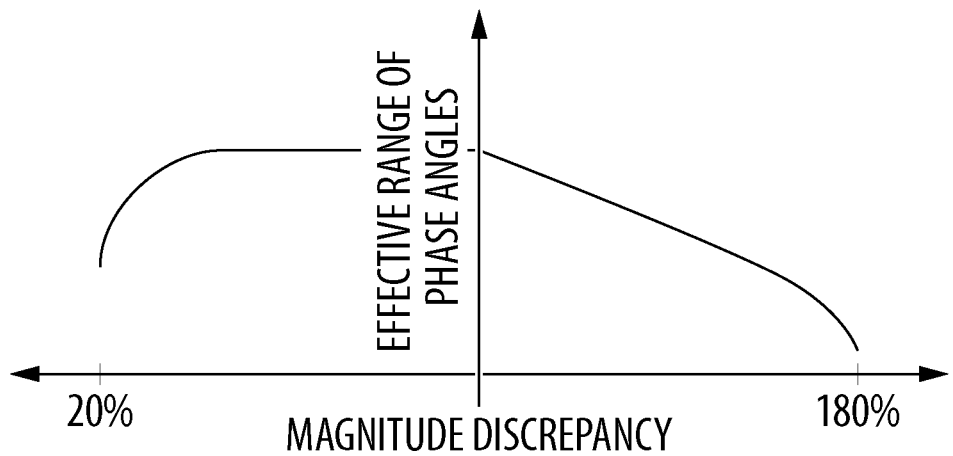
FIG. 3P is a graph illustrating how an effective range of phase angles between a second order load torque and a second order corrective torque decreases as their magnitudes vary.

A similar effect occurs if (a) the magnitude of the fluctuating load torque varies relative to (b) the magnitude of the corrective torque, in that the magnitude of the net excitation torque rises as the discrepancy between (a) and (b) increases. The situation is further exacerbated in that the magnitude of the net excitation torque increases with increasing discrepancies in both the phases and magnitudes of (a) and (b). These limits can be discerned through graphical or mathematical summation of sinusoids, resulting in curves such as shown in FIGS. 3N and 3P. These plots show the general principle that the greater the discrepancy in phase the smaller the allowable discrepancy in magnitude and—vice versa—the greater the discrepancy in magnitude the smaller the allowable discrepancy in phase.

Based on observations to date, in typical commercial VVT engines there does not appear to be a significant difference in the magnitude of second order valve torques as the camshaft phase angle or timing is shifted relative to the crankshaft. There also does not appear to be a significant difference in the magnitude of the second order valve torques due to valve inertia at engine speeds of interest. As seen for example, in FIG. 3A, these magnitudes typically vary in the range of about 10-30 percent at engine speeds of interest.

It can be seen, therefore, that applying a fluctuating corrective torque in a timing drive is beneficial, but that some of the benefit is lost in an engine where the camshaft is equipped with a VVT system. Moreover, automotive engine designers continue to strive for greater energy efficiency, leading to downsized, forced induction engines. These engines are more torsionally active and may place greater demands on the VVT system, including increased cam phasing as provided by the latest generation of motorized VVT systems. Such engines can achieve greater benefit, including improved fuel efficiency and reduced emissions, by more precisely tailoring the fluctuating corrective torque generated by the non-circular rotor against the fluctuating load torques in timing drives that cause unwanted vibration.

Figure 4:
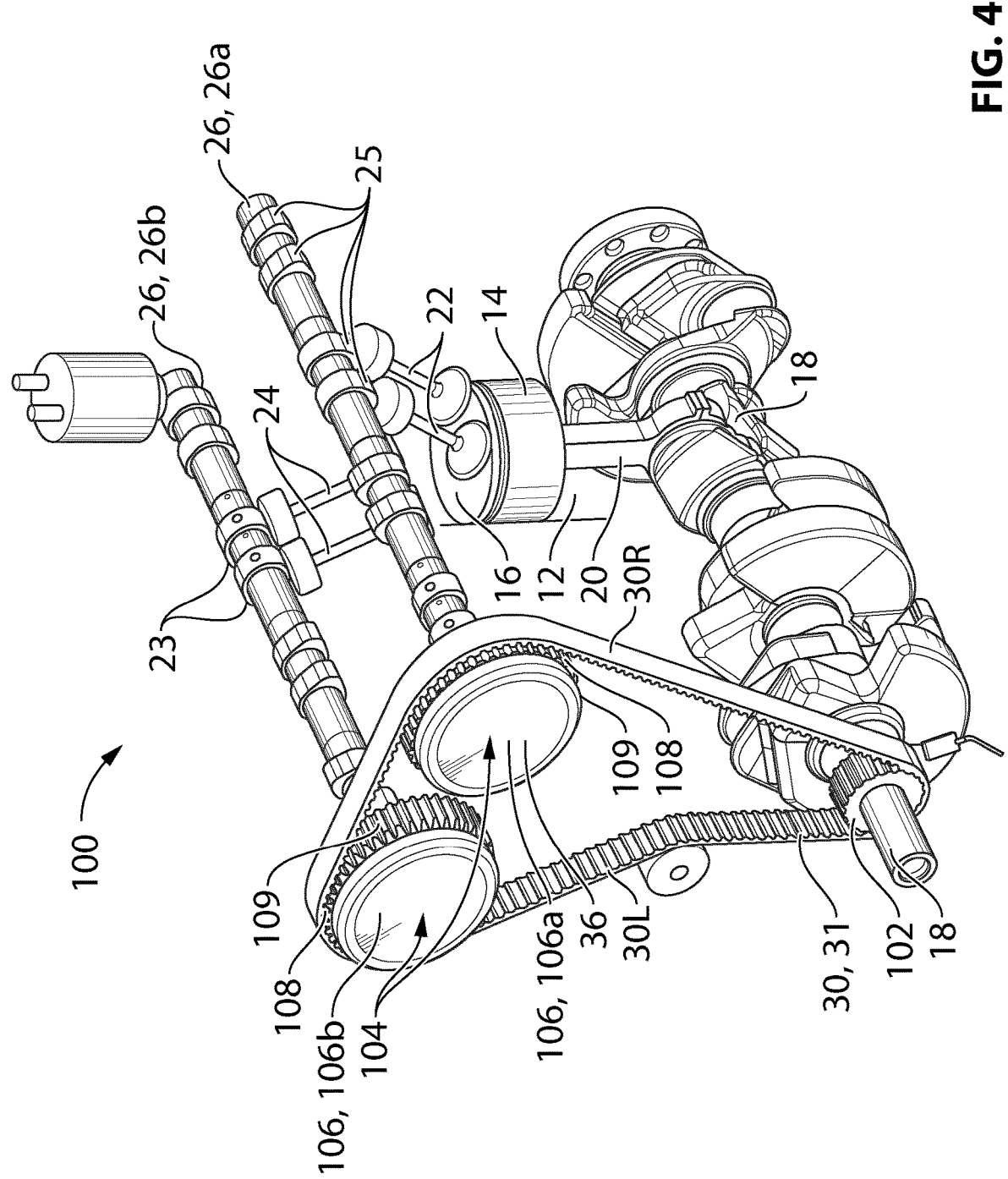
FIG. 4 is a perspective view of an engine according to an embodiment of the present disclosure.

FIG. 4 is a perspective view of an improved engine 100 in accordance with an embodiment of the present disclosure. The engine 100 is similar to the engine 10 in that the engine 100 includes a camshaft (e.g. one or both of the camshafts 26) for actuating a plurality of valves (e.g. any of the valves 22 and/or 24) and a variable valve timing system for controlling the timing of the actuation of the valves 22 and/or 24 by the camshafts 26. However, the engine 100 includes a means for adjusting the angular position or phase angle of a fluctuating corrective torque generated by a non-circular rotor relative to the crankshaft 18. In the engine 100, the crankshaft rotor shown at 102 may be non-circular or circular, as desired for the application.

Figure 5A:
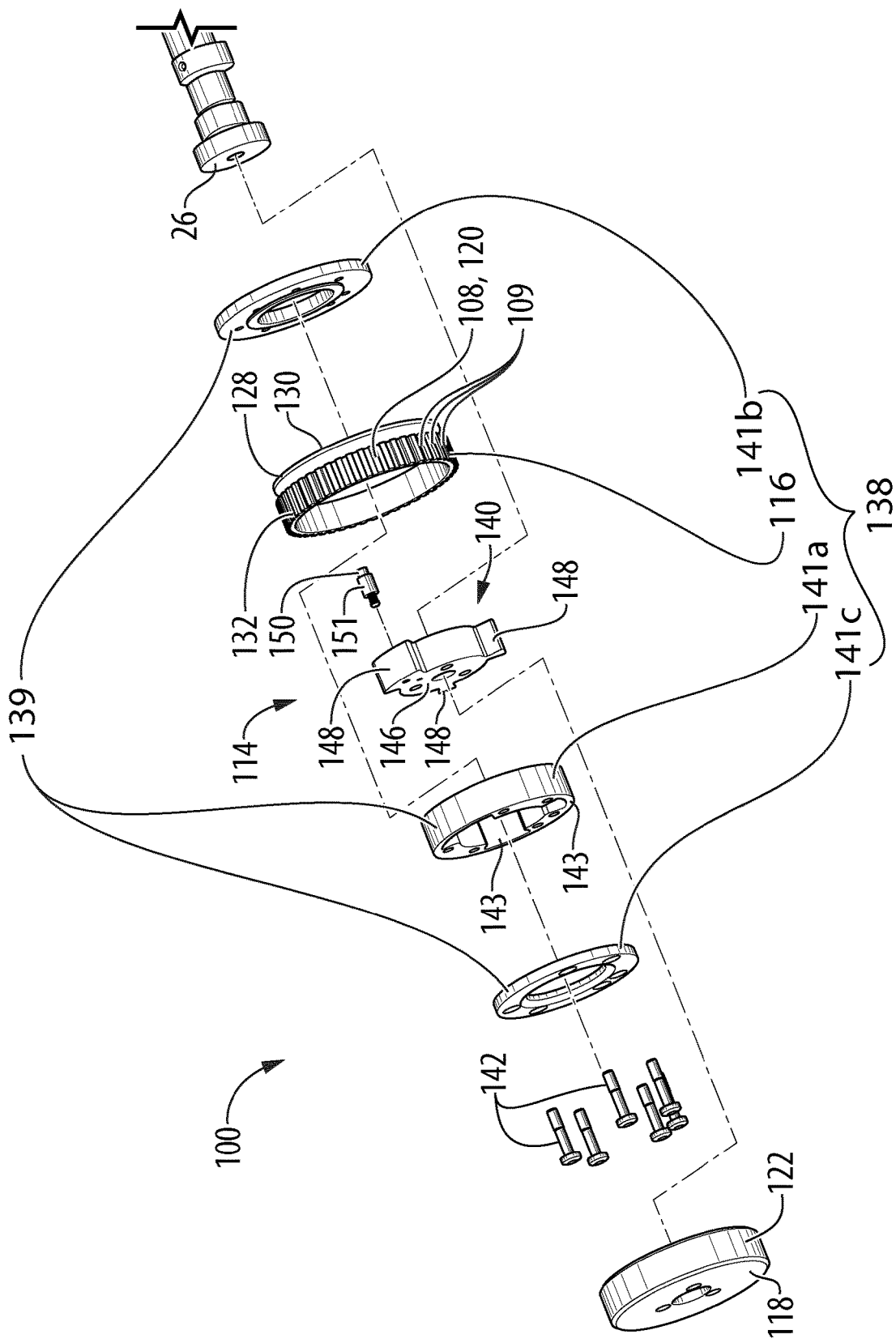
FIGS. 5A and 5B are perspective exploded views of a torque correction rotor that is used in the engine shown in FIG. 4.
Figure 5B:
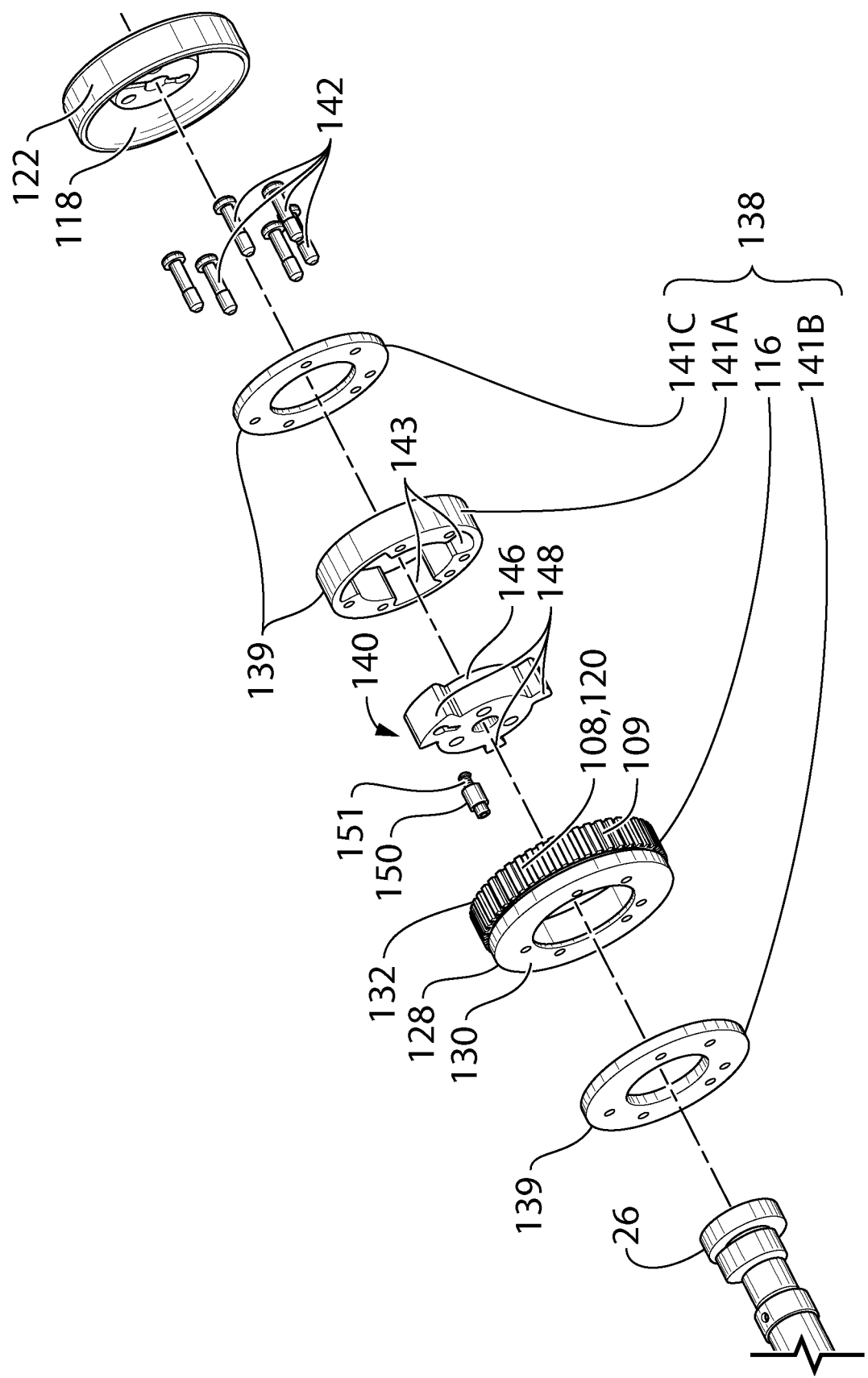

The means for introducing a phase-adjustable fluctuating corrective torque may be provided by a torque correction system 104, which is shown in exploded view in FIGS. 5A and 5B. Referring to FIGS. 4, 5A and 5B, the torque correction system 104 includes torque correction rotors 106, which are operatively connected to camshafts 26. Each torque correction rotor 106 includes an actuator 114, which forms part of the torque correction system 104. The torque corrosion rotors 106 are driven by the crankshaft rotor 102 via the continuous-loop elongate drive structure 30. In the illustrated example the torque correction system 104 includes two torque correction rotors 106a, 106b, but other embodiments can have more or fewer torque correction rotors. For example, an SOHC engine configuration has only a single camshaft on which to mount a single torque correction rotor 106. A DOHC engine configuration may employ a single torque correction rotor 106 on one of the two camshafts.

Figure 6A:
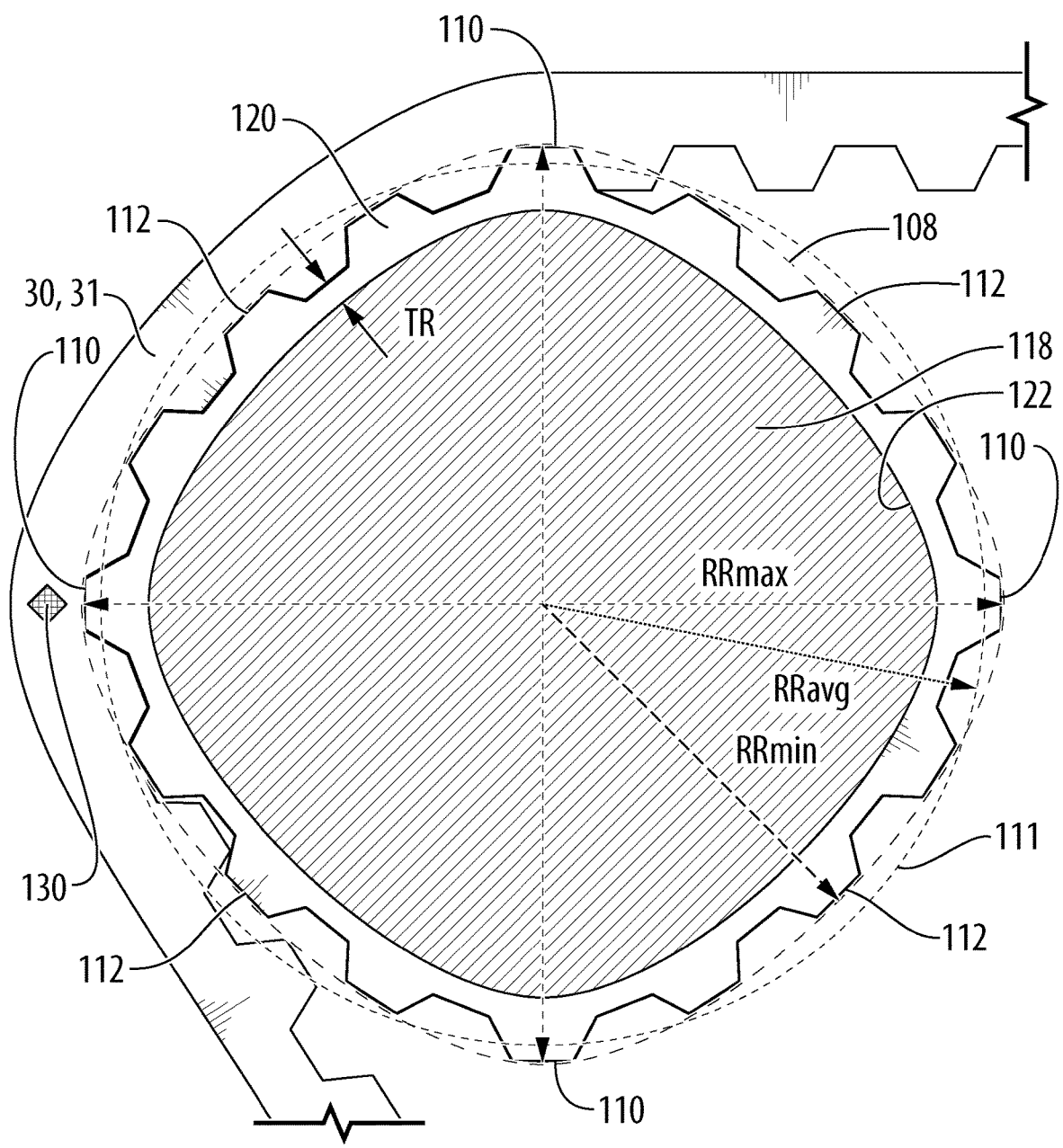
FIG. 6A is a front elevation view of the torque correction rotor shown in FIGS. 5A and 5B with an inner hub at a first angular position.

As will be seen in the highly exaggerated, not-to-scale schematic of FIG. 6A, torque correction rotor 106 has a peripheral tooth edge 108 with a non-circular profile, including a plurality of protruding rotor portions 110 which alternate with a plurality of receding rotor portions 112. Stippled line 111 shows a corresponding reference circle constructed with a radius RRavg corresponding to the total circumference C of the torque correction rotor 106 along peripheral tooth edge 108 (i.e., $RR_{avg}=C/2\pi$). (The circumference C of rotor 106 and the circumference of the reference circle 111 should be equal to an integer multiple of the circumference of the crankshaft rotor 102 in order to maintain synchronous timing.) The protruding portions 110 extend radially beyond the reference circle 111 and the receding portions 112 extend radially less than the reference circle 111. In this particular example, the torque correction rotor 106 is shaped in the form of a "rounded square", in which case there are four protruding portions 110 characterized by major radii RRmax and four receding portions 112 characterized by minor radii RRmin.

The angular positions of the protruding rotor portions 110 and the receding rotor portions 112 (FIG. 6A) are collectively adjustable relative to the crankshaft 18. (Thus, when the crankshaft is at a particular rotational position the torque correction rotor 106 can be oriented so that a given radius RRmax thereof is at a first or a second rotational position.) In the embodiment shown in FIGS. 5A and 5B, this adjustability is provided by virtue of the torque correction rotor 106 including a toothed outer member 116 and an inner hub 118, which are releasably rotationally lockable to one another. The toothed outer member 116 incorporates a toothed ring 120 that is flexible and which defines the peripheral toothed edge 108 of the torque correction rotor 106, which, as noted above, engages the elongate drive structure 30. As seen in the isolated view of the hub in FIG. 6E, the hub 118 has a peripheral edge 122 with a non-circular profile including a plurality (four in this example) of protruding hub portions 124, which alternate with a plurality (four, in this example) of receding hub portions 126. Stippled line 125 shows a corresponding reference circle constructed with a radius RHavg corresponding to the total circumference C of the hub 118 along peripheral edge 122 (i.e., $RH_{avg}=C/2\pi$). The protruding portions 124 extend radially beyond the reference circle 125 and the receding portions 126 extend radially less than the reference circle 125. In this particular example, the hub 118 is shaped in the form of a "rounded square", in which case there are four protruding portions 124 characterized by major radii RHmax and four receding portions 126 characterized by minor radii RHmin. It will be seen from the foregoing that the hub 118 imposes its non-circular shape on the toothed outer member 116, with the peripheral edge 122 of the hub 118 supporting the toothed ring 120 radially. It should also be appreciated that since the radial thickness TR (FIG. 6A) of the toothed ring 120 is uniform, the eccentricity of the torque correction rotor 106 is governed by the eccentricity of the hub 118.

As seen in FIGS. 5A and 5B, the toothed ring 120 as shown has a proximal end 128 that is connected to a generally circular base portion 130 of the outer member 116 and further includes a distal end 132 that is a free end. The radial thickness TR of the toothed ring 120 may be relatively small so as to facilitate its flexure as needed to snuggly fit about the non-circular shape of the peripheral edge 122 of the hub 118.

FIGS. 6A and 6B show the hub 118 in a first angular position, supporting the toothed ring 120. In the view shown in FIG. 6A, the protruding hub portions 124 and the receding hub portions 126 are positioned at a first selected angular position (i.e. at a first selected phase angle) relative to a marker 130 on the elongate drive structure 30. As the elongate drive structure 30 is rotationally locked to the crankshaft rotor 102, and the crankshaft rotor 102 is, in turn, rotationally locked to the crankshaft 18, the protruding and receding hub portions 124 and 126 are therefore positioned in FIG. 6A at the first selected angular position (i.e. at a selected phase angle) relative to the crankshaft 18.

Figure 6C:
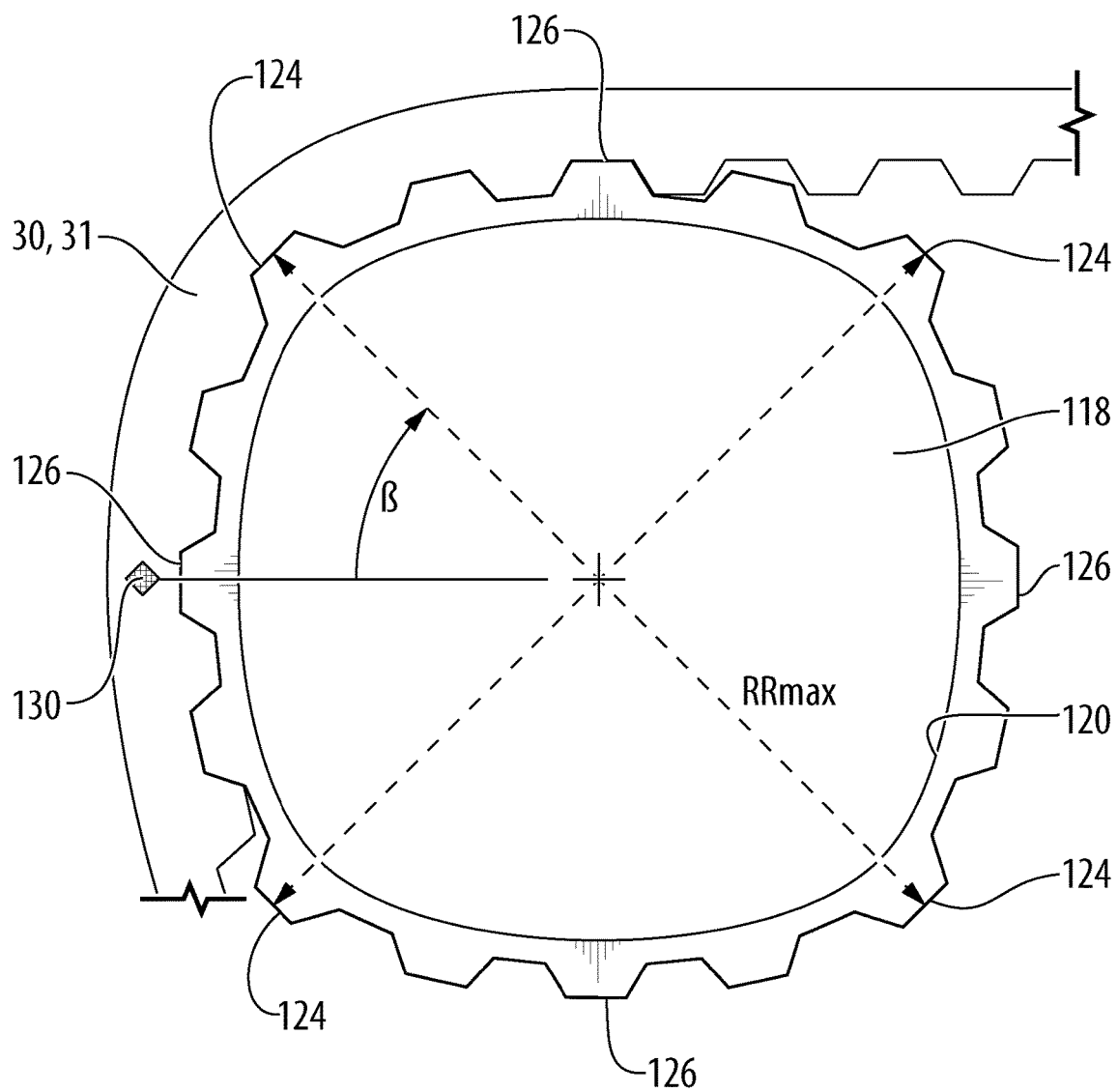
FIG. 6C is a front elevation view of the torque correction rotor shown in FIGS. 5A and 5B with the inner hub in a second angular position.
Figure 6E:
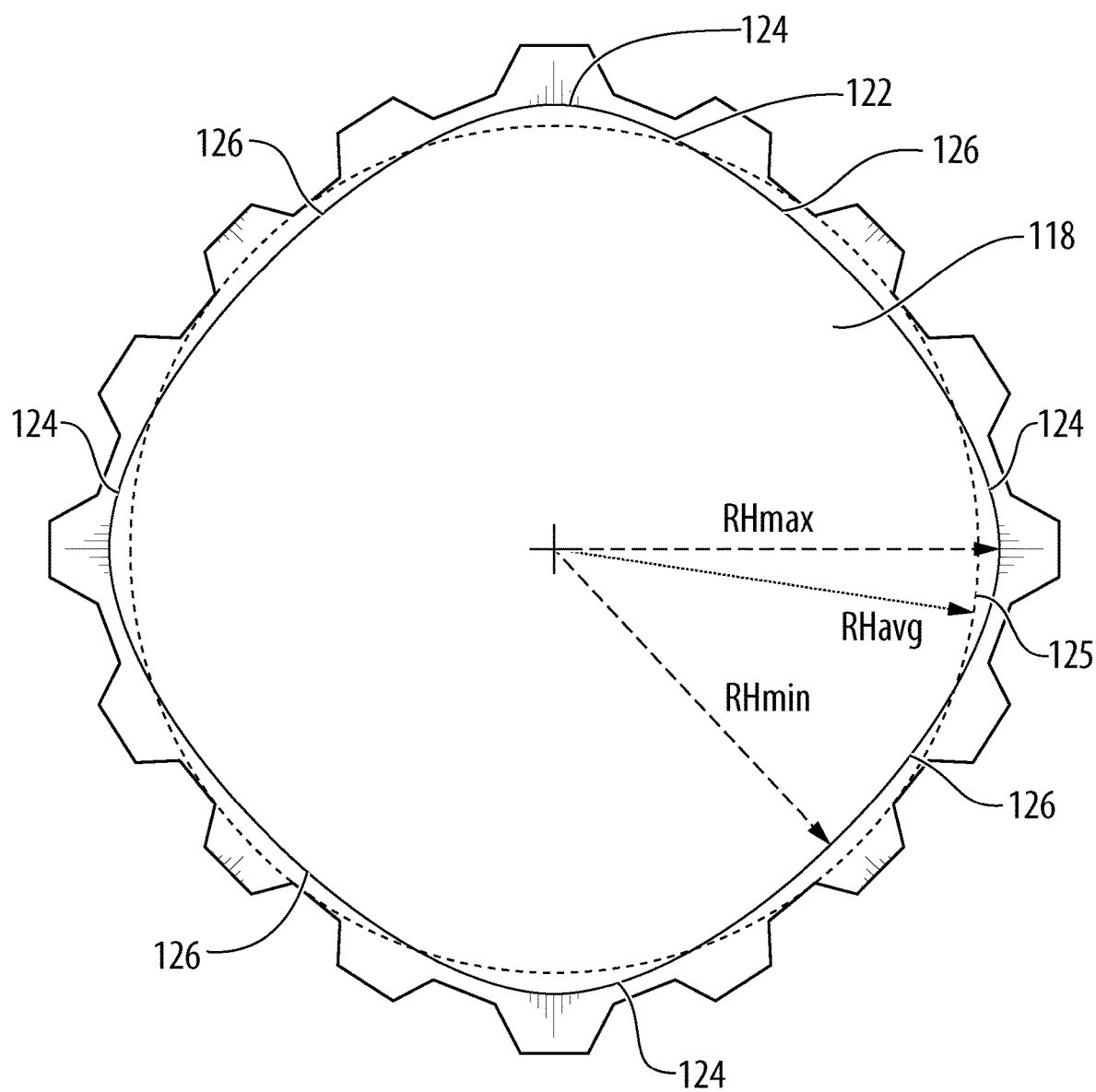
FIG. 6E is another front elevation view of the torque correction rotor shown in FIGS. 5A and 5B with the inner hub at the first angular position.

FIGS. 6C and 6D show the hub 118 in a second angular position, supporting the toothed ring 120. In the view shown in FIG. 6C, the protruding hub portions 124 and the receding hub portions 126 are positioned at a second selected angular position (i.e. at a second selected phase angle) relative to the marker 130 on the elongate drive structure 30, and therefore relative to the crankshaft 18. It can be seen by comparing the views shown in FIGS. 6A and 6C that the protruding and receding hub portions 124 and 126 have an adjustable phase angle (beta) relative to the crankshaft 18. Because the protruding and receding hub portions 124 and 126 at least in part determine the positions of the protruding and receding rotor portions 110 and 112, the protruding and receding rotor portions 110 and 112 may also be said to have an adjustable phase angle relative to the crankshaft 18.

In comparing FIGS. 6B and 6D it will be seen that the toothed ring 120 conforms radially as needed to snuggly fit about the peripheral edge 122 of the hub 118.

In the embodiment shown in FIGS. 6A-6D the thickness of the toothed ring 120 is constant about its circumference. As a result, the angular position of the hub 118 solely determines the positions of the protruding and receding rotor portions 110 and 112 relative to the crankshaft. In other embodiments discussed further below, the thickness of the toothed ring 120 may vary along its circumference, and as a result, the angular position of the hub 118 may only partly determine the angular positions of the protruding and receding rotor portions relative to the crankshaft. Instead, it will be seen that the angular positions of the protruding and receding rotor portions, as well as the eccentricity of the rotor, depends on both the angular position of the hub and on the angular position of the toothed ring. In still other embodiments discussed further below, a separate sleeve that is movable independently of the hub and the toothed ring, and which has a varying thickness, may be provided between the toothed ring and the hub. As a result, the angular position of the hub only partly determines the angular positions of the protruding and receding rotor portions relative to the crankshaft. Instead it will be seen that the angular positions of the protruding and receding rotor portions, as well as the eccentricity of the rotor, depends on both the angular positions of the hub and the sleeve, (and the angular position of the toothed ring in embodiments where the toothed ring is also of varying thickness).

Referring more particularly to FIGS. 5A and 5B, the actuator 114 is used to drive rotational movement of the hub 118 and the toothed outer member 116 relative to one another. The actuator 114 may be incorporated into each of the torque correction rotors 106, and includes an outer-member-associated actuator member 139 (which forms part of crankshaft-associated member 138) and a hub-associated actuator member, which in the illustrated embodiment is camshaft-associated member 140. The outer-member-associated actuator member 139 comprises a hollowed rotary member 141a that defines a plurality of actuation chambers 143, a cover 141b and an end plate 141c, which are all sealingly connected together (e.g. via fasteners 142). Because the actuator member 139 is connected to the toothed outer member 116, the actuator member 139, in the embodiment shown, maintains timing (i.e. maintains its phase angle) relative to the synchronous elongate drive structure 30 (FIG. 4), which, in turn, maintains timing (i.e. maintains its phase angle) relative to the crankshaft 18.

The hub/cam-associated actuator member 140 is a rotary piston 146 that includes rotary piston lobes 148 located in respective actuation chambers 143. The rotary piston 146 is connected to the hub 118, e.g. by mechanical fasteners shown at 149 (FIG. 8) which may be similar to the fasteners 142. In the embodiment shown in FIGS. 5A and 5B, the rotary piston 146 is also connected to the associated camshaft 26, e.g. by way of the aforementioned mechanical fasteners that connect the rotary piston 146 to the hub 118, although it is alternatively possible for the camshaft 26 to not be connected to the rotary piston 146.

Figure 5C:
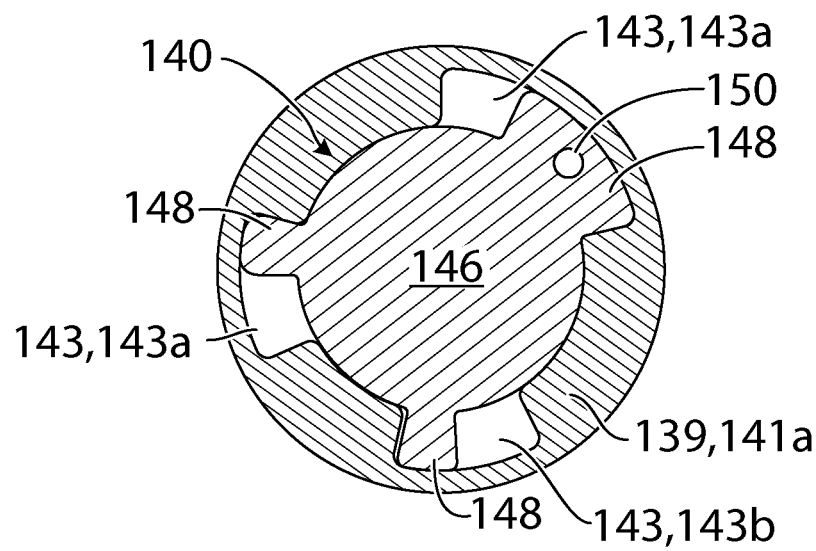
FIGS. 5C, 5D and 5E are sectional front elevation views that show different positions for an actuator of the torque correction rotor shown in FIGS. 5A and 5B.
Figure 5D:
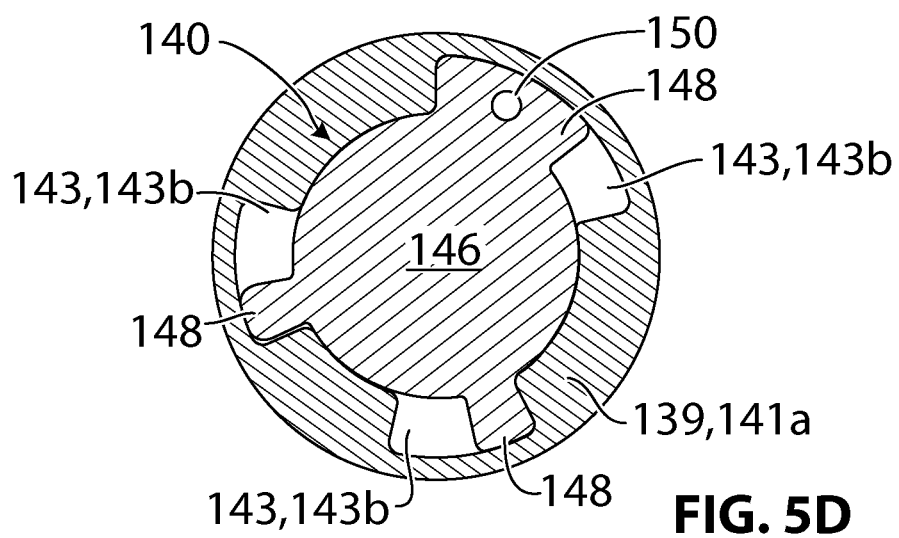
Figure 5E:
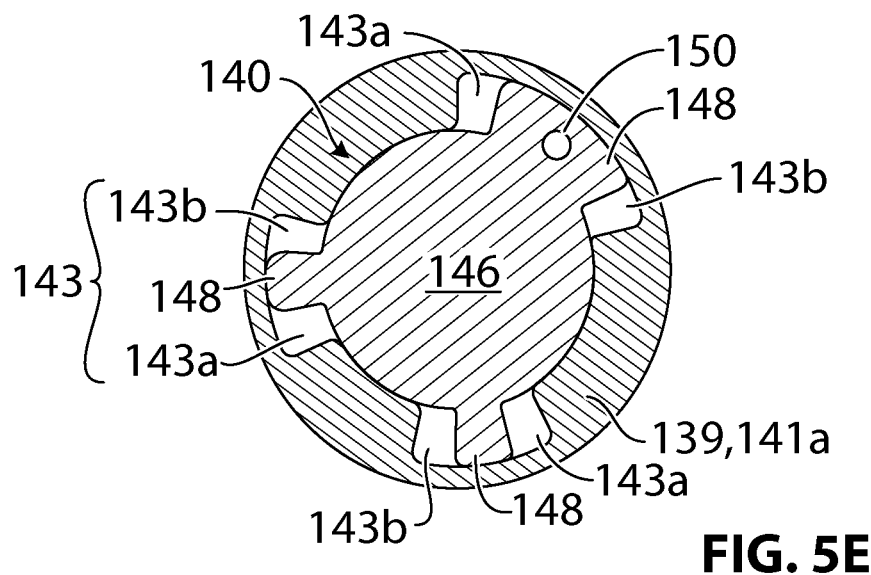

With reference to FIGS. 5C and 5D, by introducing high-pressure hydraulic fluid on one side or the other of each of the rotary piston lobes 148, and by venting hydraulic fluid (to a reservoir) on the opposing side of each of the rotary piston lobes 148, the rotational position of the hub/cam-associated actuator member 140 can be adjusted relative to the outer-member-associated actuator member 139. For example, in the view shown in FIG. 5C, hydraulic fluid has been introduced into first chamber portions 143a on a first side of the rotary piston lobes 148, and vented from second chamber portions 143b on a second side of the rotary piston lobes 148, thereby driving the hub 118 to a first selected angular position relative to the toothed outer member 116, which also drives the protruding and receding rotor portions 110 and 112 (FIGS. 6A-6D) to a first selected phase angle relative to the crankshaft 18 (FIG. 4) due to the relationship between the angular position of the hub 118 and the phase angle of the protruding and receding rotor portions 110 and 112 described above. The chamber portion 143b essentially has zero volume in the view shown in FIG. 5C since substantially all of the hydraulic fluid has been vented from it.

When in the position shown in FIG. 5C, the difference in hydraulic pressure across the rotary piston lobes 148 locks the hub-associated actuator member 140 (and therefore the hub 118) to the outer member 116 in a first selected angular position relative to the outer member 116.

By contrast, in the view shown in FIG. 5D, hydraulic fluid has been introduced into the second chamber portions 143b on the second side of the rotary pistons 148, and vented from the first chamber portions 143a on a second side of the rotary pistons 148, thereby driving the hub 118 to a second selected angular position relative to the outer member 116, which also drives the protruding and receding rotor portions 110 and 112 (FIG. 6A-6D) to a second selected phase angle relative to the crankshaft 18 (FIG. 4) due to the relationship between the angular position of the hub 118 and the phase angle of the protruding and receding rotor portions 110 and 112 described above. The chamber 143a essentially has zero volume in the view shown in FIG. 5D since substantially all of the hydraulic fluid has been vented from it.

When in the position shown in FIG. 5D, the difference in hydraulic pressure across the rotary piston lobes 148 locks the hub-associated actuator member 140 (and therefore the hub 118) to the toothed outer member 116 in a second selected angular position relative to the toothed outer member 116.

Additionally, in the embodiment shown in FIGS. 5A-5E, an optional lock pin 150 is provided in one of the rotary piston lobes 148. The lock pin 150 can be extended or retracted axially by any suitable pin mover 151, such as a small hydraulic ram, a solenoid or any other suitable device. When the lock pin 150 is extended it may engage a locking notch 152 (FIG. 5B) in the toothed outer member 116, thereby mechanically locking the hub-associated actuator member 140 (and therefore the hub 118) to the toothed outer member 116 in a third selected angular position relative to the toothed outer member 116 (FIG. 5E), which is intermediate the first and second angular positions shown in FIGS. 5C and 5D (and is typically the camshaft nominal angular position.)

In the embodiment shown in FIGS. 5A-5E, the connection of the rotary piston 146 to the camshaft 26 means that movement of the hub/cam-associated actuator member 140 to the first selected angular position relative to the toothed outer member 116 also drives the camshaft 26 (FIG. 4) to a first (e.g. advanced) timing position (i.e. phase angle) relative to the crankshaft 18, movement of the hub/cam-associated actuator member 140 to the second selected angular position relative to the toothed outer member 116 also drives the camshaft 26 (FIG. 4) to a second (e.g. retarded) timing position (i.e. phase angle) relative to the crankshaft 18, and movement of the hub/cam-associated actuator member 140 to the third selected angular position relative to the toothed outer member 116 also drives the camshaft 26 (FIG. 4) to a third (e.g. intermediate) timing position (i.e. phase angle) relative to the crankshaft 18. Thus, the actuator 114 is also the VVT system for the engine 100 and the actuator 114 may also be referred to as the VVT system 114. Advantageously, relatively few additional parts are needed to provide the engine 100 with the torque correction system 104 over and above what is already present for providing VVT capability.

Hydraulic fluid may be introduced into the chamber portions 143a and 143b (and to the hydraulic ram) through the camshaft 26, and through a suitable valve, such as through a spool valve (not shown), as is well known in the art for use in controlling the operation of hydraulic VVT systems.

Figure 7A:
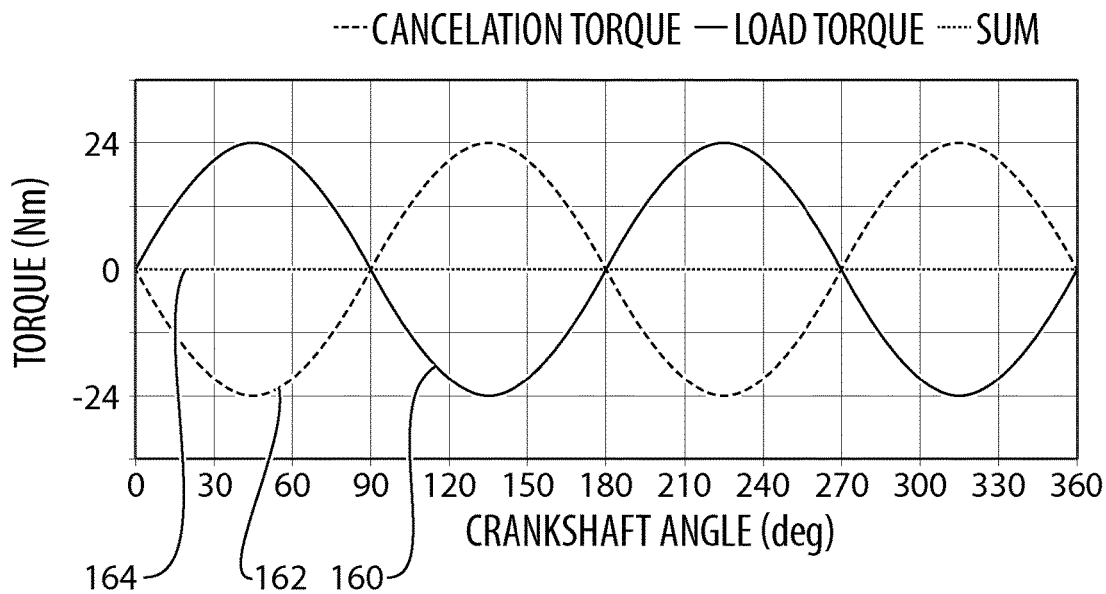
FIGS. 7A and 7B are graphs showing the corresponding phase shift of the second order load torque and of the corrective torque using the torque correction rotor shown in FIGS. 5A and 5B.
Figure 7B:
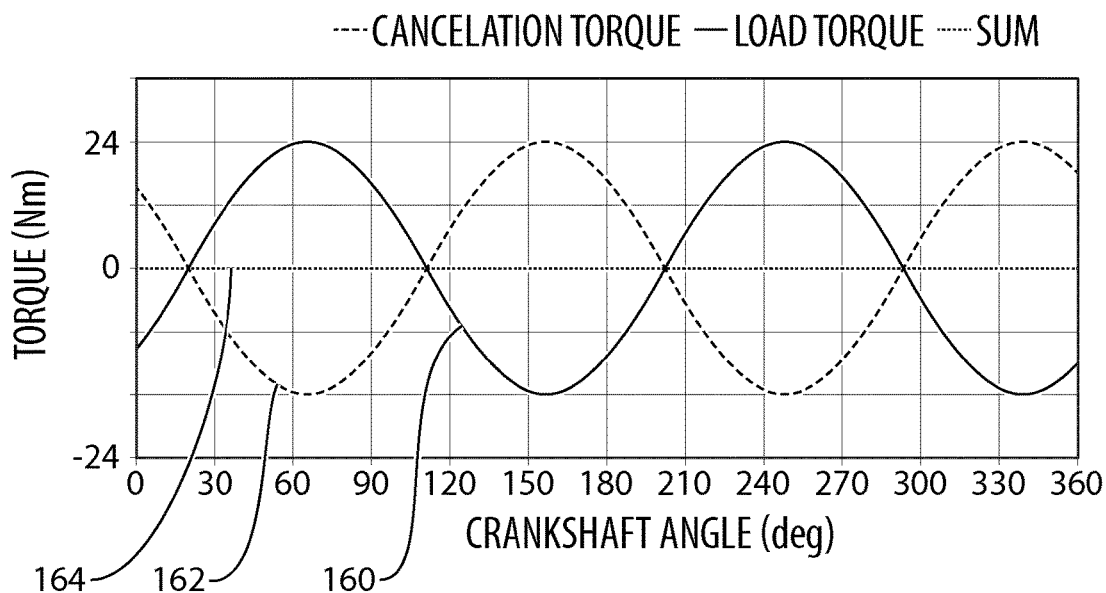

In the embodiment shown in FIGS. 5A-5E, it can be seen that the hub 118 is connected to the camshaft 26. Therefore, the angular positions of the protruding and receding hub portions 124 and 126, and by extension the protruding and receding rotor portions 110 and 112, are fixed relative to the camshaft 26. It can be seen that this remains true for each of the angular positions shown in FIGS. 5C-5E. Thus, the protruding and receding rotor portions 110 and 112 remain in a fixed angular position relative to the camshaft 26 even during adjustment of the angular position of the camshaft 26 relative to the crankshaft 18. As a result of this, the phase angle of the fluctuating corrective torque, whose phase angle relative to the crankshaft 18 is determined by the angular positions of the protruding and receding rotor portions 110 and 112, is always shifted by the actuator 114 to match the phase angle of the corresponding fluctuating valve torque, and can practically reduce or substantially fully cancel the fluctuating valve torque at all phase angles relative to the crankshaft) of the fluctuating valve torque for at least one engine speed and most likely over a substantial speed range. This is illustrated in FIGS. 7A and 7B. In the position shown in FIG. 7A, the second order valve torque is shown at 160. The phase angle of the camshaft 26 (and therefore the phase angle of the protruding and receding rotor portions 110 and 112) may be as shown in FIG. 5C. As can be seen, the fluctuating corrective torque, shown at 162, substantially cancels the second order fluctuating valve torque, resulting in a net torque 164 that is substantially zero.

When the actuator 114 drives the rotary piston 140 to the second position shown in FIG. 5D, the camshaft 26 is moved with the rotary piston 140 and so the phase angle of the valve torque 160 is shifted to the position shown in FIG. 7B wherein it is retarded relative to the phase angle shown in FIG. 7A. Because the hub 118 moves with the camshaft 26 however, the phase angle of the fluctuating corrective torque in FIG. 7B is also retarded relative to its phase angle in FIG. 7A, and so the fluctuating corrective torque 162 continues to substantially cancel the fluctuating valve torque 160.

Figure 8:
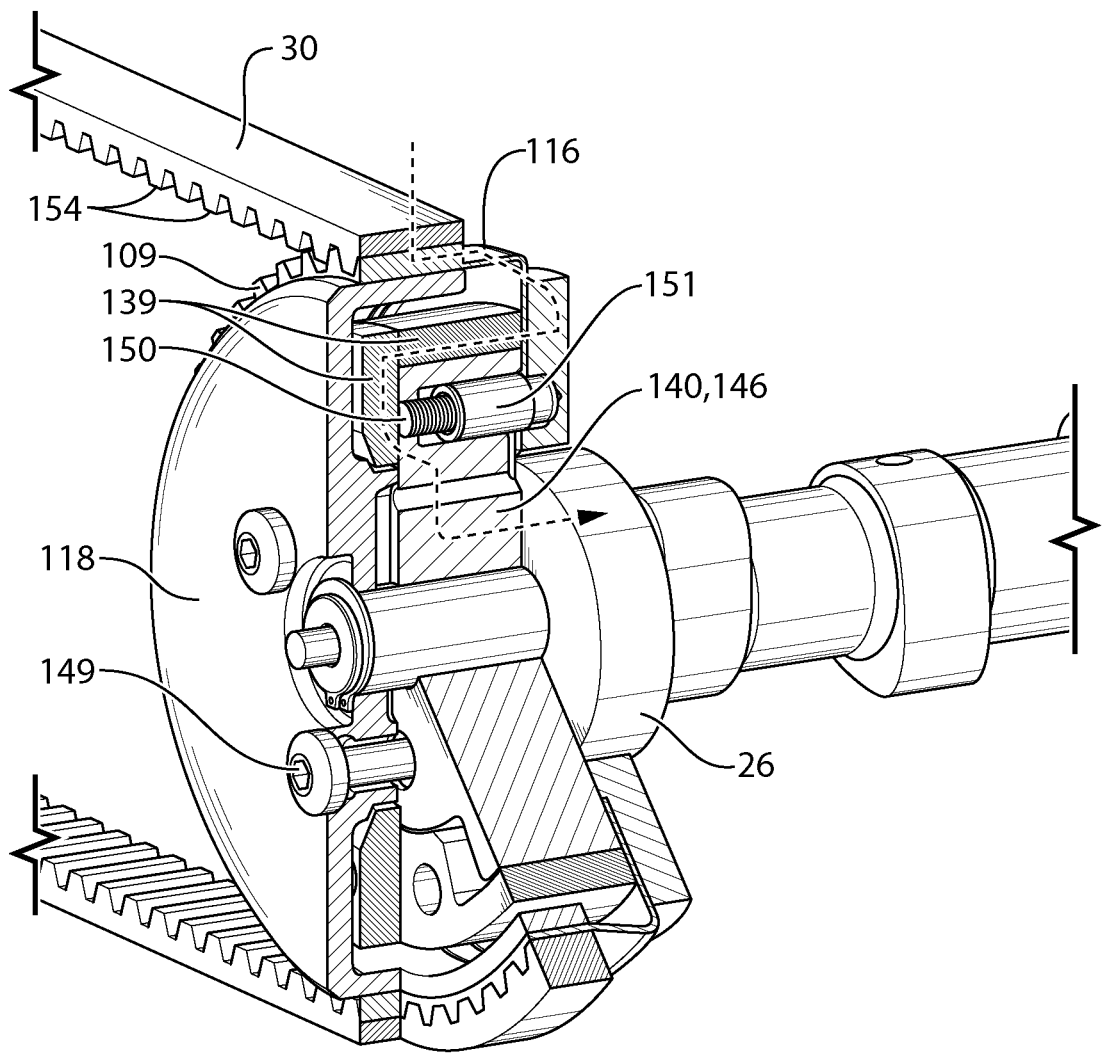
FIG. 8 is a perspective cutaway view of the torque correction rotor shown in FIGS. 5A and 5B, illustrating the torque path through it.

FIG. 8 shows a portion of the torque path 168 extending from the crankshaft 18 (FIG. 4) to the camshaft 26. The crankshaft 18 rotates the continuous-loop elongate drive structure 30, causing a tension differential between the tight and slack side spans. The elongate drive structure 30 in turn imparts a torque on the toothed outer member 116 by engagement of the teeth on the elongate drive structure 30 (shown at 154 with the teeth 109 on the toothed outer member 116. The torque is transferred through the toothed outer member 116 and into the outer-member-based actuator member 139, and from the outer-member-associated actuator member 139 into the hub-associated actuator member 140 (since they are locked together either by hydraulic pressure or by the lock pin 150.) The torque is then transferred into the camshaft 26.

In the embodiment shown in FIGS. 5A and 5B, the actuator 114 is a hydraulic actuator, however other types of actuator could alternatively be used, such as an actuator that includes an electric motor.

Figure 9A:
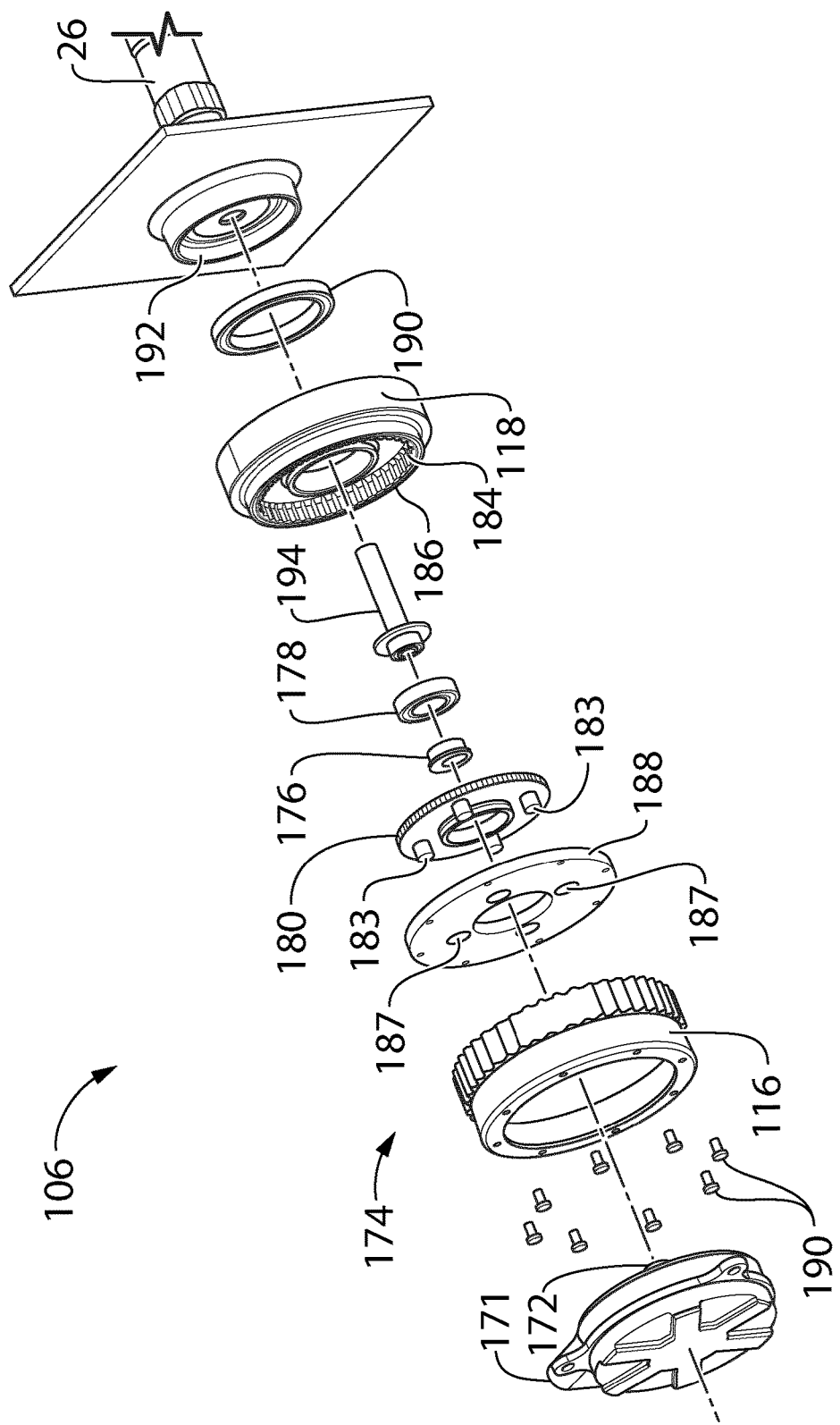
FIG. 9A is a perspective exploded view of the torque correction rotor shown in FIG. 4, but employing an electric motor for actuation instead of the hydraulic actuator shown in FIG. 5A.

FIG. 9A shows the torque correction rotor 104 but with an electrically powered actuator shown at 170. The electric actuator 170 includes an electric motor 171 with an output shaft 172 that may be operatively connected to the hub 118 with any suitable gear-train, such as by means of a cycloidal drive 174. In the embodiment shown in FIG. 9A, the cycloidal drive 174 includes an offset hub 176, a bearing 178, a cycloidal disk 180 with first gear teeth 182 thereon and with offset drive pins 183 thereon. The first gear teeth 182 mesh with second gear teeth 184 on a ring gear 186 that is formed into the hub 118 of the torque correction rotor 106. The offset drive pins 183 engage offset drive apertures 187 that are provided on a base disc 188 that is connected to the toothed outer member 116 (e.g. via mechanical fasteners 190).

The offset hub 176 is mounted to the motor output shaft 172, e.g. by press-fit. The bearing 178 is mounted onto the offset hub 176. The cycloidal disk 180 is mounted on the bearing 178. The offset drive pins 183 of the cycloidal disk 180 are positioned loosely in the offset drive apertures 187, as is known in the art of cycloidal drives. During operation of the motor 171, the offset hub 176 orbits about the axis of the motor output shaft 172. The cycloidal disk 180, which is constrained to small circular orbits, is caused to orbit in a small circle. This motion of the cycloidal disk 180 drives the ring gear 186 by a small amount in a particular rotational direction, which in turn drives the hub 118 to rotate by a small amount about its own axis. The hub 118 is supported on a torque correction rotor hub bearing 190 that is itself mounted to a stationary surface (e.g. shown at 192) relative to the engine 100. The hub 118 is rotationally connected to the camshaft 26 by means of a mechanical fastener 194.

Because of the engagement of the offset drive pins 183 with the offset drive apertures 187, the cycloidal drive 174 urges the hub 118 and the toothed outer member 116 in opposite directions to one another. Because the toothed outer member 116 cannot rotate relative to the crankshaft 18 since the toothed outer member 116 is fixed rotationally to the elongate drive structure 30 (FIG. 4), the rotational drive force is transferred solely to the hub 118 to drive the hub 118 in the opposite direction to the rotational direction.

Once the motor 172 stops rotating the hub 118, the hub 118 and the outer member 116 are locked rotationally to one another.

Figure 9B:
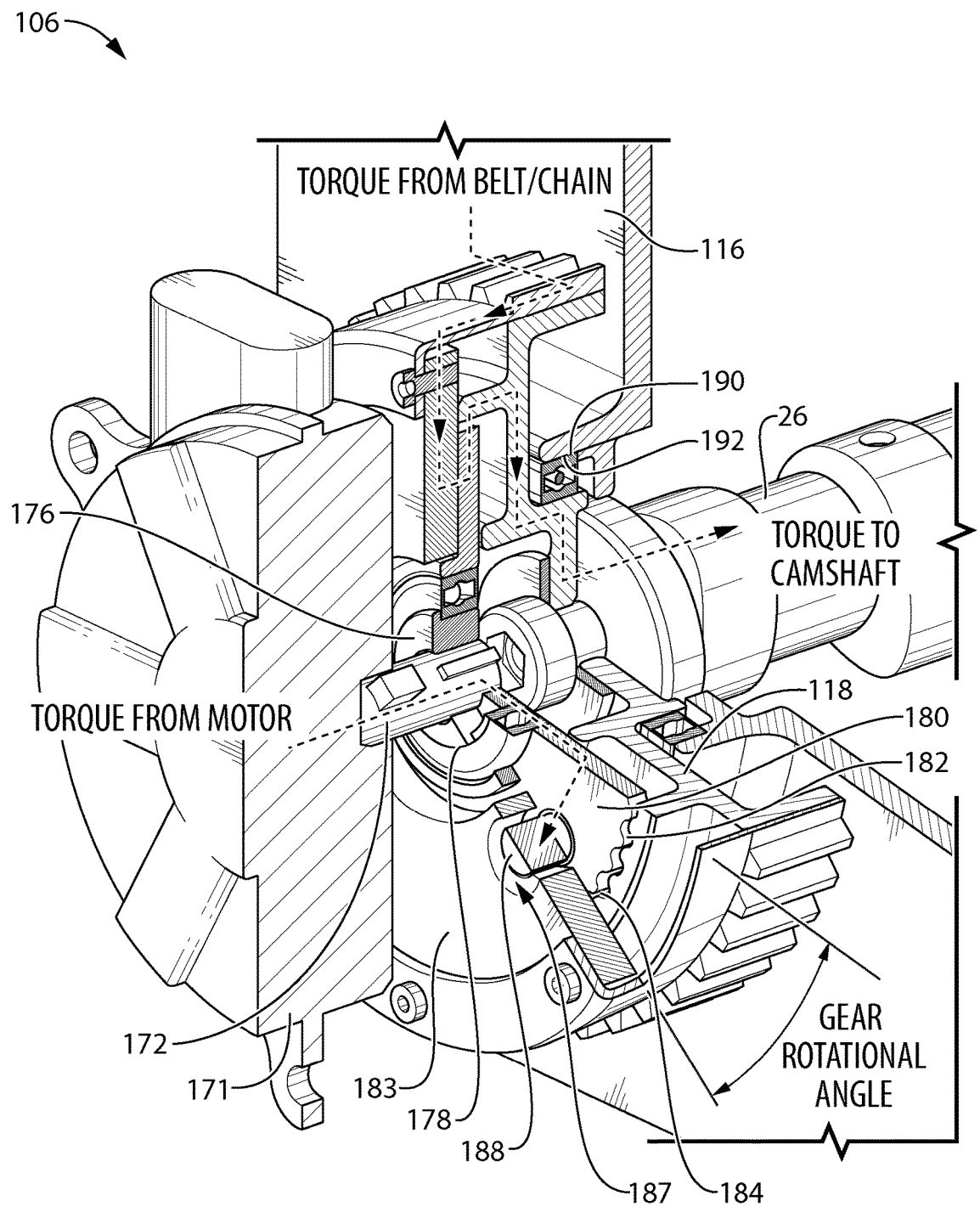
FIG. 9B is a perspective cutaway view of the torque correction rotor shown in FIG. 9A, illustrating torque paths through the torque correction rotor.

FIG. 9B is a cutaway perspective view illustrating a torque flow path 196 through the torque correction rotor 106. The torque flows from the elongate drive structure 30 (not shown in FIG. 9B) into the toothed outer member 116, through the offset drive apertures 187 into the offset drive pins 183 on the cycloidal disk 180, through the first gear teeth 182 on the cycloidal disk 180 to the second gear teeth 184 on the ring gear 186 of the hub 118, and from the hub 118 into the camshaft 26.

FIG. 9B also shows a torque flow path 198 from the motor 171 to the hub 118, which is as described above. The motor 171 drives the motor output shaft 172 which imparts torque to the offset hub 176, which in turn imparts torque to the cycloidal disk 180, which imparts torque in one direction to the outer member 116 via engagement of the offset drive pins 183 in the offset drive apertures 187, and in an opposite direction to the hub 118 via engagement of the first and second gear teeth 182 and 184.

The use of an electric motor and cycloidal drive as shown in FIGS. 9A and 9B has several benefits as compared to the use of a hydraulic actuator. More specifically, the electric motor and cycloidal drive are useable substantially without limitation to reach any phase angle for the camshaft 26 and the hub 118 relative to the outer member 116 and the crankshaft 18. By contrast, the hydraulic actuator shown in FIGS. 5A-5E may be useable to reach two positions or three positions if the lock pin 150 is provided and is only operable through a relatively limited angular range, although this range may be sufficient for many applications.

Aside from the use of the cycloidal drive 174, the operation of the hub 118 and the outer member 116 in FIGS. 9A-9B may be similar to their counterparts in the embodiment shown in FIGS. 5A-8.

FIGS. 10A and 10B are perspective views illustrating an optional feature that can be provided, wherein the hub 118 radially supports the toothed ring 120 of the toothed outer member 116 via a plurality of rollers 200. As seen best in the isolated view of the hub 118 in FIG. 10B in which the rollers are removed, the hub 118 has a segmented non-circular periphery 122' defining individual pockets 202. The rollers 200 are seated in these pockets 202. The rollers 200 protrude by some amount radially from the pockets 202. (FIG. 10A). The rollers 200 reduce the amount of friction during relative motion between the hub 118 and the outer member 116. While the rollers 200 are shown to be generally cylindrical in shape, it will be understood that they could alternatively have any other suitable shape such as a spherical shape (i.e. balls). In another alternative, the rollers 200 could be mounted in the toothed ring 120, though it will be understood that sufficient flexibility of the toothed ring 120 would need to be maintained. In embodiments where the rollers are not provided friction reducing coatings may be applied to the inner side of the toothed ring 120 and the periphery 108 of the hub 118. In the alternative a lubricant such as grease can be placed between these surfaces provided that a flexible seal is provisioned between the toothed outer member 116 and hub 118 to prohibit lubricant egress.

Figure 11A:
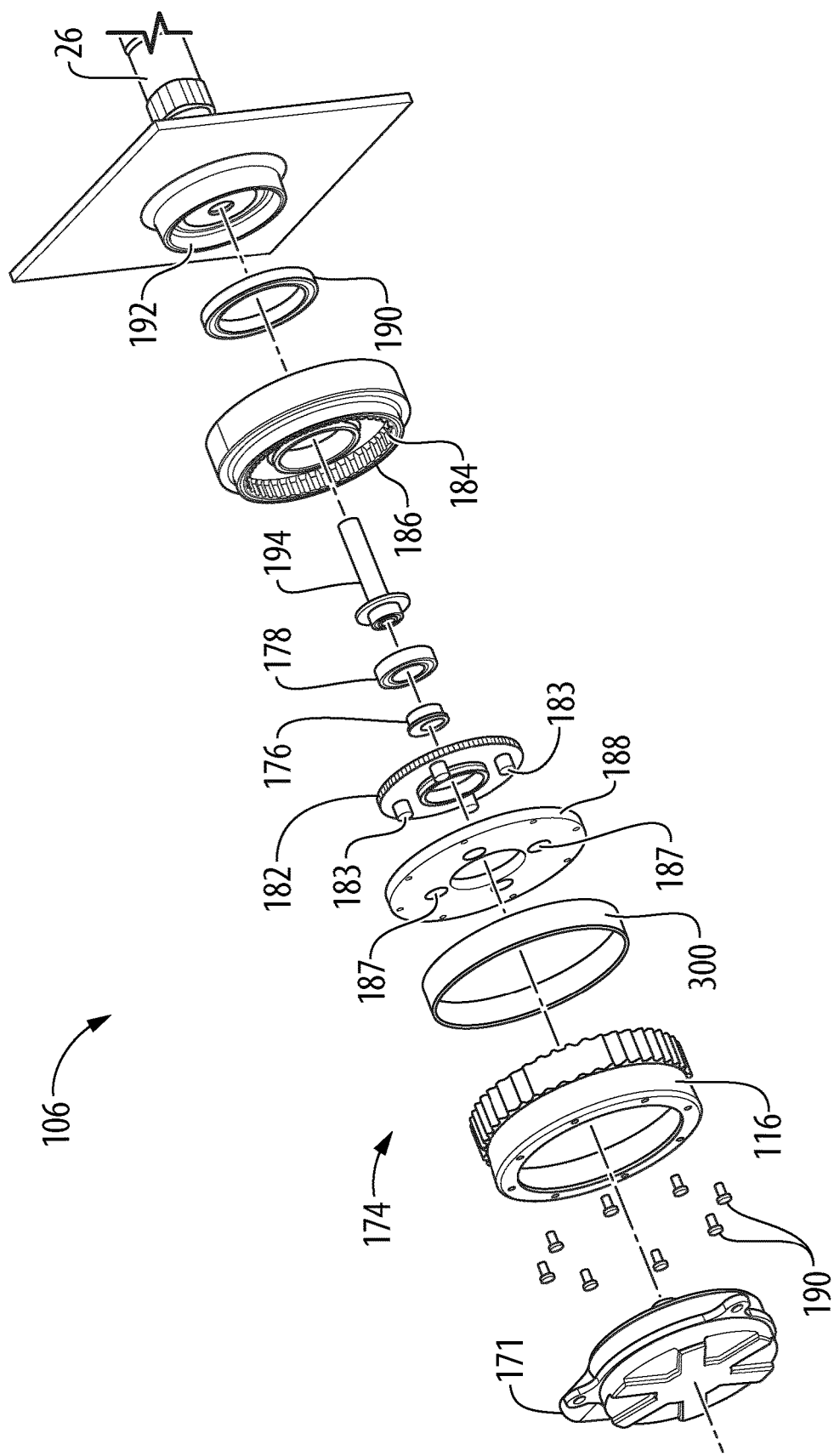
FIG. 11A is a perspective exploded view of the torque correction rotor shown in FIG. 9A with an additional sleeve of varying thickness as part of the outer member of the torque correction rotor.

FIG. 11A is a perspective exploded view of another embodiment of the torque correction rotor 106, in which a sleeve 300 having a radial thickness RTSL (see FIGS. 11C and 11D) that varies along its circumference, is provided (fixedly) on the toothed ring 120 of the outer member 116, so that the radial thickness RT of the toothed ring 120 varies along its circumference.

Figure 11B:
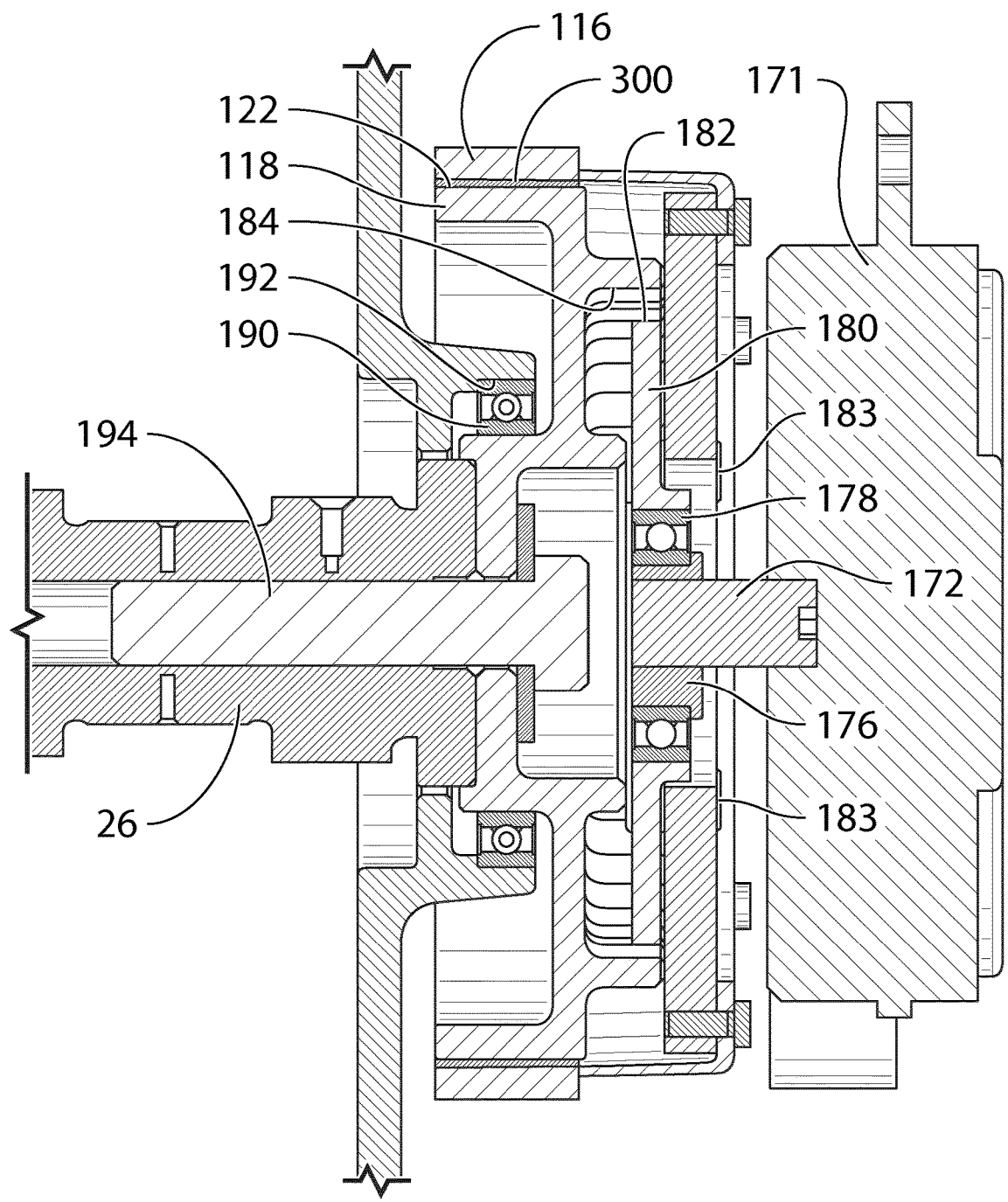
FIG. 11B is a sectional elevation view of torque correction rotor shown in FIG. 11A.

FIG. 11B is a sectional side view of the torque correction rotor 106 of FIG. 11A.

Figure 11C:
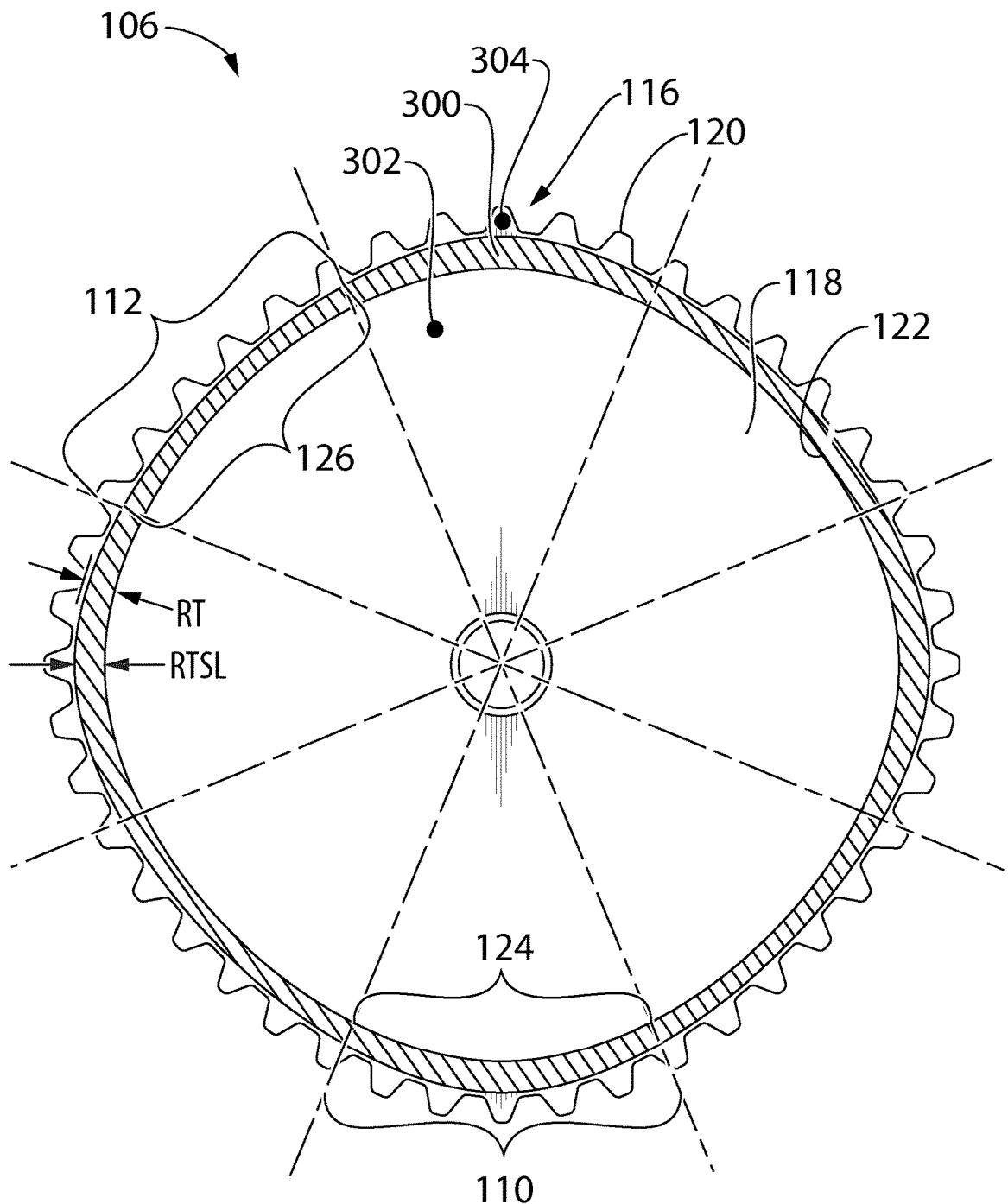
FIGS. 11C and 11D are elevation views of the torque correction rotor of FIGS. 11A and 11B, in two different positions.
Figure 11D:
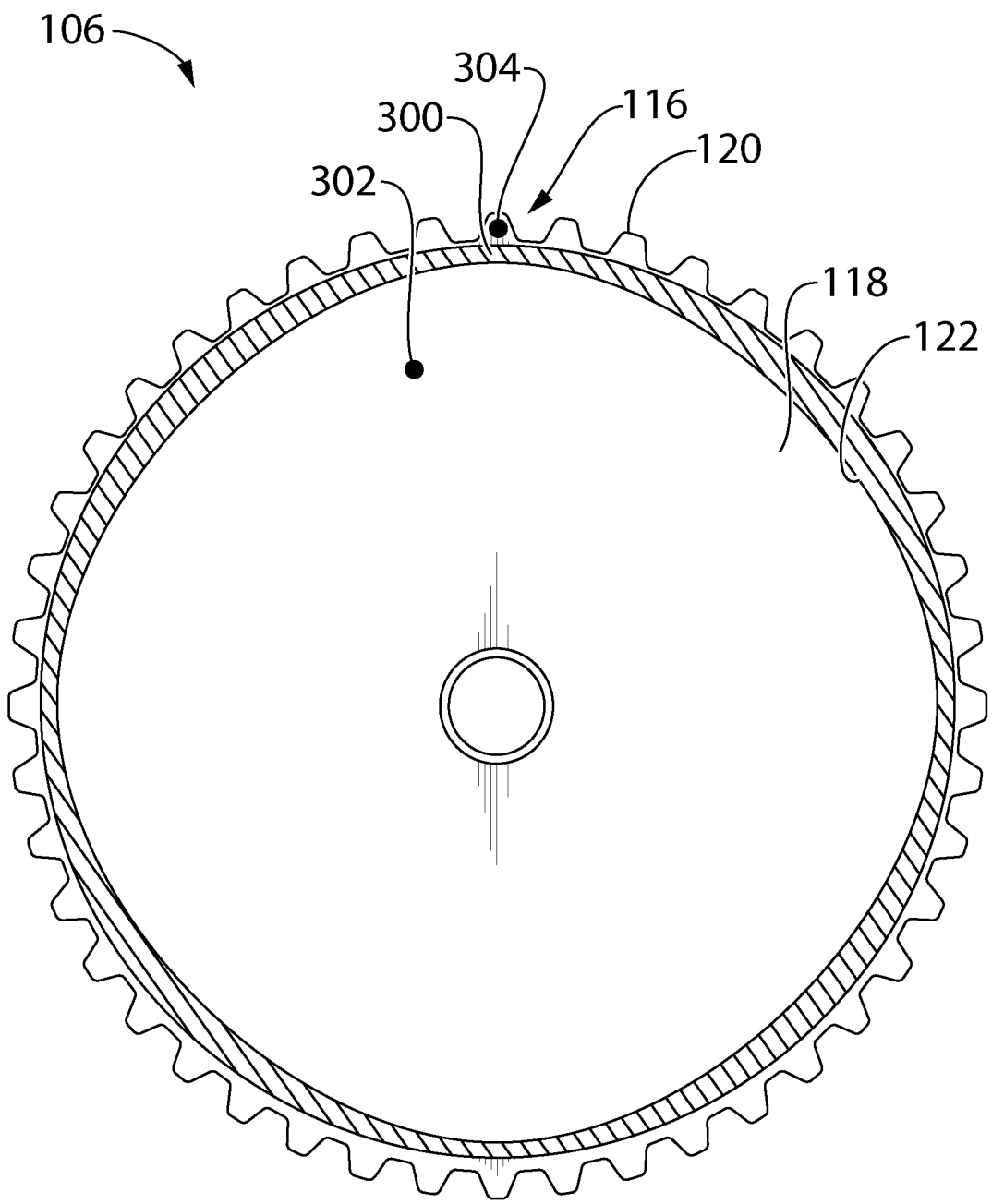

FIG. 11C is an elevation view of the torque correction rotor 106 where the hub 118 has a first phase angle relative to the toothed ring 120 (as can be seen from the markers 302 and 304 shown on the hub 118 and toothed ring 120, respectively). In the angular position shown in FIG. 11C, the torque correction rotor 106 has distinct protruding rotor portions 110 and distinct receding rotor portions 112. However, when the hub 118 is rotated relative to the toothed ring 120 by a selected amount, the thickness variations of the toothed ring 120, in combination with the differences in the eccentricities of the protruding and receding hub portions 124 and 126, may provide the torque correction rotor 106 with different eccentricities, even substantial elimination of of the protruding and receding rotor portions 110 and 112. In other words, by varying the radial thickness of the toothed ring 120 and providing the hub 118 with protruding and receding hub portions 124 and 126, one can have a torque correction rotor having a major diameter and minor diameter that vary based on the phase angle of the hub 118 (and therefore the camshaft 26) relative to the crankshaft 18. As a result, the amplitude of the fluctuating corrective torque can be varied based on the phase angle of the camshaft 26 relative to the crankshaft 18.

This can be valuable in situations where the fluctuating valve torque incurred by the camshaft 26 varies depending on the engine speed. For example, FIG. 3B shows a situation where the magnitude of the second order fluctuating valve torque varies somewhat over engine speed. In such a situation where it is preferable to change the camshaft timing for different engine speeds (e.g. for reasons of performance or fuel economy), the movement of the hub 118 that accompanies the phase shift of the camshaft 26 can result in a change in the magnitude of eccentricity of torque correction rotor 106 and therefore a change in the magnitude of the fluctuating corrective torque generated thereby. Thus, the torque correction rotor 106 could, for example, be moved to the position shown in FIG. 11C when the engine is at one engine speed so as to provide a first magnitude of fluctuating corrective torque and could be moved to the position shown in FIG. 11D when the engine is at another engine speed so as to provide a second magnitude of fluctuating corrective torque.

Figure 12A:
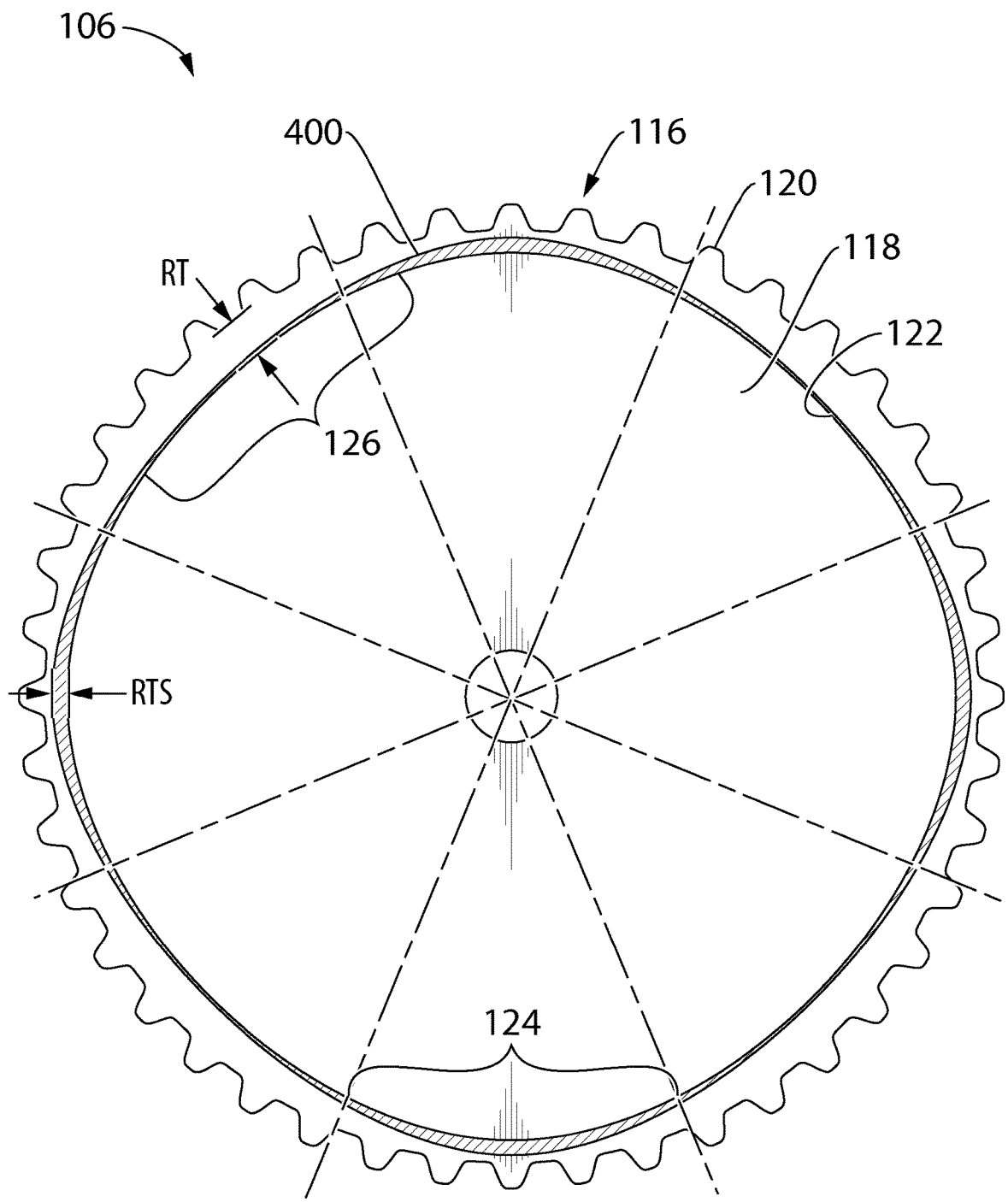
FIG. 12A is an elevation view of the torque correction rotor shown in FIGS. 5A-11D, but with an optional sleeve that is independently movable relative to a hub and an outer member.

FIG. 12A is an example of a torque correction rotor 106 in which there is a toothed ring 120 that is part of outer member 116 and which has a radial thickness RT that varies about its circumference, a hub 118 that has, as in other embodiments, a plurality of protruding and receding hub portions 124 and 126, and an additional, independently movable sleeve 400 between the hub 118 and the toothed ring 120. The sleeve 400 has a radial thickness RTS that varies about its circumference. As a result, the magnitude of the eccentricities on the major radii and on the minor radii can be adjusted while keeping the phase angle of the hub 118 and therefore the camshaft 26 (FIG. 4) constant relative to the crankshaft 18. This can be valuable, for example, in a situation where it is desired to keep the camshaft 26 in the same position at different engine speeds, but where the magnitude of the fluctuating valve torque changes between the engine speeds. In such a situation the sleeve 400 can be rotated to cause a change in the magnitude of the fluctuating corrective torque applied by the torque correction rotor 106 without changing the phase angle of the torque correction rotor 106 relative to the crankshaft 18.

Figure 12B:
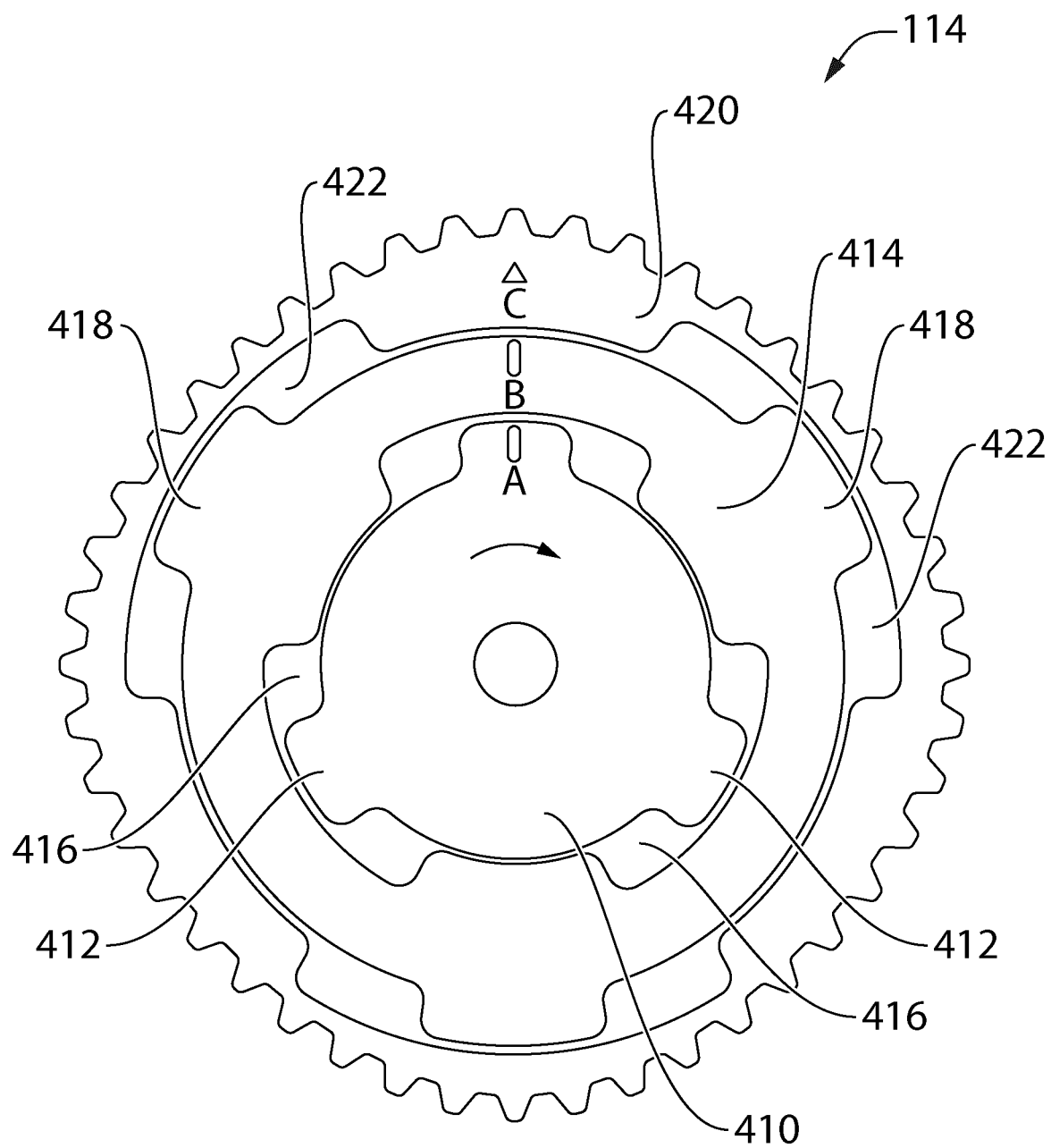
FIG. 12B is an elevation view of an actuator for the optional sleeve shown in FIG. 12A.

In order to control the movement of the hub 118, the outer member 116 and the sleeve 400, a three-member actuator 114 may be provided as shown in FIG. 12B. In the embodiment shown, the three-member actuator 114 is a three-member hydraulic actuator, and includes a first rotary piston 410 with first rotary piston lobes 412 thereon, which is movable inside a second rotary piston 414 that defines first chambers 416 for the first rotary piston lobes 412 and that has second rotary piston lobes 418 thereon, and which is in turn movable inside a housing element 420 that defines second chambers 422 for the second rotary piston lobes 418. The first rotary piston 410 may be connected to the camshaft 26 and to the hub 118, the second rotary piston t 414 may be connected to the sleeve 400, and the housing element 420 may be connected to the toothed outer member 116. By introducing hydraulic pressure into portions of the first and second chambers 416 and 422 as needed the positions of the hub 118, the sleeve 400 and the toothed outer member 116 can all be moved independently of each other.

Figure 13A:
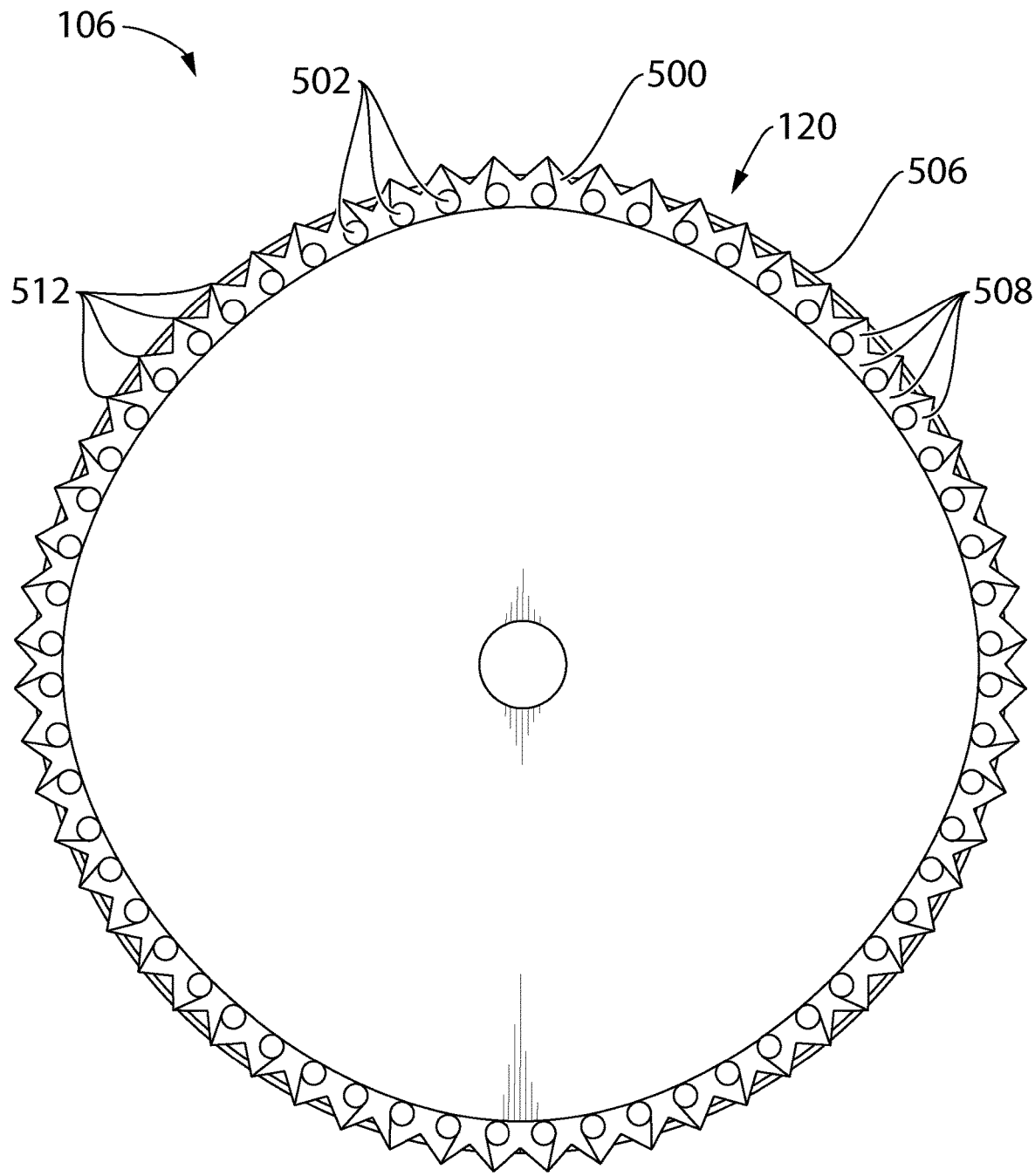
FIG. 13A is an elevation view of an alternative torque correction rotor, in which a toothed ring is provided by an inverted tooth chain on a chain support, and is mounted on a non-round hub.

FIG. 13A is an elevation view of an alternative torque correction rotor 106, in which a toothed ring 120 is provided by an inverted tooth chain 500 mounted via a plurality of pins 502 to radially slotted apertures 504 (FIG. 13B) of an inverted tooth chain support ring 506 (which in turn extends from a base portion that may be similar to the base portion 130 shown in other figures). The torque correction rotor 106 further includes the hub 118 that is similar to the hubs 118 described above in relation to the embodiments shown in FIGS. 5A-12.

Figure 13B:
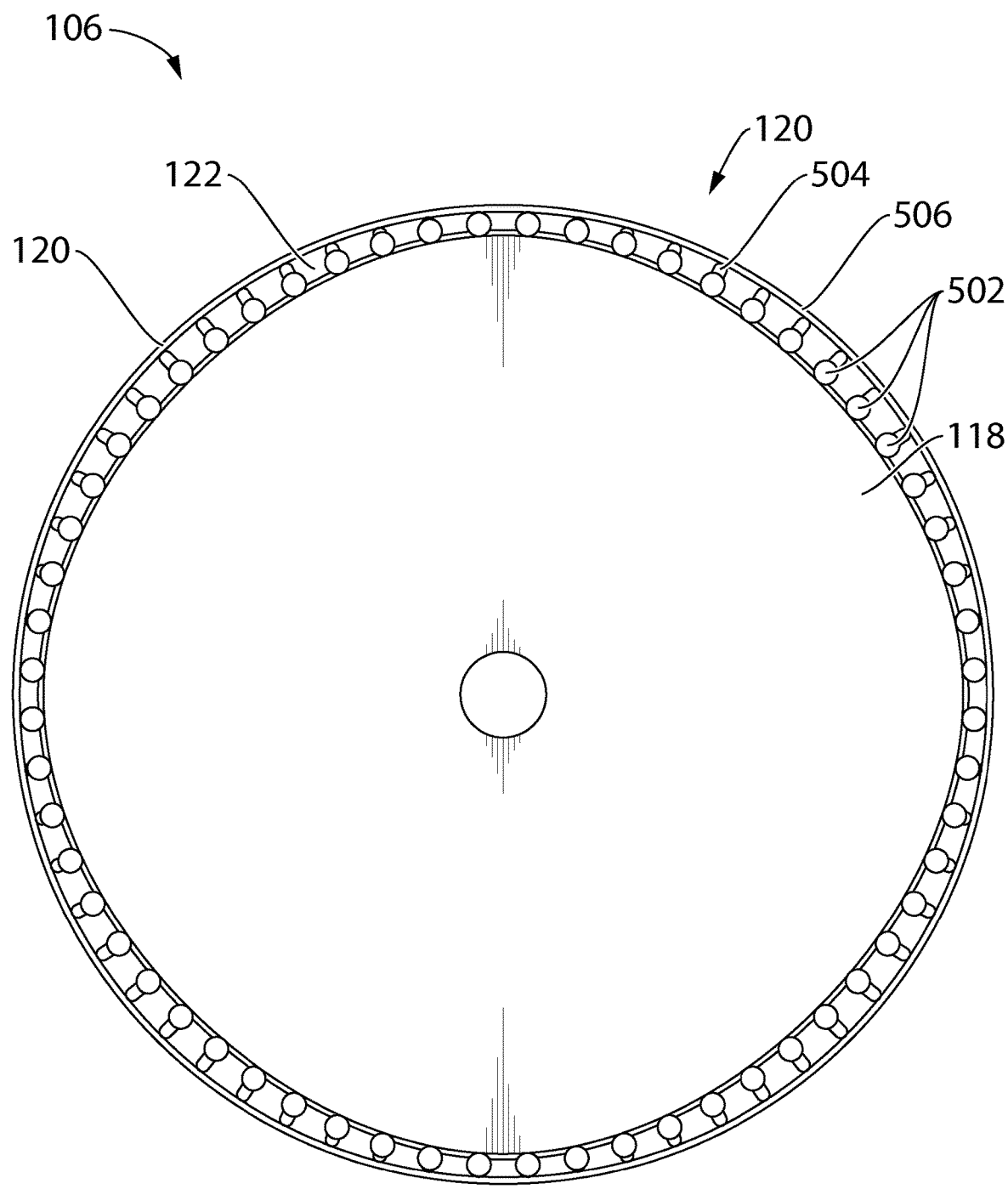
FIG. 13B is an elevation view of the torque correction rotor shown in FIG. 13A.
Figure 13C:
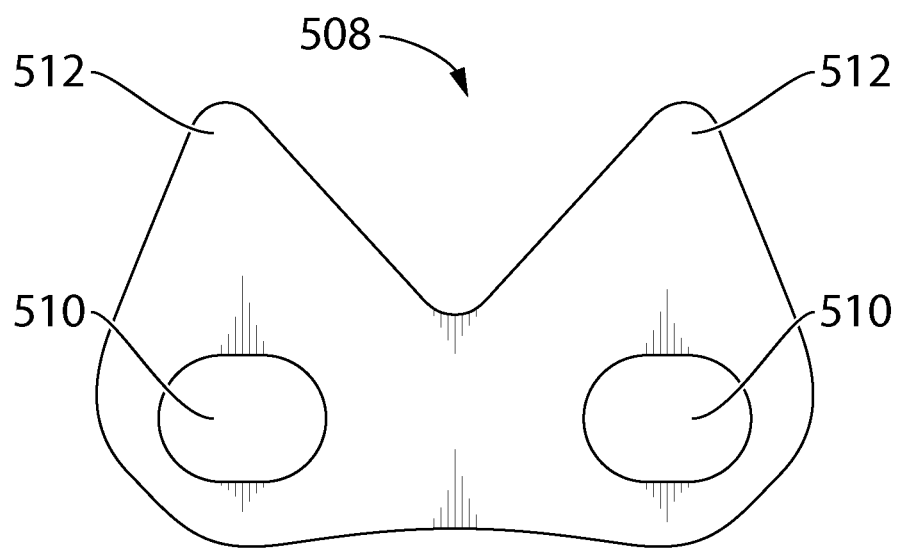
FIG. 13C is a magnified view of a link from the inverted tooth chain shown in FIG. 13A.

FIG. 13B is an elevation view of the toothed ring 120 shown in FIG. 13A but without the inverted tooth chain 500 so as to more clearly show the radially slotted apertures 504. The radially slotted apertures 504 may be sufficiently wide to permit the pins 502 to adjust themselves circumferentially as needed when moving either inwardly or outwardly radially in the slotted apertures 504. Alternatively, each of the links (shown at 508) of the chain 500 (one of which is shown in FIG. 13C) may itself have circumferentially slotted apertures 510 to permit self-adjustment circumferentially as the pins 502 move in and out radially and therefore change their circumferential proximity to one another.

In the view shown in FIG. 13B it will be noted that the peripheral edge 122 of the hub 118 obscures some of the slotted apertures 504 and so it appears from the image in FIG. 13B that some of the apertures 504 are not slotted. However, it is only because the protruding hub portions 124 are obscuring any nearby slotted apertures 504 and is supporting any nearby pins 502 at the radially outward ends of the respective slotted apertures 504.

The teeth of the invented tooth chain 500 are shown at 512 and are configured to engage a synchronous elongate drive structure 30 that is a timing chain.

Aside from the use of the inverted tooth chain 500, the toothed ring 120 may operate in much the same way as the toothed ring 120 used in the embodiments shown in FIGS. 5A-12.

Figures 14A, 14B:
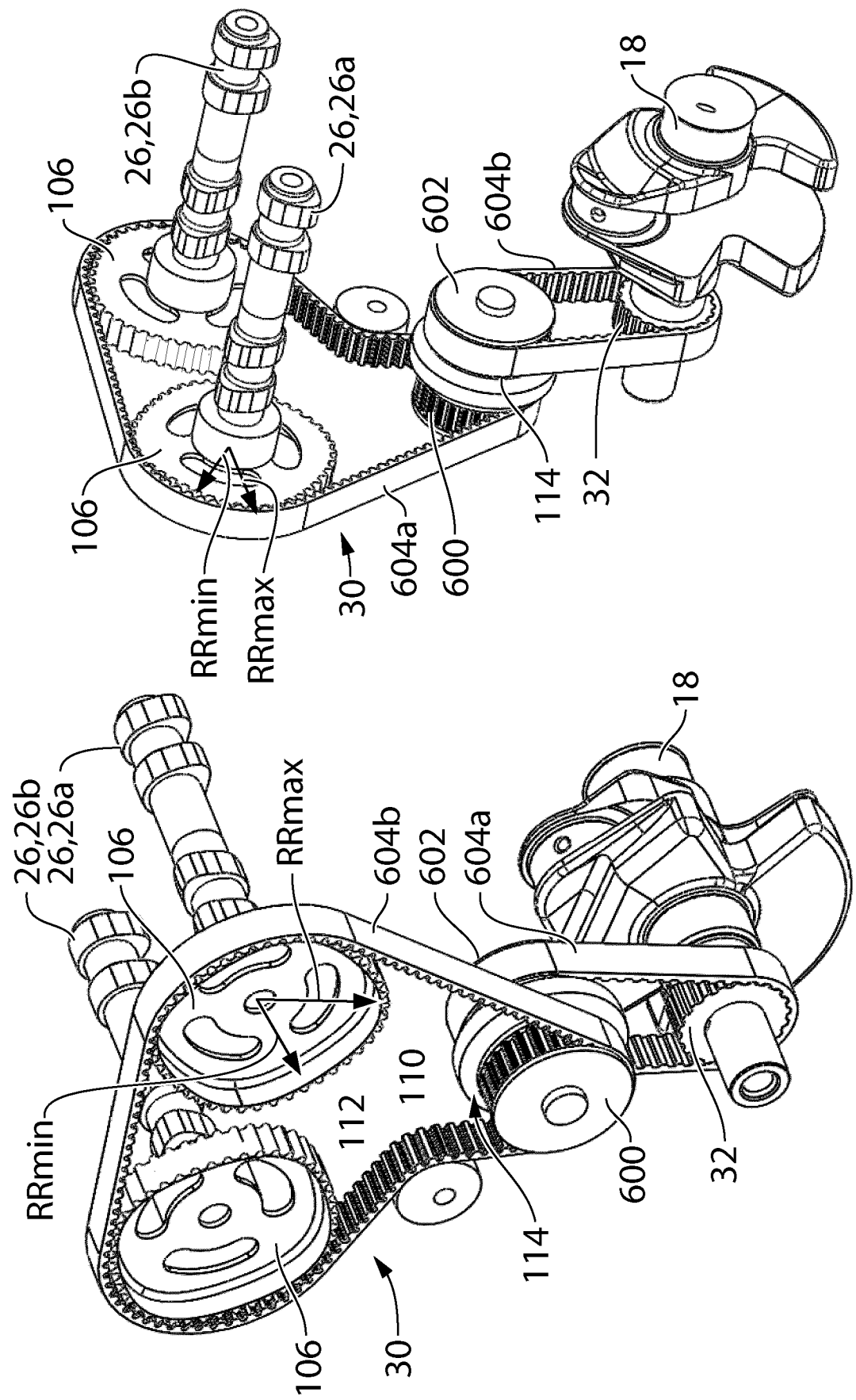
FIGS. 14A and 14B are perspective views of an alternative embodiment of a torque correction rotor.

Reference is made to FIGS. 14A and 14B which show an alternative torque correction rotor 106 (optionally provided as the rotor on each camshaft). In the embodiment shown in FIG. 14, the torque correction rotor 106 has a fixed shape instead of having a shape that is formed from a hub and an outer member that are movable relative to one another. In the embodiment shown in FIGS. 14A and 14B, the torque correction rotor 106 is fixedly connected to the camshaft 26 and has a peripheral edge 108 that has teeth 109 thereon positioned for engagement with a synchronous elongate drive structure 30 to transfer torque between the crankshaft 18 and the camshaft 26.

In the embodiment shown in FIGS. 14A and 14B, in spite of the fact that the torque correction rotor 106 has a fixed shape, its protruding rotor portions shown at 110 and its receding rotor portions shown at 112 are nonetheless adjustable relative to the crankshaft 18. In the embodiment shown, a first intermediate rotor 600 and a second intermediate rotor 602 are provided. The first intermediate rotor 600 is engaged with the elongate drive structure 30, and thus has a fixed phase angle with respect to the torque correction rotor 106 and the camshaft 26. In the embodiment shown the synchronous endless drive arrangement includes a first elongate drive structure 604a and a second elongate drive structure 604b operatively connects the crankshaft 18 with the second intermediate rotor 602.

The actuator 114 is provided between the first and second intermediate rotors 600 and 602. The actuator 114 may be similar to the hydraulic actuator shown in FIGS. 5A and 5B, or alternatively, the actuator 114 may be similar to the actuator shown in FIGS. 9A and 9B. The actuator 114 is operatively connected to the torque correction rotor 106 and is actuatable to adjust the angular positions of the protruding and receding rotor portions 110 and 112 relative to the crankshaft 18 during operation of the engine 100. In the embodiment shown the actuator 114 acts between the first and second intermediate rotors 600 and 602, and drives the first intermediate rotor 600 relative to the second intermediate rotor 602, thereby shifting the phase angle of the torque correction rotors 106 and the camshafts 26 relative to the crankshaft 18. The actuator 114 may include a first-rotor-associated actuator member which may be a rotary piston 146, which has rotary piston lobes 148 thereon which are movable in chambers 143 of a housing 141. The housing 141 may be connected to the first intermediate rotor 600, and the rotary piston 146 may be connected to the second intermediate rotor 602.

Persons skilled in the art will appreciate that there are yet more alternative implementations and modifications possible, and that the above examples are only illustrations of one or more implementations. For example, while the embodiments discussed above have shown the hub 118 fixed to the piston 146, in alternative embodiment the hub can be fixed to the cylinder of a rotary piston/cylinder combination. And while the electrical actuator has shown a cycloidal drive 174, any other gear-train, such as a planetary gear set, can be utilized to connect the motor 171 to the hub 118 or outer member 116 for effecting relative motion therebetween.

Having described various implementations of the torque correction system 104, the discussion will now focus on determination of the angular orientation and magnitude of eccentricity for the non-circular rotors 106 shown in the embodiment of FIGS. 4-6E. The principles behind these determinations should all be understood to the person skilled in the art from U.S. Pat. No. 7,232,391.

In this particular example, the goal is to reduce the fluctuating valve torques coming from each of the camshafts 26a, 26b. Each torque correction rotor 106a and 106b will be non-circular to counteract the corresponding fluctuating intake or exhaust valve torque, and the crankshaft rotor 102 will be circular as in this example it would be redundant to generate a fluctuating corrective torque from the crankshaft rotor. (Of course, in other implementations the crankshaft rotor may be non-circular to counteract other sources of vibration such as fuel pump torque fluctuations, or the crankshaft rotor 102 may be non-circular in order to generate a small fluctuating corrective torque in combination with any corrective torque generated by non-circular rotor 106.) The discussion will focus on one torque rotor 106b, it being understood that the other torque rotor 106a can be similarly considered.

First, the non-circular rotor 106b must have appropriate shape. Since the non-circular profile is applied on the camshaft rotor, and since in this four-cylinder engine example the camshaft applies four pulsations per revolution of the camshaft rotor (one pulse for every one of the four intake—or exhaust—valves), the non-circular rotor 106b should have a "rounded square" shape. (In a three-cylinder engine the non-circular camshaft rotor should have a trigonal shape and in a two-cylinder engine the non-circular camshaft rotor should have an oval shape.)

There are at least two approaches to obtaining an effective magnitude of eccentricity and/or angular orientation for the non-circular profile, one being through calculation or computation, and the other being through iteration. The two approaches may, of course, be combined.

The computational approach requires numerical targets. The magnitude of eccentricity for the non-circular profile is related to the magnitude of fluctuating corrective torque to be generated by the non-circular profile, which should be related to the magnitude of the (typically nominal) fluctuating valve torque to be counteracted. There a number of methods to obtain the fluctuating valve torque, presented here in order of cost. First, the engine designer (original equipment manufacturer or its subcontractor) will typically design an engine and its valve train with the aid of a simulation program. This program will typically generate a valve torque that can be used by timing drive designers in a timing drive simulation and/or as a starting point for design of the non-circular rotor. Second, one can measure the valve torque in a constructed engine. One simple way to do so would be to remove the elongate drive structure from the engine and turn the camshaft by hand using a metered torque wrench to measure the valve torque. As the majority of the fluctuating valve torque is dictated by the strength of the valve springs, this method will yield a reasonable estimate of the valve torque when the engine is operated at speed. Third, a constructed engine can be configured to have its crankshaft driven by an electric motor and torque sensors can be mounted at the camshafts to measure the fluctuating valve torque. This method measures the fluctuating valve torque dynamically and thus will also capture the effect of valve spring inertia. Fourth, if it is possible to mount the constructed engine on a dynamometer that allows the engine to be precisely controlled, torque sensors can be mounted at the camshafts to measure the fluctuating valve torque on a fired engine. This is a relatively expensive proposition, and in the Applicant's experience, the pressure generated from combustion does not have a material effect on valve torque since the valves have a small cross-sectional area and are typically opened near atmospheric pressure.

Once the raw valve torque is captured a frequency analysis can be carried out to extract its spectral components. From this, an order and fluctuating corrective torque magnitude is selected. The particular example under consideration will be based on the data shown in FIGS. 3B and 3C. In this case, the second order is selected, it being observed that a corrective torque magnitude of 12 Nm (0-pk) would work well to counteract the (nominal) second order fluctuating valve torque at resonance and across the most used engine speed range of 1000-5000 RPM.

Next, consideration is given to the amplitude ΔL of periodic elongation and contraction of the elongate drive structure according to Hooke's law, which is dependent on a corrective torque magnitude $T_v$, a radius r of the rotor (in this example, the cam rotor) to which a fluctuating load torque is applied, and a stiffness coefficient k of the endless drive structure. The stiffness coefficient can be obtained from the formula k=dF/dL where dF is the force required to produce an increase of length dL of the chain or belt in the timing drive structure.

The stiffness co-efficient k may be provided by independent sources or may be measured for a particular endless drive structure. One method to obtain the stiffness coefficient k is to test and measure a subject chain or belt on a test mock-up layout identical with the layout of the subject timing drive. The stiffness is calculated as the ratio between chain or belt tension and displacement when the chain or belt is subjected to an applied force. For example, FIG. 15A shows a test setup 702 of an example timing drive layout 700, including crankshaft rotor 702, camshaft rotors 704, idler 706, tensioner 708, water pump rotor 710 which are all interconnected via belt 712. In the test setup, the belt 712 is installed with its typical preload force, or average tension during operation, e.g., 350N. To measure the tight side span (the right side, due to the direction or rotation being CW), the belt 712 can be locked onto the cam rotor 704, which is prevented from rotating. A controllable force F is used to stretch the belt 712 by an expected amount, e.g., ±0.5 mm so that a displacement/tension hysteresis curve, such as curve 720 shown in FIG. 15B, can be recorded. The value of k for the purposes of calculation can be obtained by determining a slope 724 of the hysteresis curve. If desired, a similar procedure can be used to determine k for the slack side, which should yield a similar value. The two results may be averaged to determine the stiffness or the two results may be used for separate calculations of ΔL for the tight and slack side. The hysteresis curve 720 can itself be used in simulation software for timing drives, which functions by considering very small changes of state in simulating timings drive dynamics.

As shown in FIG. 15C, a simpler method to obtain the hysteresis curve and the value of k is to merely stretch/release a straight segment of pre-tensioned belt or chain having a length L substantially the same as the tight or slack side spans, absent the length of wrap along intervening rotors. For instance, in the example layout 700 of FIG. 15A, the length L representative of the tight side is span lengths S1+S2 less wrap length C1. It is important to note, however, that the belt or chain should be mounted so that its engagement structures such as teeth mesh with the corresponding engagement structures of the pulleys or sprockets utilized in the test otherwise the protocol does not capture the effect of teeth flexure that occurs in operation.

In the particular example under consideration the stiffness co-efficient k for the tight and slack side is given as 600 N/mm and the nominal or reference radius of the cam rotor is 50 mm. Accordingly, $\Delta L = T_v/(rk) = 12$ Nm/(50 mm*600 N/mm)=0.4 mm.

To determine the magnitude of eccentricity for the non-circular rotor 106b an iterative computational approach can be utilized as seen in the exaggerated, not-to-scale schematic diagram of FIG. 16. Here, a computer aided design (CAD) program (e.g., Solidworks™ by Dassault Systèmes) can be used to lay out the timing drive. The reference circle for the cam rotor representing the nominal cam rotor radius (e.g., 50 mm) is shown by stippled line 111'. The belt 31' is laid out to connect with the reference circle 111' at a tangent point 750 on tight side 31R and at a tangent point 752 on the slack side 31L. (The circular profile can be referenced along the outer periphery of the rotor teeth or an intermediate position such as midway between tooth crown and tooth valley. The belt would be laid out using the corresponding reference.) The "rounded square" non-circular profile is shown at 108' with major radii RRmax. (The non-circular profile should be laid out using the same reference scheme as the circular profile, e.g., along the along the outer periphery of the rotor teeth or an intermediate position such as midway between tooth crown and tooth valley.) The CAD operator can iteratively adjust the magnitude and angular position of the major radii to achieve the desired ΔL, which is provisioned by an elongation and a corresponding contraction of the belt 31' embodied by greater and lesser wrap, respectively, of the elongate drive structure over the non-circular profile in comparison to the wrap over the circular profile. Continuing with the present example, an elongation of 0.2 mm is required in the arc length from point A to point B along the non-circular profile 108' less the arc length from point A to point B along the circular profile 111', where point A is the tangent point to the belt tight side 31R and point B is the bisector or midpoint of the rotor wrap angle. Likewise, a contraction of 0.2 mm is required in the arc length from point B to point C along the non-circular profile 108' less the arc length from point B to point C along the circular profile 111', where point C is the tangent point to the belt slack side 31L. Note that in practice the positions of the tangent points and size of the wrap angles will change a little with respect to the layouts of the circular and non-circular profiles 111' and 108'; for instance, in the schematic illustrated in FIG. 16 the slack side tangent point changes from point 752 to point 754 (and, although not illustrated in practice, the position of the tight side tangent point 750 will also change a little bit.) Once the major radii RRmax and its angular position θ are determined, the inner hub 118 can be configured and installed such that its major radius (RHmax) is positioned along the wrap at the angle θ from the tight side tangent point when the fluctuating valve torque is at its maximum in a direction opposite the direction of rotation.

As an alternative to a graphical determination, a decent approximation for the magnitude of eccentricity is given by $$e_d = n * \Delta L, \text{ or } e_r = \frac{n}{2} * \Delta L,$$

where $e_d$ is the diametrical difference between the non-circular profile and the corresponding reference circle; $e_r$ is the radial difference between the non-circular profile and the corresponding reference circle; and n is the number of protrusions. In the particular example under consideration of a "rounded squared" non-circular profile, n=4, so $e_d$=4*0.4 mm=1.6 mm and $e_r$=0.8 mm. (For an oval non-circular profile n=2, for triangular non-circular profile n=3.) A good approximation for the angular position θ for orientating the major radius of the inner hub 118 when the fluctuating valve torque is at its maximum in a direction opposite the direction of rotation is given through solution of sin(n*θ)=1, where θ is an angle commencing from the tight side tangent point along the wrap of the belt or chain along the rotor and n is the number of protrusions. In the example "squared" non-circular profile, n=4, so θ is 22.5 degrees. (For an oval non-circular profile n=2 leading to θ=45 degrees, for triangular non-circular profile n=3 leading to θ=30 degrees. The ideal angular orientation can deviate somewhat from that provided by the approximation sin(n*θ)=1 due to differences in the stiffness between the tight slack and sides (the approximation presumes equal stiffness) and differences in wrap angles (the approximation presumes 180 degree of wrap), nevertheless this approximation is suitable for most applications.

The magnitude of corrective torque can additionally or alternatively be determined experimentally. FIG. 17A shows a test stand 800 for another example mock timing drive layout. An electric motor 810 drives a non-circular crank rotor 802 and sets the speed of the mock drive. An electric motor 812 is also connected to each cam rotor 804 to impart a fluctuating torque, schematically represented by double sided curved arrow 816, on each cam rotor. Each motor 812 can be controlled to adjust the magnitude and phase of the corresponding fluctuating torque 816. A position sensor, schematically represented by arrow 820, is mounted about the crank rotor 802 to function as trigger reference for the phase of the fluctuating torques 816 generated by motors 812. If desired, the position sensor 820 may be mounted at a pre-determined angle X commencing from the tangent point of the tight side of the elongate drive structure 830 and along the wrap of the non-circular rotor, where X is the theoretically optimal angular position of a major radius of the non-circular crank rotor 802 when the fluctuating load torque is at a maximum in a direction opposite the direction or rotation. For an oval crank rotor, X can be 45 degrees (135 degrees from a bisector 832 of the tight and slack side spans S1 & S3). Position sensors, schematically represented by arrows 824, are mounted at predetermined locations about the cam rotors 804 to measure cam torsional vibration.

The following observations were made with the test stand 800: (a) when the crank rotor 802 is circular and no fluctuating torques 816 are applied to the cam rotors 804, the position sensors 824 did not detect cam torsional vibration; (b) when the crank rotor 802 is circular and sinusoidal fluctuating torques 816 are applied to the cam rotors 804, the position sensors 824 detected cam torsional vibration which resonated at a particular drive speed; and (c) when the crank rotor 802 has an non-circular (e.g., oval) profile and no fluctuating torques 816 are applied to the cam rotors 816, the position sensors 824 detected cam torsional vibration which resonated at the same drive speed as noted in (b). Clearly, the observations show that non-circular crank rotor 802 applies an input excitation to the system. To determine the magnitude of the corrective torque generated by the non-circular rotor the magnitude of the applied fluctuating torques 804 can be adjusted by the operator until no (or very little) torsional vibration is detected. In this condition, the summation of applied fluctuating load torques 816 (or applied fluctuating load torque if only one motor 812 is utilized) balances the fluctuating corrective torque generated by the non-circular rotor 802, enabling the magnitude of the latter to be measured.

If the non-circular profile(s) are employed at the camshaft rotor(s) 804, the motor 810 driving the crankshaft rotor 802 will need to generate the applied fluctuating torque in order to measure the magnitude of the corrective torque generated by the non-circular camshaft rotor(s).

It should be appreciated from the foregoing that one can measure the magnitude of corrective torque for a variety of non-circular profiles with different eccentricities and generate a table or graph such as shown at ref. no. 840 in FIG. 17B correlating eccentricities with magnitudes of corrective torque generated thereby. As this methodology provides a direct measurement of the magnitude of corrective torque, it is not necessary to estimate the stiffness coefficient k.

In the alternative to computational approaches for determining the magnitude of eccentricity and angular orientation of the non-circular rotor 106, the person skilled in the art can apply iterative techniques for deterring these parameters in order to optimize the response of the timing drive. The iterative approach seeks to try non-circular rotors of varying magnitudes of eccentricity and angular orientations and noting the timing drive response. The iterative approach can be practiced physically or through simulation; for example, the Simdrive™ platform available from CONTECS engineering service GmbH is programmed to simulate timing drive dynamics with non-circular rotors. The iterative approach can be informed by the aforementioned computational considerations or based on experience given that the Smartsprocket® technology has been applied to a variety of rotors on a variety of automotive engines. Based on such experience the radial magnitude of eccentricity for non-circular rotors in belt-based timing drives has generally ranged from about 0.2 mm to about 2.0 mm, with most oval crankshaft applications falling into a radial magnitude of eccentricity of about 0.3 mm to about 0.7 mm, most triagonal camshaft applications falling into a radial magnitude of eccentricity of about 0.6 mm to about 1.2 mm, and most "squared circle" camshaft applications falling into a radial magnitude of eccentricity of about 0.6 mm to about 1.5 mm. Similarly, the radial magnitude of eccentricity for non-circular rotors in chain-based timing drives has generally ranged from about 0.1 mm to about 1.4 mm, with most oval crankshaft applications falling into a radial magnitude of eccentricity of about 0.2 mm to about 0.5 mm, most triagonal camshaft applications falling into a radial magnitude of eccentricity of about 0.4 mm to about 1.0 mm, and most "squared circle" camshaft applications falling into a radial magnitude of eccentricity of about 0.3 mm to about 0.8 mm. The angular orientation of the non-circular rotor in terms of the positioning of its major radius when the fluctuating load torque is at a maximum in a direction opposite the direction of rotation (for brevity, "the Angular Orientation") is generally possible along the wrap of the non-circular rotor in the angular range commencing from just after the tangent point of the tight side of the elongate drive structure to a position up to one half of the wrap angle (e.g., appx. angle A-B in FIG. 16). In most applications where the non-circular profile is configured as an oval crank rotor, the angular orientation of the non-circular rotor in terms of the positioning of its major radius when the fluctuating load torque is at a maximum in a direction opposite the direction of rotation has been set along the wrap, 45 degrees after the tangent point of the tight side of the elongate drive structure, plus or minus two (2) crank rotor teeth. In most applications where the non-circular profile is configured as a triagonal cam rotor, the angular orientation of the non-circular rotor in terms of the positioning of its major radius when the fluctuating load torque is at a maximum in a direction opposite the direction of rotation has been set along the wrap, 33 degrees after the tangent point of the tight side of the elongate drive structure, plus or minus four (4) cam rotor teeth. In most applications where the non-circular profile is configured as a "squared" cam rotor, the angular orientation of the non-circular rotor in terms of the positioning of its major radius when the fluctuating load torque is at a maximum in a direction opposite the direction of rotation has been set along the wrap, 22.5 degrees after the tangent point of the tight side of the elongate drive structure, plus or minus four (4) cam rotor teeth. The practical goal is the reduction of camshaft torsional vibration and reduction in peak span tension. When these response parameters are reduced at engine speeds where resonance occurs, the non-circular rotor necessarily generates a fluctuating corrective torque since a decrease in input excitation decreases the magnitude of the response in a resonant system. Accordingly, the person skilled in the art can optimize timing drive response parameters by iteration within the ranges of eccentricity and angular orientations discussed above and/or beyond these ranges if desired.

Those skilled in the art will appreciate that a variety of modifications may be made to the apparatus and methods described herein whilst keeping within the scope of the appended claims.

The invention claimed is:

1. A corrective system for an internal combustion engine, said engine having a crankshaft driven by combustion energy, a camshaft that actuates one or more combustion valves, and a variable valve timing (VVT) system for controlling the timing of the actuation of the one or more valves by the camshaft relative to the crankshaft, the corrective system comprising:
a cam rotor that is operatively connectable with the camshaft;
a synchronous endless drive arrangement including a continuous-loop elongate drive structure engaging the crankshaft and the non-circular rotor;
wherein the cam rotor has a peripheral edge engaging the elongate drive structure, said peripheral edge having a non-circular profile including a plurality of protruding rotor portions which alternate with receding rotor portions, wherein the angular positions of the protruding and receding rotor portions are adjustable relative to the crankshaft; and
an actuator adjusting the angular positions of the protruding and receding rotor portions relative to the crankshaft during operation of the engine.

2. A corrective system as claimed in claim 1, wherein the actuator adjusts the angular positions of the protruding and receding rotor portions to be fixed relative to the camshaft.

3. A corrective system as claimed in claim 2, wherein:
the camshaft, when driven in rotation, presents a periodic fluctuating load torque on the cam rotor due to the actuation of the one or more valves;
the magnitude of the eccentricity of the non-circular profile and the angular positions of the protruding and receding rotor portions are such that the non-circular profile periodically elongates and contracts portions of the elongate drive structure so as to apply to the cam rotor an opposing fluctuating corrective torque that substantially counteracts the fluctuating load torque.

4. A corrective system as claimed in claim 3, wherein the fluctuating corrective torque counteracts the fluctuating load torque when the VVT system is set to a nominal cam timing and the engine speed corresponds to a speed where the synchronous endless drive arrangement experiences resonance.

5. A corrective system as claimed in claim 4, wherein the VVT system varies the phase angle of the fluctuating load torque relative to the angular position of the crankshaft and the actuator varies the phase angle of the fluctuating corrective torque to the same extent relative to the angular position of the crankshaft.

6. A corrective system as claimed in claim 2, wherein:
the camshaft, when driven in rotation, presents a periodic fluctuating load torque on the non-circular rotor due to the actuation of the one or more valves;
the magnitude of the eccentricity of the non-circular profile and the angular positions of the protruding and receding rotor portions are such that the non-circular profile substantially reduces camshaft timing error in comparison to the timing error experienced by the camshaft if the cam rotor was circular.

7. A corrective system as claimed in claim 6, wherein the camshaft timing error is reduced when the VVT system is set to a nominal cam timing and the engine speed corresponds to a speed where the synchronous endless drive arrangement experiences resonance.

8. A corrective system as claimed in claim 1, wherein the actuator also sets the timing for the VVT system.

9. A corrective system as claimed in claim 1, wherein the cam rotor includes:
  an outer member having a toothed ring that is at least partially flexible, wherein the toothed ring defines the cam rotor peripheral edge;
  a hub having a peripheral edge with a plurality of protruding hub portions which alternate with a plurality of receding hub portions, wherein the hub peripheral edge radially supports the toothed ring such that the angular positions of the protruding and receding hub portions at least in part determine the angular positions of the protruding and receding rotor portions;
  wherein the hub and the outer member are releasably rotationally lockable to one another, wherein the actuator drives rotational movement of the hub and the outer member relative to one another to adjust the angular positions of the protruding and receding hub portions relative to the outer member.

10. A corrective system as claimed in claim 9, wherein the toothed ring has a circumference and has a radial thickness that is constant about the circumference.

11. A correction system as claimed in claim 9, wherein the toothed ring has a circumference and has a radial thickness that varies about the circumference, such that the eccentricity of the protruding rotor portions and of the receding rotor portions depends on both the angular position of the hub and on the angular position of the toothed ring.

12. A corrective system as claimed in claim 9, wherein the actuator is a hydraulic actuator comprising a rotary piston and cylinder combination, wherein the hub is connected to one of the piston and cylinder and the outer member is connected to the other of the piston and cylinder.

13. A corrective system as claimed in claim 9, wherein the actuator is an electric actuating comprising an electric motor which drives the hub via a gear-train.

14. A corrective system as claimed in claim 9, wherein the toothed ring includes an inverted tooth chain that is mounted to a radially flexible chain support member.

15. A corrective system as claimed in claim 9, wherein the hub radially supports the toothed ring via a plurality of rollers.

16. A method of operating a synchronous endless drive arrangement for an internal combustion engine having a crankshaft and a camshaft with a variable valve timing (VVT) arrangement, wherein a fluctuating load torque is applied by at least one combustion valve on the camshaft, the method comprising:
  (a) operating the engine;
  (b) applying a fluctuating corrective torque on the camshaft to substantially counteract the fluctuating load torque, whilst the engine operates with the VVT in a nominal timing position;
  (c) varying the timing between the camshaft and the crankshaft, thereby varying a phase angle of the fluctuating load torque relative to the crankshaft, whilst the engine operates; and
  (d) in conjunction with (c), varying a phase angle of the fluctuating corrective torque relative to the crankshaft to maintain substantial counteraction of the fluctuating load torque.

17. A method according to claim 16, wherein the fluctuating corrective torque is generated by the synchronous endless drive arrangement, which arrangement includes an elongate drive structure and a rotor in engagement therewith, wherein said rotor has a non-circular profile having at least two protruding portions alternating with receding portions such that the non-circular profile periodically elongates and contracts portions of the elongate drive structure to generate said fluctuating corrective torque.

18. A method according to claim 17, wherein the non-circular profile has major radii defined in the protruding portions and the angular orientation of the non-circular rotor is such that when the engine in the nominal VVT position and the engine is operating at a speed subject to resonance and the fluctuating load torque is at a maximum in a direction opposite the direction of the rotation of the synchronous drive arrangement, one of said major radii is located along the wrap of the elongate drive structure about the non-circular rotor in an angular range commencing from after a tangent point of a tight side of the elongate drive structure to a position up to one half of the wrap length.

19. A method according to claim 18, wherein the non-circular rotor is a cam rotor and the major radii is located at an angle $\theta$ commencing from the tight side tangent point along the rotor wrap plus/minus an angular range corresponding to four cam teeth, where $\theta$ is a solution under 90 degrees to $\sin(n*\theta)=1$, where n is the number of protrusions, n being 2, 3, 4, 5 or 6.

20. A method of operating a synchronous endless drive arrangement for an internal combustion engine having a crankshaft and a camshaft with a variable valve timing (VVT) arrangement, wherein a fluctuating load torque is applied by a at least one combustion valve on the camshaft, the method comprising:
  (a) operating the engine;
  (b) whilst the engine operates with the VVT in a nominal timing position, utilizing a non-circular camshaft rotor having at least two protruding portions alternating with receding portions in a nominal angular orientation with respect to the angular position of the crankshaft in order to substantially reduce camshaft timing error in comparison to camshaft timing error experienced by a comparative circular camshaft rotor;
  (c) varying the timing between the camshaft and the crankshaft whilst the engine operates; and
  (d) in conjunction with (c), varying the angular orientation of the non-circular camshaft rotor with respect to the angular position of the crankshaft so as to maintain reduced camshaft timing error.

* * * * *